US012684086B2

(12) United States Patent
Merg et al.

(10) Patent No.: US 12,684,086 B2
(45) Date of Patent: Jul. 14, 2026

(54) METHOD AND SYSTEM FOR USING MATRIX CODE TO DISPLAY CONTENT

(71) Applicant: Snap-on Incorporated, Kenosha, WI (US)

(72) Inventors: Patrick S. Merg, Hollister, CA (US); Roy S. Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/913,405

(22) Filed: Oct. 11, 2024

(65) Prior Publication Data
US 2025/0039332 A1 Jan. 30, 2025

Related U.S. Application Data

(63) Continuation of application No. 16/271,753, filed on Feb. 8, 2019, now Pat. No. 12,149,862.

(51) Int. Cl.
H04N 7/025 (2006.01)
G06F 3/14 (2006.01)
(Continued)

(52) U.S. Cl.
CPC ......... H04N 7/0255 (2013.01); G06F 3/1423 (2013.01); G06K 19/06037 (2013.01); G07C 5/008 (2013.01); H04N 5/445 (2013.01)

(58) Field of Classification Search
CPC ................. H04N 7/0255; H04N 5/445; H04N 21/41265; H04N 21/442; H04N 21/47205;
(Continued)

(56) References Cited

U.S. PATENT DOCUMENTS 8,424,752 B2 4/2013 Rothschild
8,607,282 B2 12/2013 Lee et al.
(Continued)

FOREIGN PATENT DOCUMENTS

EP 2778954 A1 9/2014
KR 20170027290 A 3/2017
WO 2018090511 A 5/2018

OTHER PUBLICATIONS

Stack Overflow, What's the best format for QR Code File (SVG, JPG, TIFF, PNG), downloaded from the world wide web at https://stackoverflow.com/questions/26076764/whats-the-best-format-for-qr-code-file-svg-jpg-tiff-png; Sep. 27, 2014.
(Continued)

*Primary Examiner* — James M Pontius
(74) *Attorney, Agent, or Firm* — McDonnell Boehnen Hulbert & Berghoff LLP

(57) ABSTRACT

A method includes receiving, at one or more processors, a content description and a matrix code. The content description includes data describing one or more computer-readable files. The matrix code is encoded with a link to the one or more files. The method includes the one or more processors determining a condition indicative of a first computing device being unable to display the file with at least a minimum quality level. The determination is based, at least in part, on the content description. The method includes the processor outputting the matrix code to a first display operatively coupled to the one or more processors. Outputting the matrix code occurs in response to determining the condition indicative of the first computing device being unable to display the one or more files with at least the minimum quality level. Furthermore, the method includes displaying, on the first display, the matrix code.

21 Claims, 24 Drawing Sheets

100

(51) Int. Cl.
| | |
|---|---|
| *G06K 19/06* | (2006.01) |
| *G07C 5/00* | (2006.01) |
| *H04N 5/445* | (2011.01) |

(58) Field of Classification Search
CPC .. H04N 21/8586; H04N 21/858; H04N 21/41;
H04N 21/472; G06F 3/1423; G06K
19/06037; G07C 5/008
See application file for complete search history.

(56) References Cited

U.S. PATENT DOCUMENTS

| | | | | |
|---|---|---|---|---|
| 9,280,515 | B2 | 3/2016 | Gaede et al. | |
| 9,596,500 | B2 | 3/2017 | Gomez | |
| 2009/0285444 | A1 | 11/2009 | Erol | |
| 2012/0155838 | A1 | 6/2012 | Gerhards et al. | |
| 2012/0182320 | A1 | 7/2012 | Beals et al. | |
| 2012/0206648 | A1* | 8/2012 | Casagrande | H04N 21/4524 |
| | | | | 235/494 |
| 2012/0273573 | A1 | 11/2012 | Cok | |
| 2012/0296745 | A1 | 11/2012 | Harper | |
| 2012/0304224 | A1 | 11/2012 | Hines | |
| 2013/0334300 | A1 | 12/2013 | Evans | |
| 2014/0185860 | A1 | 7/2014 | Oshima | |
| 2014/0203085 | A1 | 7/2014 | Park | |
| 2014/0244739 | A1 | 8/2014 | Gärdenfors et al. | |
| 2014/0263674 | A1 | 9/2014 | Cerveny | |
| 2014/0270690 | A1 | 9/2014 | Young | |
| 2015/0039993 | A1 | 2/2015 | Ishimaru | |
| 2015/0067748 | A1* | 3/2015 | Kang | H04N 21/4516 |
| | | | | 725/110 |
| 2015/0254549 | A1 | 9/2015 | Newcombe | |
| 2015/0256824 | A1 | 9/2015 | Ramachandran | |
| 2015/0348329 | A1 | 12/2015 | Carre | |
| 2016/0034988 | A1 | 2/2016 | Howard | |
| 2016/0165322 | A1 | 6/2016 | Young | |
| 2017/0323187 | A1 | 11/2017 | Ardö et al. | |
| 2018/0027039 | A1 | 1/2018 | Moorthy et al. | |
| 2018/0095609 | A1 | 4/2018 | Merg | |
| 2018/0131983 | A1 | 5/2018 | Gibbon et al. | |
| 2018/0158255 | A1 | 6/2018 | Garcia | |
| 2018/0227274 | A1 | 8/2018 | Xian | |
| 2018/0367839 | A1 | 12/2018 | Vandoros | |
| 2019/0043535 | A1 | 2/2019 | Uchimura | |
| 2019/0108430 | A1 | 4/2019 | Coppedge | |
| 2019/0205865 | A1 | 7/2019 | Jamkhedkar | |
| 2019/0215882 | A1 | 7/2019 | Kim | |
| 2020/0104787 | A1 | 4/2020 | Schmerler | |
| 2020/0193252 | A1 | 6/2020 | Guinard | |
| 2020/0260048 | A1 | 8/2020 | Merg et al. | |

OTHER PUBLICATIONS

Matrix Multimedia Limited, Matrix Multimedia LCD Display, LCD Display Datasheet, 2004.
Bradley Mitchell, Lifewire, DSL Speed: how fast is DSL internet service?, Sep. 28, 2016.
Wikipedia, Dynamic Adaptive Streaming over HTTP, downloaded from the world wide web at https://en.wikipedia.org/wiki/Dynamic_Adaptive_Streaming_over_HTTP#Overview on Apr. 28, 2017.
Stack Overflow, embedded system vs. real time system I can't get the difference, downloaded from the world wide web at https://stackoverflow.com/questions/27458719/embedded-system-vs-real-time-system-i-cant-get-the-difference/2#2 on Mar. 8, 2017.
Shenzhen Eone Electronics Co.,Ltd, Specification for LCD Module 1602A-1 (V1.2), Sep. 1, 2010.
GS1, GS1 DataMatrix Guideline, Overview and technical introduction to the use of GS1 DataMatrix, Release 2.5.1, Ratified, Jan. 2018.
World Wide Web Consortium; HTML 4.01. Specification, Chapter 12 Links, downloaded from the world wide web at https://www.w3.org/TR/html4/struct/links.html, Mar. 27, 2018.

Qualinet, Qualinet White Paper on Definitions of Quality of Experience Output from the fifth Qualinet meeting, Novi Sad, Version 1.2, Mar. 12, 2013.
JICS Media, QRickit QR Code AP, Dynamically Generate and Display AQickit QR Codes on Your Web Pages, downloaded from the world wide web at https://qrickit.com/qrickit_apps/qrickit_api.php, Dec. 5, 2016.
Micro Digital Inc., data sheet for smxNet, Jan. 15, 2004.
Tim Fisher, Lifewire, Internet Speed Test Sites, Test your internet speed with these free broadband speed tests, May 1, 2018.
Wikipedia, Streaming Media, downloaded from the world wide web https://en.wikipedia.org/wiki/Streaming_media on Apr. 28, 2017.
Parker H., Techsmith Support, Understanding bandwidth and streaming media production, Sep. 8, 2015.
Wikipedia, Video quality, downloaded from the world wide web at https://en.wikipedia.org/wiki/Video_quality, Apr. 28, 2017.
Dacast, What Are the Bandwidth Requirements for Streaming Live Video?, Apr. 28, 2017.
Quora, What are these 240p, 360p, 480p, 720p, 1080p units for videos? What's the basic idea behind it?, downloaded from the world wide web at https://www.quora.com/What-are_these-240p-360p-480p-720p-1080p-units-for-videos-Whats-the-basic-idea-behind-it on Apr. 28, 2017.
What is a QR Code? dowloaded from the world wide web on Apr. 28, 2017.
Mobileslatest, Tech Care, Which Screen Resolutions is Best 240p, 360p, 480p, 720p, 1080p, 1440p, 4K and 8K, Oct. 1, 2016.
Robert Reinhardt, Adobe Press, Video with Adobe Flash CS4 Professional: Compression and Encoding Primer, Sep. 15, 2009.
Wikipedia, Bit rate, downloaded from the world wide web at https://en.wikipedia.org/wiki/Bit_rate on Mar. 7, 2018.
Gemma Church, Imagen, top 10 video formats, Sep. 17, 2015.
Wikipedia, Codec, downloaded from the world wide web at https://en.wikipedia.org/wiki/Codec on Apr. 27, 2018.
Nicole Pontius, Camcode, Blog, Data Matrix Codes vs. QR codes, Jan. 13, 2018.
Future Electronics, Discover Professional Embedded Processors, downloaded at the world wide web at https://www.futureelectronics.com/c/semiconductors/microprocessors--embedded-processors on Mar. 20, 2019.
China National Intellectual Property Administration; office action and search report for Chinese patent application No. 20198004766.1; dated Mar. 19, 2024.
Arlo Technologies, Inc; Pro 3 Flood light Camera, User Manual; Sep. 14, 2021; 86 pages.
Arlo Technologies, Inc; Essential Wire-Free Video doorbell, User Manual; Sep. 15, 2021; 78 pages.
Arlo Technologies, Inc; Aro Pro 3 Floodlight, featured articles; downloaded from world wide web at https://www.arlo.com/en-us/support/products/arlo-pro3-floodlight.aspx on Oct. 1, 2021; 3 pages.
Arlo Technologies Inc; Arlo Essential Wireless Video Doorbell; downloaded from world wide web at https://www.arlo.com/en-us/doorbell/video/arlo-essential-wireless-video-doorbell.html on Oct. 1, 2021; 8 pages.
Arlo Technologies Inc; screenshots and transcript of video regarding Arlo Essential Video Doorbell Wire Free—How to Set Up on, located on world wide web at https://youtube/wAkdQuY JzXk; video Nov. 13, 2020.
Arlo Technologies, Inc; screenshots and transcript of video regarding Arlo Pro 3 Floodlight Camera—How to Set Up, located on world wide web at https://youtube/ldwvo369eKw; video posted May 4, 2020.
International Searching Authority; International Search Report for International Application No. PCT/US2019/062775 mailed Feb. 26, 2020; 5 pages including both notification of transmittal and search report.
International Searching Authority; Written Opinion for International Application No. PCT/US2019/062775 mailed Feb. 26, 2020; 8 pages.

* cited by examiner

100

100

300

CONTENT DESCRIPTION

302 URI: HTTP://WWW.URI-EXAMPLE.VIDEO1.MP4@EXAMPLE.COM

304 FILE NAME: VIDEO1.MP4

306 SUBJECT: DIAGNOSTIC VIDEO FOR 2018/TOYOTA/CAMRY/4CYL WITH DTC P1604

308 SIZE: 7 GB

310 RESOLUTION: 1920 x 1080

312 COMPRESSION: MPEG-4

314 THUMBNAIL IMAGE FILE: VIDEO1.BMP

316 ENCODED BIT RATE: 5 MB/S

318 PLAY TIME: 1,400 SECONDS

320

DTC P1604

400

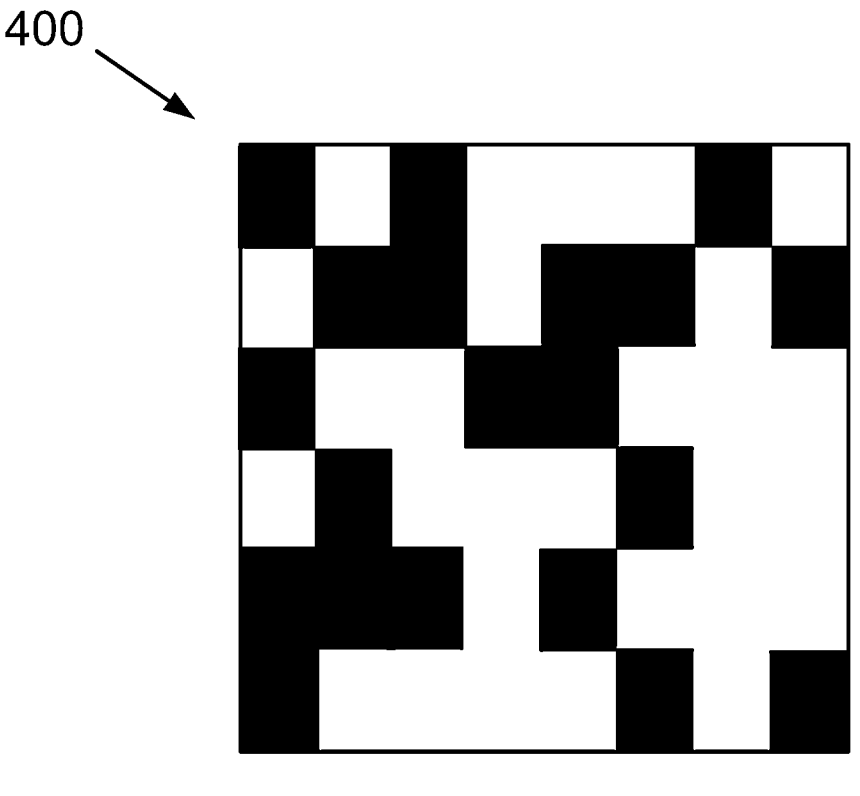

FIG. 4

```
┌─────────────────────────────────────────────────┐
│  ┌─────────────────┐        ┌─────────────────┐  │
│  │                 │        │    NETWORK      │  │
│  │   PROCESSOR     │        │  TRANSCEIVER    │  │
│  │      502        │        │      504        │  │
│  │                 │        │                 │  │
│  └─────────────────┘        └─────────────────┘  │
│             │          ●─────── 508               │
│             │          │                          │
│        ┌────┴──────────┴──────────┐               │
│        │  ┌─────────────────────┐ │               │
│        │  │       CRPI          │ │               │
│        │  │       510           │ │               │
│        │  └─────────────────────┘ │               │
│        │    MEMORY 506            │               │
│        └──────────────────────────┘               │
│                SERVER 500                          │
└─────────────────────────────────────────────────┘
```

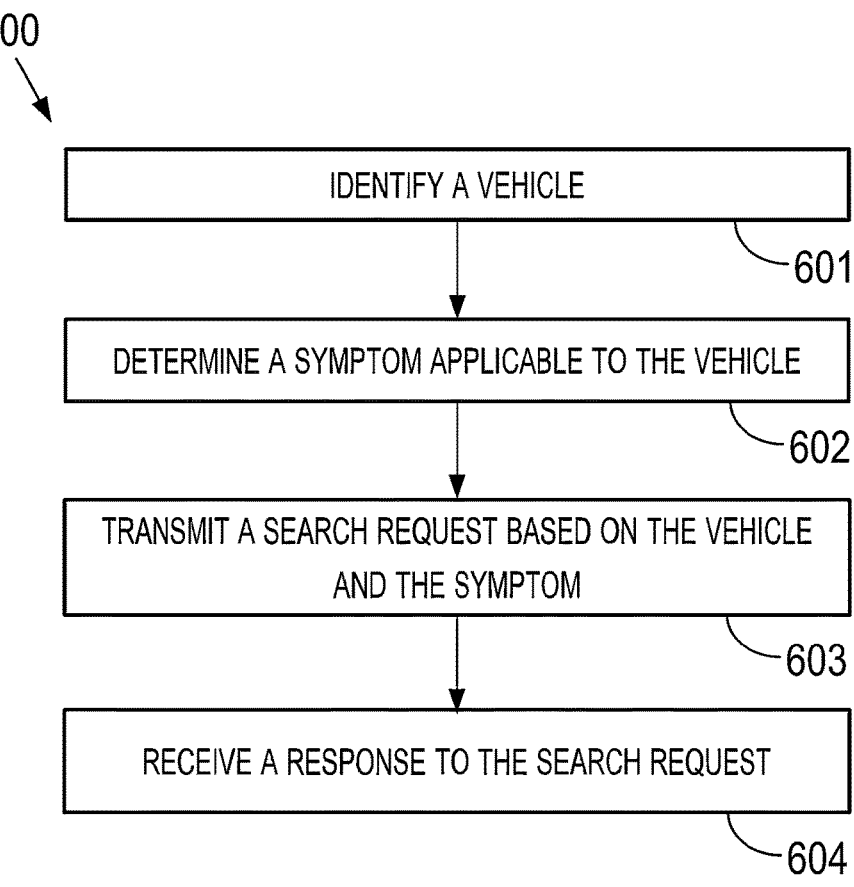

IDENTIFY A VEHICLE

601

DETERMINE A SYMPTOM APPLICABLE TO THE VEHICLE

602

TRANSMIT A SEARCH REQUEST BASED ON THE VEHICLE AND THE SYMPTOM

603

RECEIVE A RESPONSE TO THE SEARCH REQUEST

610   SEARCH REQUEST
612   DESTINATION: FILE SERVER
614   SOURCE: DIAGNOSTIC COMPUTING DEVICE
616   REQUEST TYPE: SEARCH FOR DIAGNOSTIC INFORMATION
618   REQUEST IDENTIFIER: 45278
620   VEHICLE IDENTIFIER: 2018 / TOYOTA / CAMRY / 4 CYLINDER
622   SYMPTOM: DTC P1604

FIG. 6B

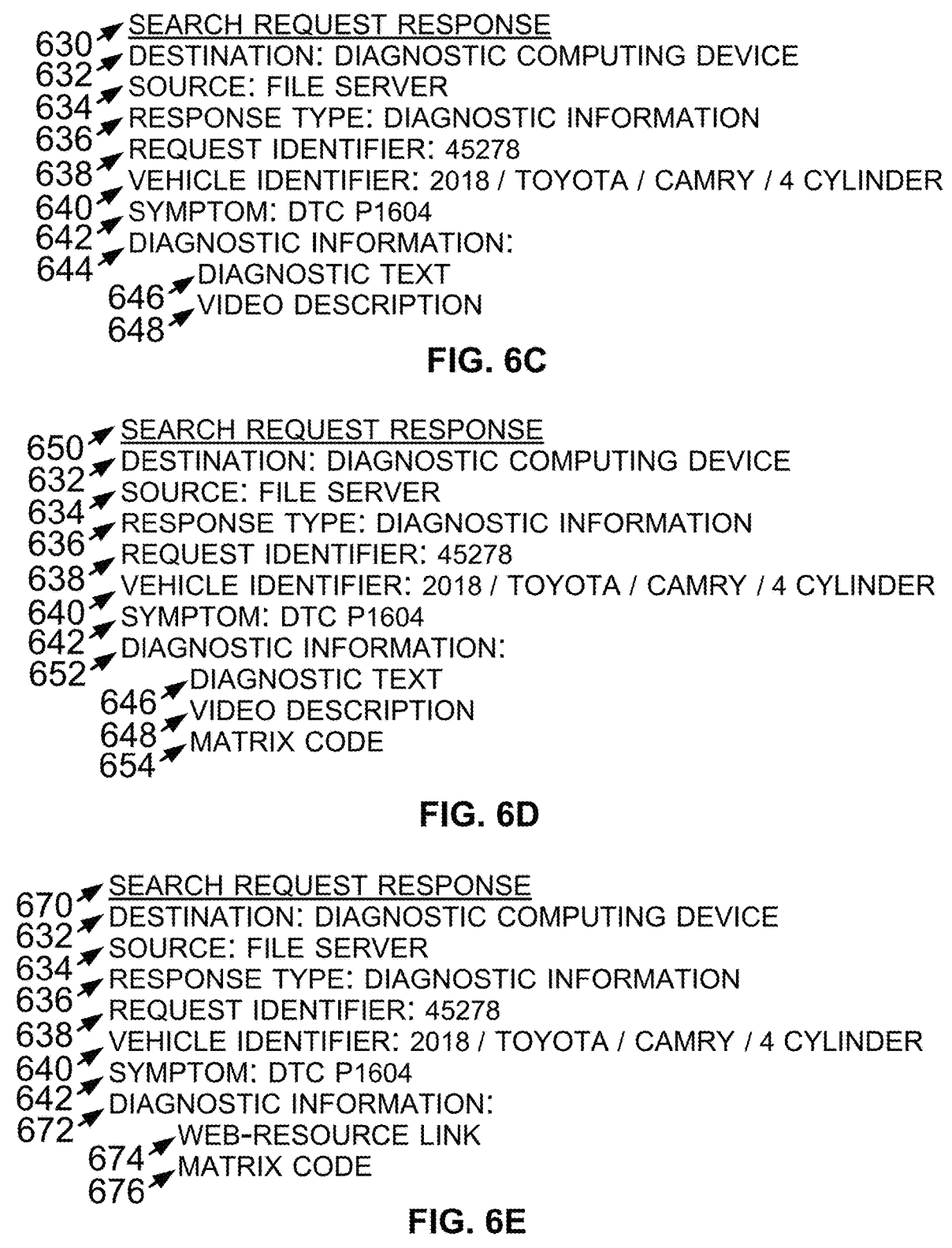

630 SEARCH REQUEST RESPONSE
632 DESTINATION: DIAGNOSTIC COMPUTING DEVICE
634 SOURCE: FILE SERVER
636 RESPONSE TYPE: DIAGNOSTIC INFORMATION
638 REQUEST IDENTIFIER: 45278
640 VEHICLE IDENTIFIER: 2018 / TOYOTA / CAMRY / 4 CYLINDER
642 SYMPTOM: DTC P1604
644 DIAGNOSTIC INFORMATION:
646 DIAGNOSTIC TEXT
648 VIDEO DESCRIPTION

FIG. 6C

650 SEARCH REQUEST RESPONSE
632 DESTINATION: DIAGNOSTIC COMPUTING DEVICE
634 SOURCE: FILE SERVER
636 RESPONSE TYPE: DIAGNOSTIC INFORMATION
638 REQUEST IDENTIFIER: 45278
640 VEHICLE IDENTIFIER: 2018 / TOYOTA / CAMRY / 4 CYLINDER
642 SYMPTOM: DTC P1604
652 DIAGNOSTIC INFORMATION:
646 DIAGNOSTIC TEXT
648 VIDEO DESCRIPTION
654 MATRIX CODE

FIG. 6D

670 SEARCH REQUEST RESPONSE
632 DESTINATION: DIAGNOSTIC COMPUTING DEVICE
634 SOURCE: FILE SERVER
636 RESPONSE TYPE: DIAGNOSTIC INFORMATION
638 REQUEST IDENTIFIER: 45278
640 VEHICLE IDENTIFIER: 2018 / TOYOTA / CAMRY / 4 CYLINDER
642 SYMPTOM: DTC P1604
672 DIAGNOSTIC INFORMATION:
674 WEB-RESOURCE LINK
676 MATRIX CODE

FIG. 6E

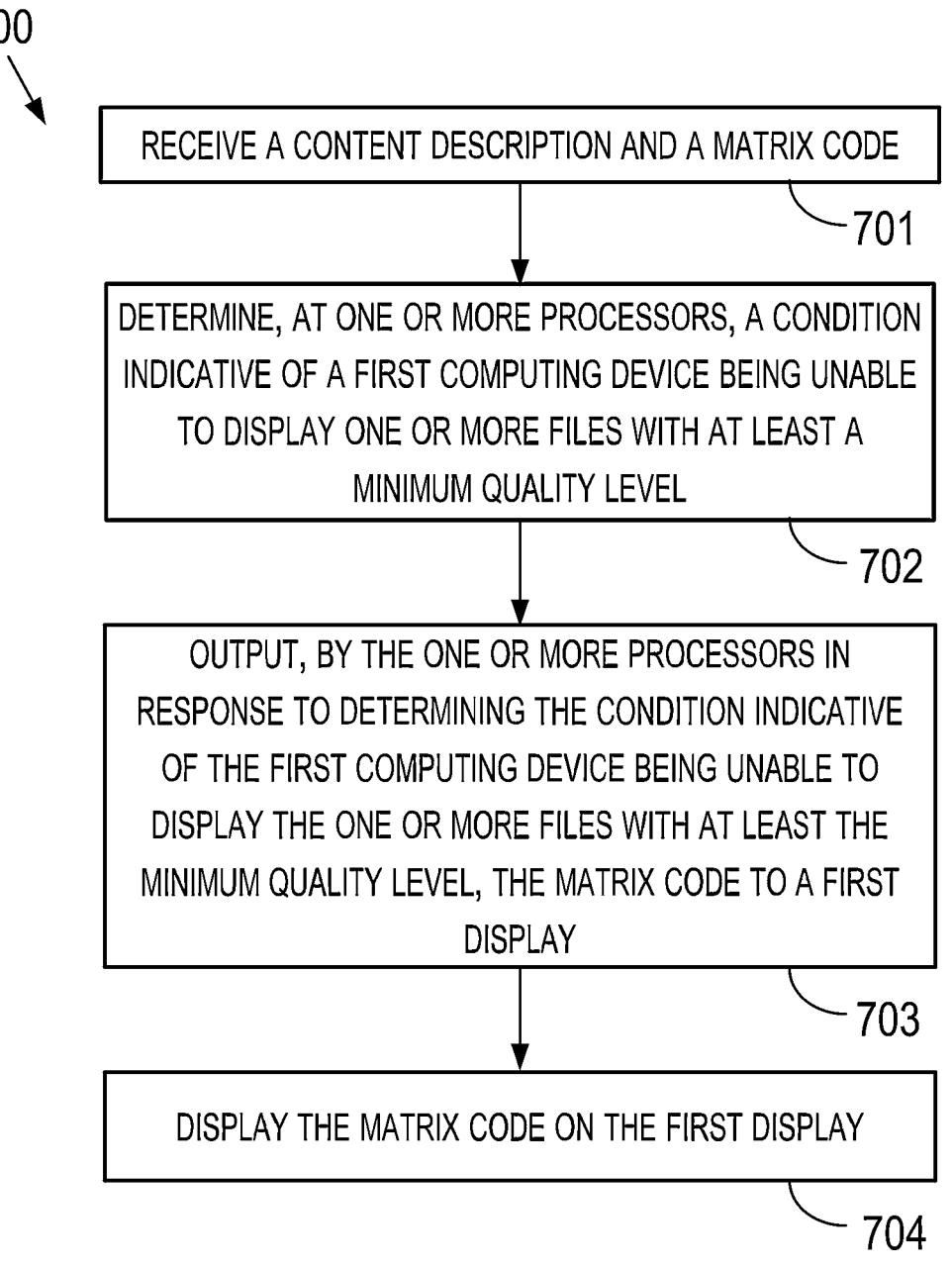

700

RECEIVE A CONTENT DESCRIPTION AND A MATRIX CODE

701

DETERMINE, AT ONE OR MORE PROCESSORS, A CONDITION INDICATIVE OF A FIRST COMPUTING DEVICE BEING UNABLE TO DISPLAY ONE OR MORE FILES WITH AT LEAST A MINIMUM QUALITY LEVEL

702

OUTPUT, BY THE ONE OR MORE PROCESSORS IN RESPONSE TO DETERMINING THE CONDITION INDICATIVE OF THE FIRST COMPUTING DEVICE BEING UNABLE TO DISPLAY THE ONE OR MORE FILES WITH AT LEAST THE MINIMUM QUALITY LEVEL, THE MATRIX CODE TO A FIRST DISPLAY

703

DISPLAY THE MATRIX CODE ON THE FIRST DISPLAY

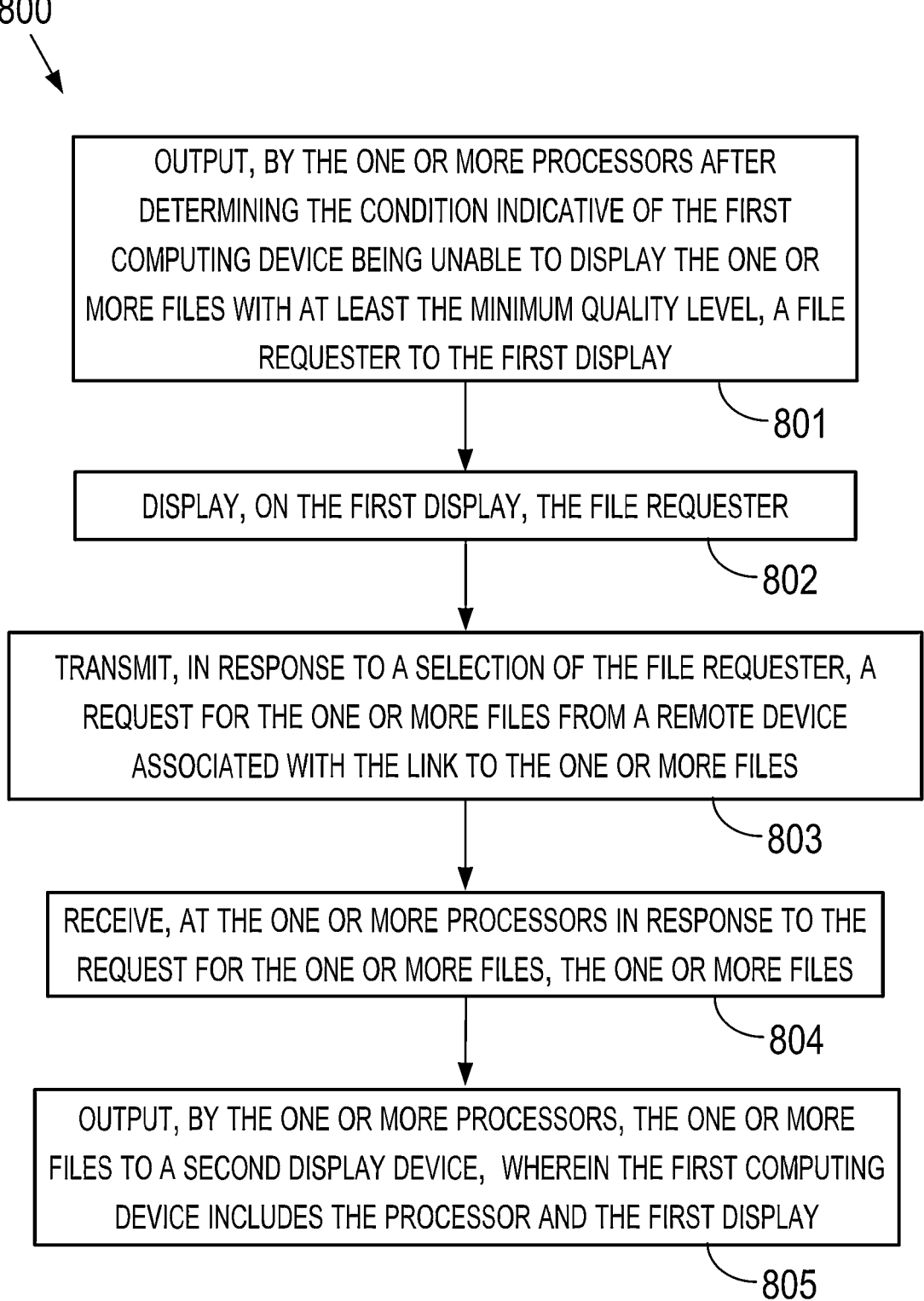

OUTPUT, BY THE ONE OR MORE PROCESSORS AFTER DETERMINING THE CONDITION INDICATIVE OF THE FIRST COMPUTING DEVICE BEING UNABLE TO DISPLAY THE ONE OR MORE FILES WITH AT LEAST THE MINIMUM QUALITY LEVEL, A FILE REQUESTER TO THE FIRST DISPLAY

801

DISPLAY, ON THE FIRST DISPLAY, THE FILE REQUESTER

802

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

803

RECEIVE, AT THE ONE OR MORE PROCESSORS IN RESPONSE TO THE REQUEST FOR THE ONE OR MORE FILES, THE ONE OR MORE FILES

804

OUTPUT, BY THE ONE OR MORE PROCESSORS, THE ONE OR MORE FILES TO A SECOND DISPLAY DEVICE, WHEREIN THE FIRST COMPUTING DEVICE INCLUDES THE PROCESSOR AND THE FIRST DISPLAY

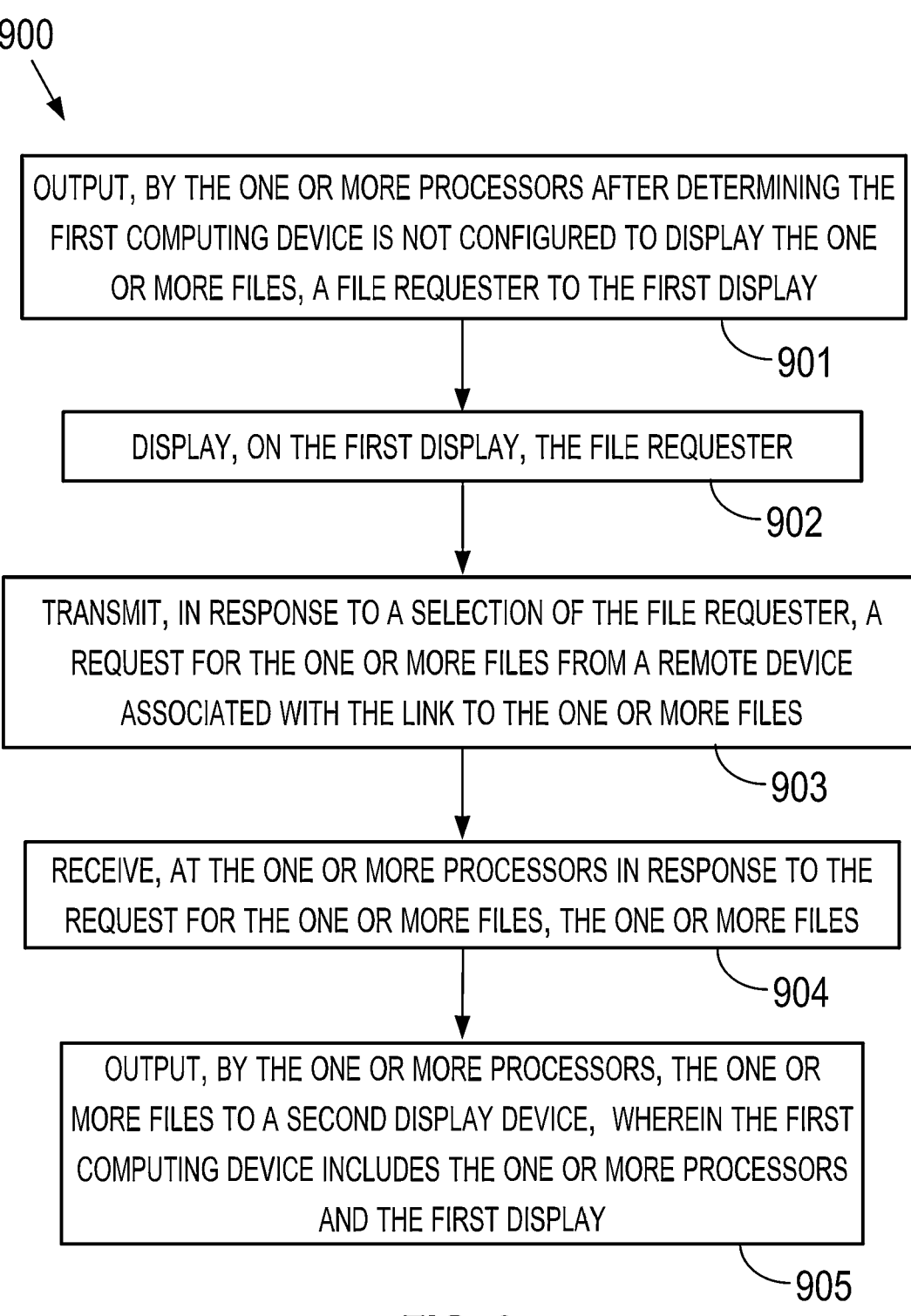

900

OUTPUT, BY THE ONE OR MORE PROCESSORS AFTER DETERMINING THE FIRST COMPUTING DEVICE IS NOT CONFIGURED TO DISPLAY THE ONE OR MORE FILES, A FILE REQUESTER TO THE FIRST DISPLAY

901

DISPLAY, ON THE FIRST DISPLAY, THE FILE REQUESTER

902

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

903

RECEIVE, AT THE ONE OR MORE PROCESSORS IN RESPONSE TO THE REQUEST FOR THE ONE OR MORE FILES, THE ONE OR MORE FILES

904

OUTPUT, BY THE ONE OR MORE PROCESSORS, THE ONE OR MORE FILES TO A SECOND DISPLAY DEVICE, WHEREIN THE FIRST COMPUTING DEVICE INCLUDES THE ONE OR MORE PROCESSORS AND THE FIRST DISPLAY

Figure 10:
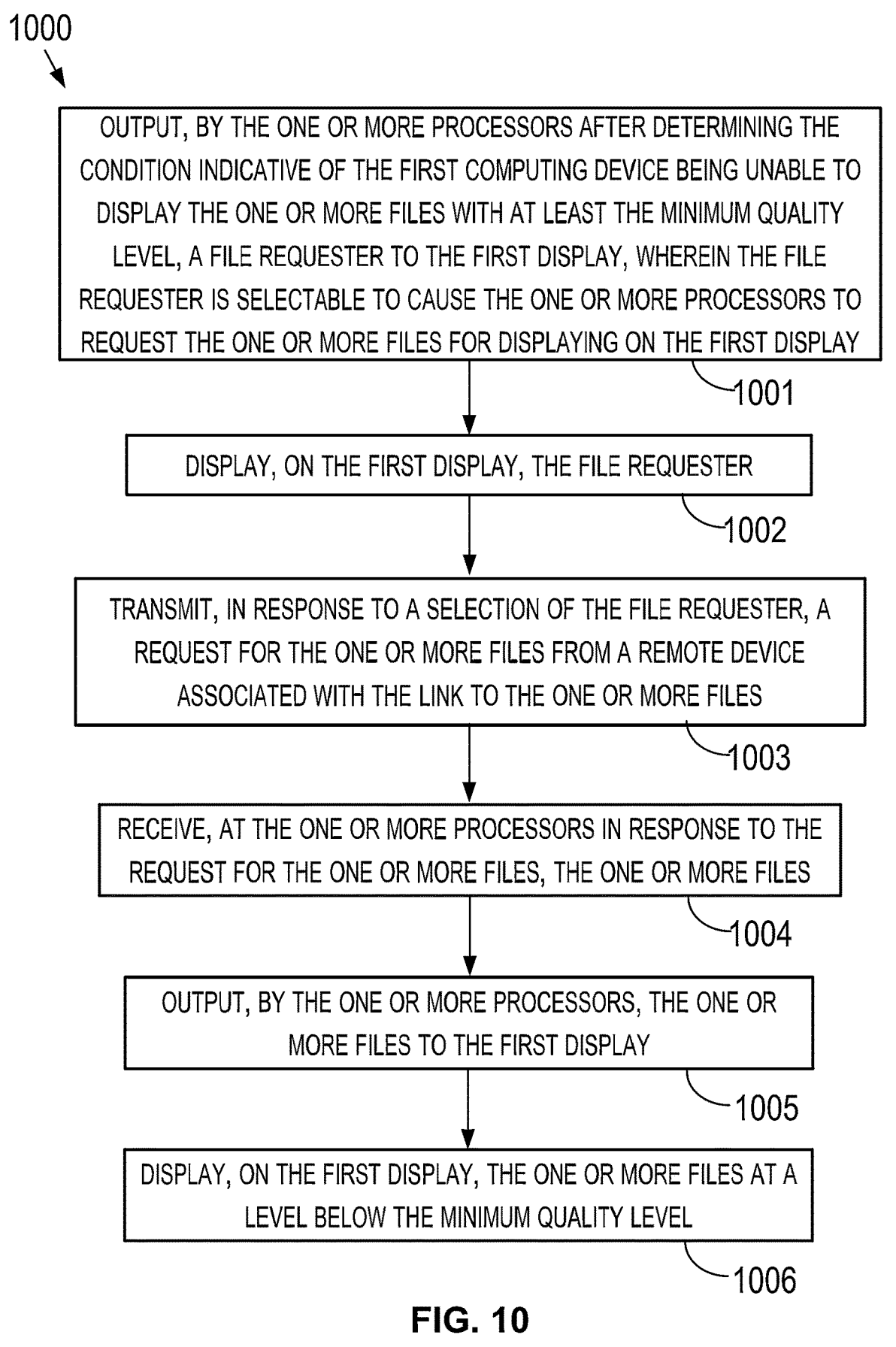

OUTPUT, BY THE ONE OR MORE PROCESSORS AFTER DETERMINING THE CONDITION INDICATIVE OF THE FIRST COMPUTING DEVICE BEING UNABLE TO DISPLAY THE ONE OR MORE FILES WITH AT LEAST THE MINIMUM QUALITY LEVEL, A FILE REQUESTER TO THE FIRST DISPLAY, WHEREIN THE FILE REQUESTER IS SELECTABLE TO CAUSE THE ONE OR MORE PROCESSORS TO REQUEST THE ONE OR MORE FILES FOR DISPLAYING ON THE FIRST DISPLAY

1001

DISPLAY, ON THE FIRST DISPLAY, THE FILE REQUESTER

1002

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

1003

RECEIVE, AT THE ONE OR MORE PROCESSORS IN RESPONSE TO THE REQUEST FOR THE ONE OR MORE FILES, THE ONE OR MORE FILES

1004

OUTPUT, BY THE ONE OR MORE PROCESSORS, THE ONE OR MORE FILES TO THE FIRST DISPLAY

1005

DISPLAY, ON THE FIRST DISPLAY, THE ONE OR MORE FILES AT A LEVEL BELOW THE MINIMUM QUALITY LEVEL

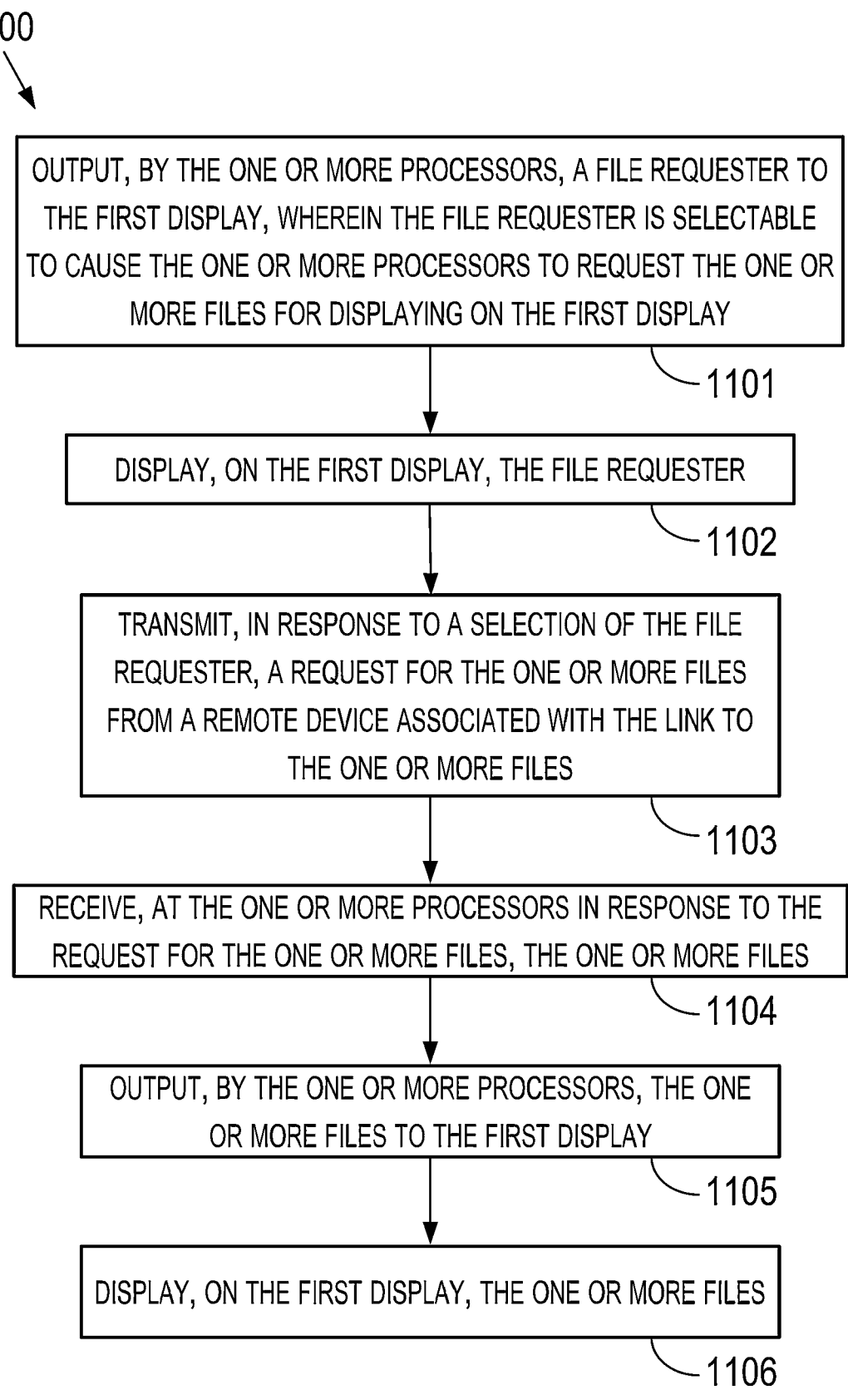

OUTPUT, BY THE ONE OR MORE PROCESSORS, A FILE REQUESTER TO THE FIRST DISPLAY, WHEREIN THE FILE REQUESTER IS SELECTABLE TO CAUSE THE ONE OR MORE PROCESSORS TO REQUEST THE ONE OR MORE FILES FOR DISPLAYING ON THE FIRST DISPLAY

1101

DISPLAY, ON THE FIRST DISPLAY, THE FILE REQUESTER

1102

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

1103

RECEIVE, AT THE ONE OR MORE PROCESSORS IN RESPONSE TO THE REQUEST FOR THE ONE OR MORE FILES, THE ONE OR MORE FILES

1104

OUTPUT, BY THE ONE OR MORE PROCESSORS, THE ONE OR MORE FILES TO THE FIRST DISPLAY

1105

DISPLAY, ON THE FIRST DISPLAY, THE ONE OR MORE FILES

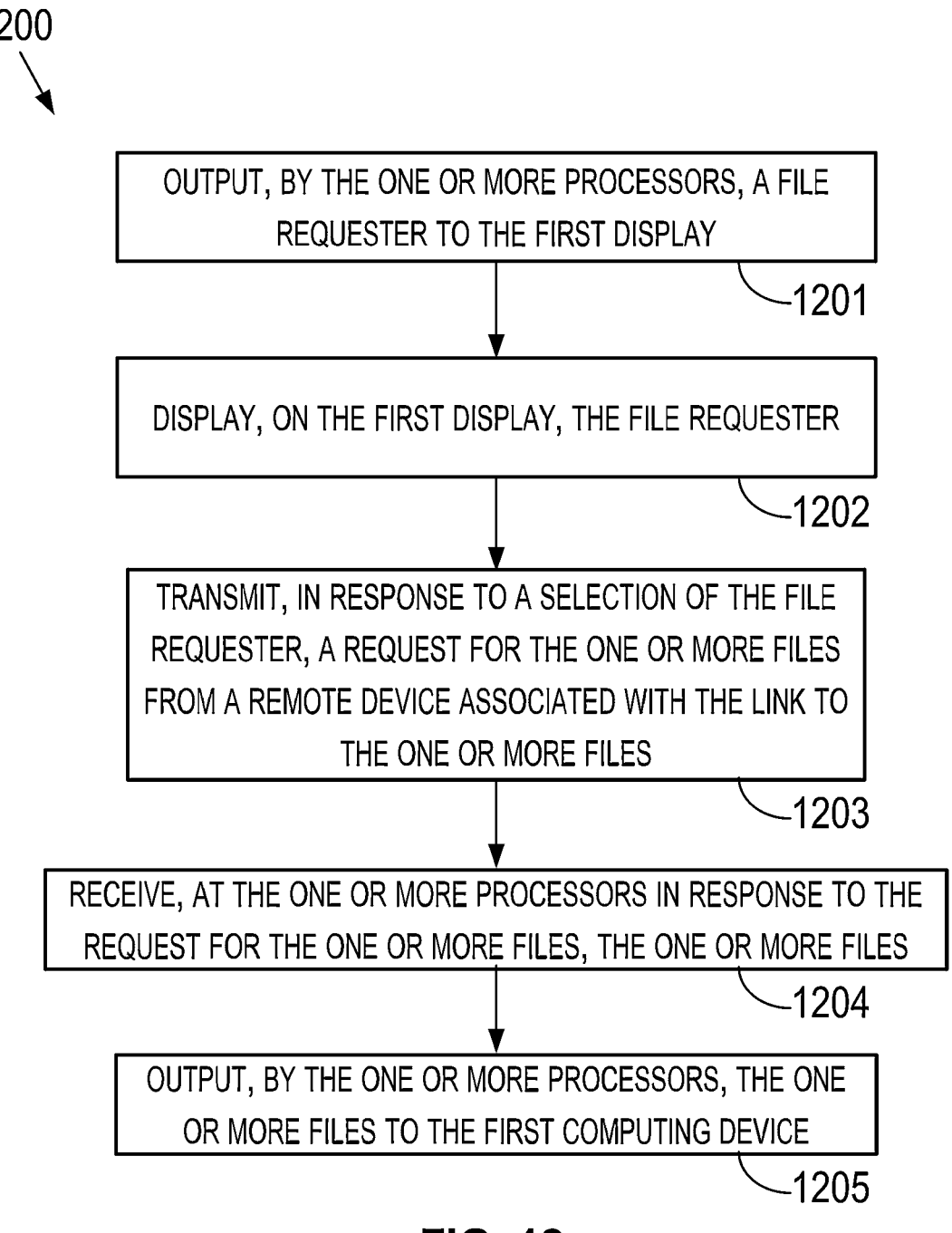

1200

OUTPUT, BY THE ONE OR MORE PROCESSORS, A FILE REQUESTER TO THE FIRST DISPLAY

1201

DISPLAY, ON THE FIRST DISPLAY, THE FILE REQUESTER

1202

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

1203

RECEIVE, AT THE ONE OR MORE PROCESSORS IN RESPONSE TO THE REQUEST FOR THE ONE OR MORE FILES, THE ONE OR MORE FILES

1204

OUTPUT, BY THE ONE OR MORE PROCESSORS, THE ONE OR MORE FILES TO THE FIRST COMPUTING DEVICE

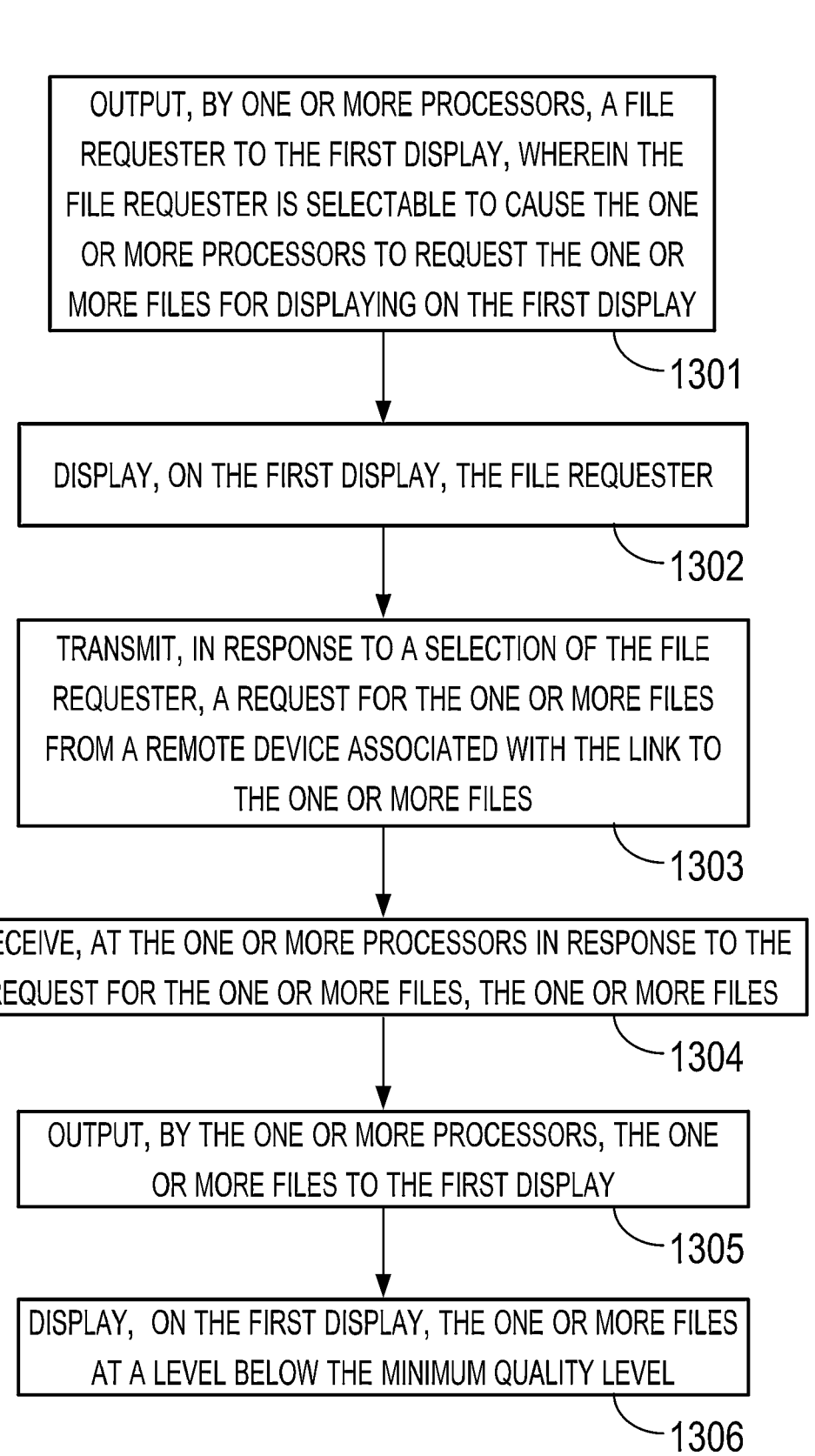

OUTPUT, BY ONE OR MORE PROCESSORS, A FILE REQUESTER TO THE FIRST DISPLAY, WHEREIN THE FILE REQUESTER IS SELECTABLE TO CAUSE THE ONE OR MORE PROCESSORS TO REQUEST THE ONE OR MORE FILES FOR DISPLAYING ON THE FIRST DISPLAY

1301

DISPLAY, ON THE FIRST DISPLAY, THE FILE REQUESTER

1302

TRANSMIT, IN RESPONSE TO A SELECTION OF THE FILE REQUESTER, A REQUEST FOR THE ONE OR MORE FILES FROM A REMOTE DEVICE ASSOCIATED WITH THE LINK TO THE ONE OR MORE FILES

1303

RECEIVE, AT THE ONE OR MORE PROCESSORS IN RESPONSE TO THE REQUEST FOR THE ONE OR MORE FILES, THE ONE OR MORE FILES

1304

OUTPUT, BY THE ONE OR MORE PROCESSORS, THE ONE OR MORE FILES TO THE FIRST DISPLAY

1305

DISPLAY,  ON THE FIRST DISPLAY, THE ONE OR MORE FILES AT A LEVEL BELOW THE MINIMUM QUALITY LEVEL

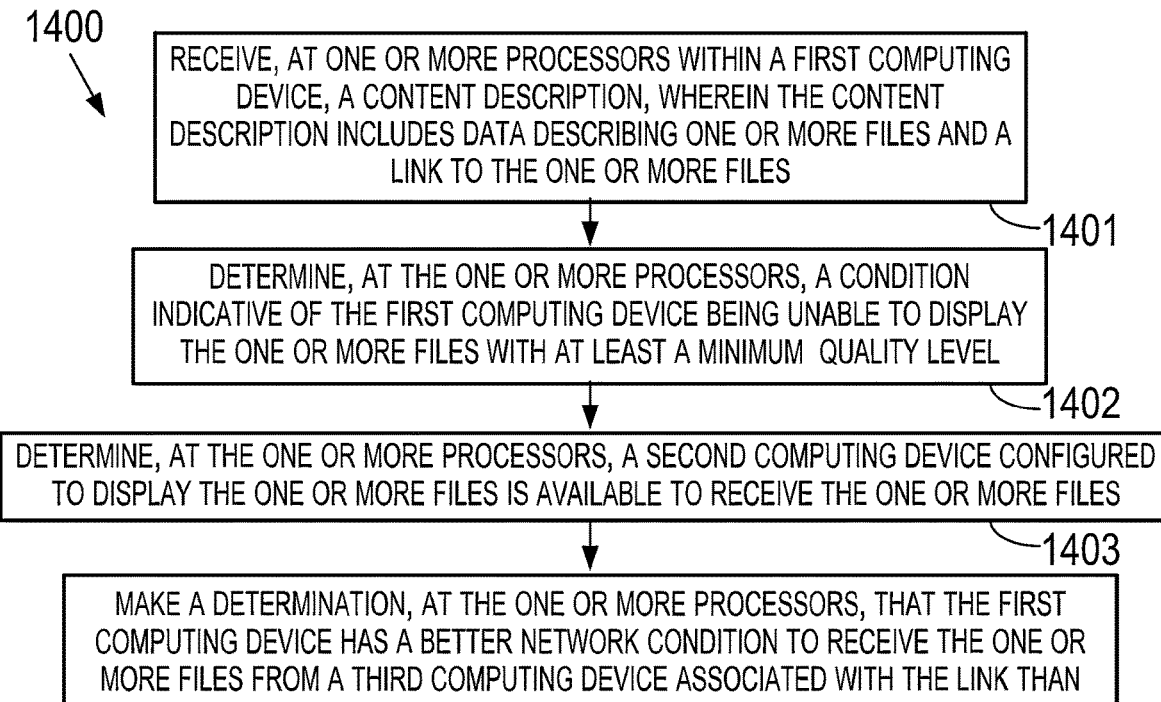

RECEIVE, AT ONE OR MORE PROCESSORS WITHIN A FIRST COMPUTING DEVICE, A CONTENT DESCRIPTION, WHEREIN THE CONTENT DESCRIPTION INCLUDES DATA DESCRIBING ONE OR MORE FILES AND A LINK TO THE ONE OR MORE FILES

1401

DETERMINE, AT THE ONE OR MORE PROCESSORS, A CONDITION INDICATIVE OF THE FIRST COMPUTING DEVICE BEING UNABLE TO DISPLAY THE ONE OR MORE FILES WITH AT LEAST A MINIMUM QUALITY LEVEL

1402

DETERMINE, AT THE ONE OR MORE PROCESSORS, A SECOND COMPUTING DEVICE CONFIGURED TO DISPLAY THE ONE OR MORE FILES IS AVAILABLE TO RECEIVE THE ONE OR MORE FILES

1403

MAKE A DETERMINATION, AT THE ONE OR MORE PROCESSORS, THAT THE FIRST COMPUTING DEVICE HAS A BETTER NETWORK CONDITION TO RECEIVE THE ONE OR MORE FILES FROM A THIRD COMPUTING DEVICE ASSOCIATED WITH THE LINK THAN THE SECOND COMPUTING DEVICE OR THAT THE SECOND COMPUTING DEVICE HAS A BETTER NETWORK CONDITION TO RECEIVE THE ONE OR MORE FILES FROM THE THIRD COMPUTING DEVICE ASSOCIATED WITH THE LINK THAN THE FIRST COMPUTING DEVICE

1404

IF THE DETERMINATION IS THAT THE FIRST COMPUTING DEVICE HAS A BETTER NETWORK CONNECTION TO RECEIVE THE ONE OR MORE FILES FROM THE THIRD COMPUTING DEVICE ASSOCIATED WITH THE LINK THAN THE SECOND COMPUTING DEVICE, THEN IN RESPONSE TO MAKING THE DETERMINATION, OUTPUTTING BY THE ONE OR MORE PROCESSORS, A REQUEST FOR THE ONE OR MORE FILES FROM THE THIRD COMPUTING DEVICE ASSOCIATED WITH THE LINK, RECEIVING THE ONE OR MORE FILES AT THE FIRST COMPUTING DEVICE, AND OUTPUTTING, BY THE ONE OR MORE PROCESSORS, THE ONE OR MORE FILES TO THE SECOND COMPUTING DEVICE VIA A DIRECT CONNECTION BETWEEN THE FIRST COMPUTING DEVICE AND THE SECOND COMPUTING DEVICE

1405

IF THE DETERMINATION IS THAT THE SECOND COMPUTING DEVICE HAS A BETTER NETWORK CONNECTION TO RECEIVE THE ONE OR MORE FILES FROM THE THIRD COMPUTING DEVICE ASSOCIATED WITH THE LINK THAN THE FIRST COMPUTING DEVICE, THEN OUTPUTTING THE LINK TO THE SECOND COMPUTING DEVICE VIA THE DIRECT CONNECTION BETWEEN THE FIRST COMPUTING DEVICE AND THE SECOND COMPUTING DEVICE

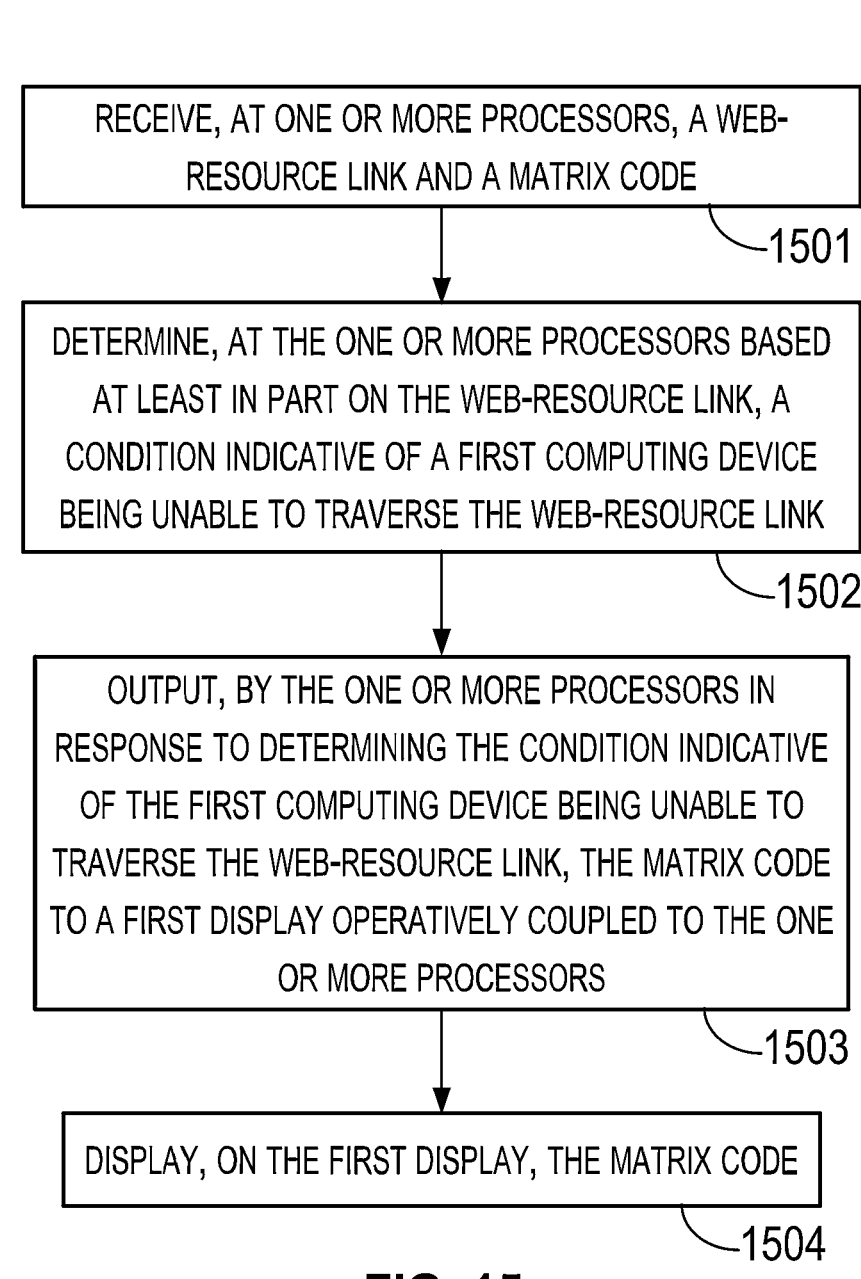

RECEIVE, AT ONE OR MORE PROCESSORS, A WEB-RESOURCE LINK AND A MATRIX CODE

1501

DETERMINE, AT THE ONE OR MORE PROCESSORS BASED AT LEAST IN PART ON THE WEB-RESOURCE LINK, A CONDITION INDICATIVE OF A FIRST COMPUTING DEVICE BEING UNABLE TO TRAVERSE THE WEB-RESOURCE LINK

1502

OUTPUT, BY THE ONE OR MORE PROCESSORS IN RESPONSE TO DETERMINING THE CONDITION INDICATIVE OF THE FIRST COMPUTING DEVICE BEING UNABLE TO TRAVERSE THE WEB-RESOURCE LINK, THE MATRIX CODE TO A FIRST DISPLAY OPERATIVELY COUPLED TO THE ONE OR MORE PROCESSORS

1503

DISPLAY, ON THE FIRST DISPLAY, THE MATRIX CODE

METHOD AND SYSTEM FOR USING MATRIX CODE TO DISPLAY CONTENT

CROSS-REFERENCE TO RELATED APPLICATION

This application is a continuation application of U.S. patent application Ser. No. 16/271,753, entitled "Method and system for using matrix code to display content," filed on Feb. 8, 2019, and published as United States Patent Application Publication No. 2020/0260048 A1 on Aug. 13, 2020. U.S. patent application Ser. No. 16/271,753 and United States Patent Application Publication No. 2020/0260048 A1 are incorporated herein by reference.

BACKGROUND

A technician that services vehicles can refer to service information in order to service a vehicle correctly and more efficiently as compared to a technician that does not refer to service information. The service information can be available in various forms, such as service information on printed paper or service information that is displayed electronically on a display. A variety of problems can arise when a technician attempts to display service information electronically on a display, especially when the service information is stored in a video format off-board a computing device the technician is using to search for service information or service information that is accessible via a link within a webpage. As an example, the technician can search for off-board service information using a computing device that is not configured to display a video and/or that is not configured to traverse a link within a webpage. As another example, the technician can search for off-board service information using a computing device under poor network conditions. The poor network conditions could result in an unexpectedly long time to download an off-board service information video, multiple attempts to download the off-board service information video, or streaming the off-board service information video at a rate too slow to allow for continuous display of the off-board service information video.

OVERVIEW

In a first implementation, a method is provided. The method includes receiving, at one or more processors, a content description and a matrix code. The content description includes data describing one or more files. Each of the one or more files includes a computer-readable file. The matrix code is encoded with a link to the one or more files. The method also includes determining, at the one or more processors based, at least in part, on the content description, a condition indicative of a first computing device being unable to display the one or more files with at least a minimum quality level. Furthermore, the method includes outputting, by the one or more processors in response to determining the condition indicative of the first computing device being unable to display the one or more files with at least the minimum quality level, the matrix code to a first display operatively coupled to the one or more processors. Furthermore still, the method includes displaying, on the first display, the matrix code.

In a second implementation, a computing device is provided. The computing device includes one or more processors, and a non-transitory computer readable medium having stored thereon at least executable instructions. The executable instructions, when executed by the one or more processors, cause the computing device to perform functions. The functions include receiving, at the one or more processors, a content description and a matrix code. The content description includes data describing one or more files. Each of the one or more files includes a computer-readable file. The matrix code is encoded with a link to the one or more files. The functions also include determining, at the one or more processors based on the content description, a condition indicative of a first computing device being unable to display the one or more files with at least a minimum quality level. Furthermore, the functions include outputting, by the processor in response to determining the condition indicative of the first computing device being unable to display the one or more files with at least the minimum quality level, the matrix code to a first display operatively coupled to the one or more processors. Furthermore still, the functions include displaying, on the first display, the matrix code.

In a third implementation, a non-transitory computer-readable medium is provided. The computer readable medium has stored thereon at least executable instructions. The executable instructions, when executed by one or more processors of a computing device, cause the computing device to perform functions. The functions include receiving, at the one or more processors, a content description and a matrix code. The content description includes data describing one or more files. Each of the one or more files includes a computer-readable file. The matrix code is encoded with a link to the one or more files. The functions also include determining, at the one or more processors based on the content description, a condition indicative of a first computing device being unable to display the one or more files with at least a minimum video quality level. Furthermore, the functions include outputting, by the one or more processors in response to determining the condition indicative of the first computing device being unable to display the one or more files with at least the minimum quality level, the matrix code to a first display operatively coupled to the one or more processors. Furthermore still, the functions include displaying, on the first display, the matrix code.

In a fourth implementation, a method is provided. The method includes receiving, at one or more processors within a first computing device, a content description. The content description includes data describing one or more files and a link to the one or more files. The method includes determining, at the one or more processors, a condition indicative of the first computing device being unable to display the one or more files with at least a minimum quality level. The method also includes determining, at the one or more processors, a second computing device configured to display the one or more files is available to receive the one or more files. Furthermore, the method includes making a determination, at the one or more processors, that the first computing device has a better network connection to receive the one or more files from a third computing device associated with the link than the second computing device or that the second computing device has a better network connection to receive the one or more files from the third computing device associated with the link than the first computing device. If the determination is that the first computing device has a better network connection to receive the one or more files from the third computing device associated with the link than the second computing device, then in response to making the determination, the method includes outputting by the one or more processors, a request for the one or more files from the third computing device associated with the link, receiving the one or more files at the first computing device, and outputting, by the one or more processors, the one or more files to the second computing device via a direct connection between the first computing device and the second computing device. Otherwise, if the determination is that the second computing device has a better network connection to receive the one or more files from the third computing device associated with the link than the first computing device, then the method includes outputting the link to the second computing device via the direct connection between the first computing device and the second computing device.

In a fifth implementation, a first computing device is provided. The first computing device includes one or more processors, and a non-transitory computer readable medium having stored thereon at least executable instructions. The executable instructions, when executed by the one or more processors, cause the first computing device to perform functions. The functions include receiving, at the one or more processors, a content description. The content description includes data describing one or more files and a link to the one or more files. The functions include determining, at the one or more processors, a condition indicative of the first computing device being unable to display the one or more files with at least a minimum quality level; determining, at the one or more processors, a second computing device configured to display the one or more files is available to receive the one or more files. The functions also include making a determination, at the one or more processors, that the first computing device has a better network connection to receive the one or more files from a third computing device associated with the link than the second computing device or that the second computing device has a better network connection to receive the one or more files from the third computing device associated with the link than the first computing device. If the determination is that the first computing device has a better network connection to receive the one or more files from the third computing device associated with the link than the second computing device, then in response to making the determination, the method includes outputting by the one or more processors, a request for the one or more files from the third computing device associated with the link, receiving the one or more files at the first computing device, and outputting, by the one or more processors, the one or more files to the second computing device via a direct connection between the first computing device and the second computing device. Otherwise, if determination is that the second computing device has a better network connection to receive the one or more files from the third computing device associated with the link than the first computing device, then the method includes outputting the link to the second computing device via the direct connection between the first computing device and the second computing device.

In a sixth implementation, a non-transitory computer-readable medium is provided. The computer readable medium has stored thereon at least executable instructions. The executable instructions, when executed by one or more processors of a first computing device, cause the first computing device to perform functions. The functions include receiving, at the one or more processors, a content description. The content description includes data describing one or more files and a link to the one or more files. The functions include determining, at the one or more processors, a condition indicative of the first computing device being unable to display the one or more files with at least a minimum quality level. The functions include determining, at the one or more processors, a second computing device configured to display the one or more files is available to receive the one or more files. The functions also include making a determination, at the one or more processors, that the first computing device has a better network connection to receive the one or more files from a third computing device associated with the link than the second computing device or that the second computing device has a better network connection to receive the one or more files from the third computing device associated with the link than the first computing device. If the determination is that the first computing device has a better network connection to receive the one or more files from the third computing device associated with the link than the second computing device, then in response to making the determination, the functions include outputting by the one or more processors, a request for the one or more files from the third computing device associated with the link, receiving the one or more files at the first computing device, and outputting, by the one or more processors, the one or more files to the second computing device via a direct connection between the first computing device and the second computing device. Otherwise, if the determination is that the second computing device has a better network connection to receive the one or more files from the third computing device associated with the link than the first computing device, then the functions include outputting the link to the second computing device via the direct connection between the first computing device and the second computing device.

In a seventh implementation, a method is provided. The method includes receiving, at one or more processors, a web-resource link and a matrix code. The web-resource link includes a link to one or more web resources. The matrix code is encoded with the web-resource link. The method also includes determining, at the one or more processors based at least in part on the web-resource link, a condition indicative of a first computing device being unable to traverse the web-resource link. Further, the method includes outputting, by the one or more processors in response to determining the condition indicative of the first computing device being unable to traverse the web-resource link, the matrix code to a first display operatively coupled to the one or more processors. Further still, the method includes displaying, on the first display, the matrix code.

In an eighth implementation, a computing system is provided. The computing system includes a computing device and a computer-readable medium. The computer-readable medium stores program instructions, that when executed by the computing device, cause the computing device to perform functions. The functions include receiving a web-resource link and a matrix code. The web-resource link includes a link to one or more web resources. The matrix code is encoded with the web-resource link. The functions also include determining, based at least in part on the web-resource link, a condition indicative of the computing device being unable to traverse the web-resource link. Further, the functions include outputting, in response to determining the condition indicative of the computing device being unable to traverse the web-resource link, the matrix code to a first display. Further still, the functions include displaying, on the first display, the matrix code.

In a ninth implementation, a computer-readable medium is provided. The computer-readable medium has stored thereon program instructions that when executed by a computing device, cause the computing device to perform functions. The functions include receiving a web-resource link and a matrix code. The web-resource link includes a link to one or more web resources. The matrix code is encoded with the web-resource link. The functions also include determining, based at least in part on the web-resource link, a condition indicative of the computing device being unable to traverse the web-resource link. Further, the functions include outputting, in response to determining the condition indicative of the computing device being unable to traverse the web-resource link, the matrix code to a first display. Further still, the functions include displaying, on the first display, the matrix code.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 4 shows a matrix code, according to example implementations.

FIGS. 5A, 5B, and 5C illustrate servers, according to example implementations.

FIG. 6A is a flow chart depicting operations of a representative method, according to example implementations.

FIG. 6B shows an example search request, according to example implementations.

FIGS. 6C, 6D, and 6E illustrate example search request responses, according to example implementations.

FIGS. 7, 8, 9, 10, 11, 12, 13, 14, and 15 are flow charts depicting operations of representative methods, according to example implementations.

DETAILED DESCRIPTION

I. Introduction

Figure 1A:
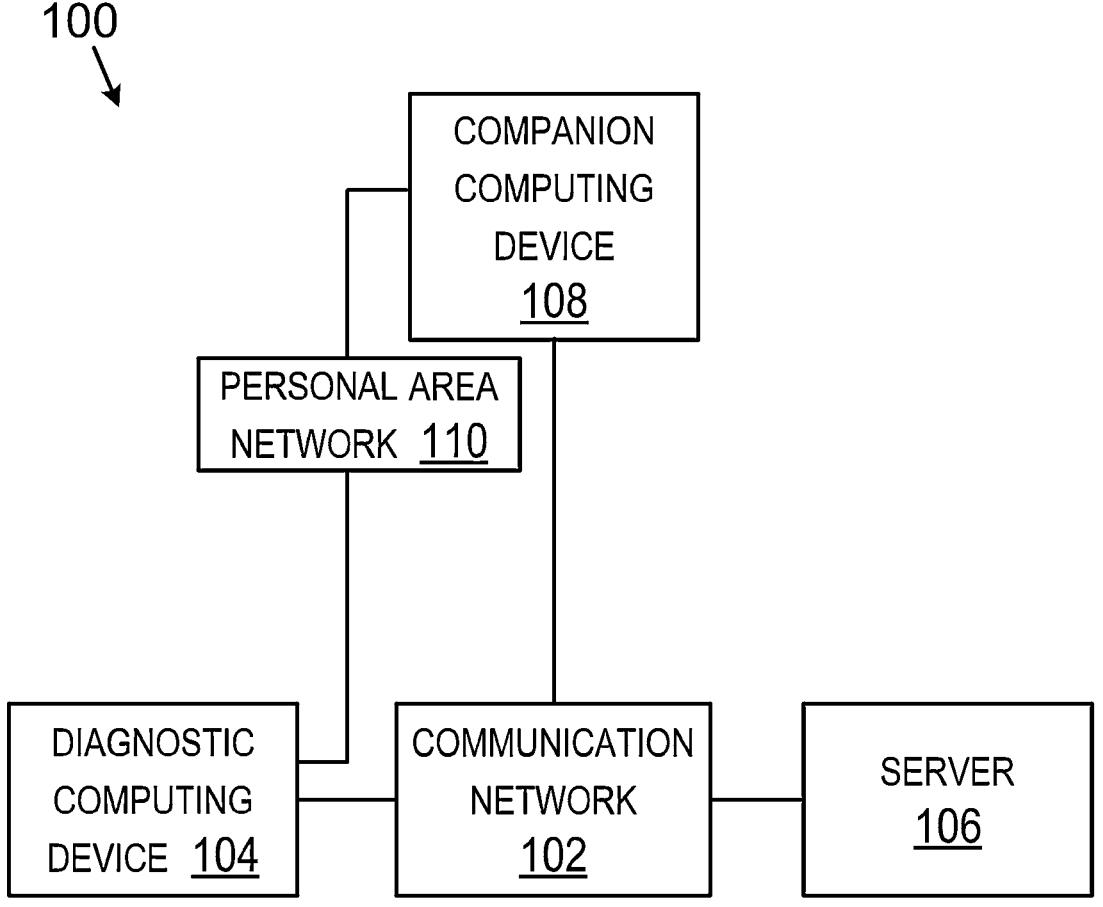
FIG. 1A shows a system, according to example implementations.

This description describes several example implementations, at least some of which pertain to displaying a computer-readable file on a display. In some implementations, the computer-readable file includes content pertaining to servicing a vehicle, such as an automobile and/or a link to that content. In at least some implementations, additional information (e.g., textual service information and/or textual diagnostic information) can be displayed on the display while the computer-readable file is played on the display. In some of those implementations, a display of a user's computing device may not be configured to display the computer-readable file or may not be configured to display both the computer-readable file and the additional service information while displaying the computer-readable file. Moreover, in those and/or in other implementations, the computing device that displays a link to other content may not be configured to traverse the link.

This description describes implementations that include using a first computing device and a second computing device to display one or more computer-readable files on at least one of the first and second computing devices. At least some of those implementations can include displaying the additional service information on at least one of the first and second computing devices. Examples of the additional service information include a diagnostic flowchart, a removal and replacement instruction, a still image of a vehicle component, a repair order, and a link to additional service information. Other examples of the additional service information are also possible.

In at least some implementations, at least one of the first and second computing devices can determine a condition indicative of the first computing device being unable to display the one or more files with at least a minimum quality level. For example, the first computing device can include a display that is not configured to display video files or particular types of video files (e.g., a high definition video file or a video file having a particular file extension). As another example, the first computing device can be connected to a communication network that is not sufficient for transporting the one or more files for viewing at the first computing device at the minimum quality level, whereas the second computing device is connected to a communication network that is sufficient for transporting the one or more files for viewing at the second computing device at the minimum quality level. As yet another example, the first computing device can be configured to render a webpage, but is unable to traverse a link embedded within the webpage.

In at least some implementations, the communication network used by the first and second computing devices can be the same communication network, such as a cellular data network. In at least some of those implementations, the communication network can include a cellular data network configured with different levels of network technology, such as network technologies that are commonly referred to as 1G, 3G, or 4G (LTE). The first and second computing device can be operated under different service plans offered by a provider of the communication network. For example, the first computing device can be operated under a service plan in which a rate at which the communication network transmits data to the first computing device is throttled back (e.g., reduced) under certain situations, such as a situation in which the first computing device has received more than a threshold amount of data during a particular service time period, or during certain periods of the day (e.g., between a 7:00 AM and 7:00 PM time period). As another example, the second computing device can be operated under a service plan in which the communication network does not throttle back the rate at which data is transmitted to the second computing device. In accordance with the foregoing examples, even if both the first and second computing devices are configured to be able to display the one or more files, the first computing device may not be able to display the one or more files at the minimum quality level if a rate of transmitting data packets carrying portions of the one or more files is throttled back.

In at least some implementations, the communication network used by the first and second computing devices can be different communication networks. For example, the first computing device can be connected to a WI-FI® network and the second computing device can be connected to a cellular network having 4G (LTE) network technology. In accordance with that implementation, even if both the first and second computing devices are configured to be able to display the one or more files, one or the other of the two communication networks may be better suited for providing the one or more files to a computing device connected to that network. Moreover, the signal strength received at one of the first and second computing devices may be relatively greater than the signal received at the other of the first and second computing device.

In at least some implementations, a first computing device operates as a client computing device with respect to a remote server and as a server to a second computing device. The remote server can determine one or more files in response to a request the first computing device sends to the remote server. In some implementations, the remote server serves the one or more files to the first computing device. In those or in other implementations, the remote server serves a link to the one or more files to the first computing device. The first computing device can serve the one or more files and/or the link to the one or more files to the second computing device operating as a client to the first computing device. The first computing device and/or the second computing device can be configured as a diagnostic computing device.

In at least some of the implementations, the first computing device and the second computing device include improvements over existing computing devices such that those implementations provide improvements to a group of machines, especially when further described implementations pertain to at least one server, such as a file server and/or a media server.

Many of the implementations described in this description include displaying one or more files on a display. Any implementation that includes displaying the one or more files can include displaying a commercial on the display prior to displaying the one or more files and/or the one or more files can include a commercial, such as a commercial at the starting point of the one or more files. The commercial can include a video advertisement.

II. Example Systems

FIG. 1A shows a block diagram of a system 100 in accordance with example implementations. The system 100 includes a communication network 102, a diagnostic computing device (DCD) 104, a server 106, a companion computing device (CCD) 108, and a personal area network (PAN) 110.

The communication network 102 can include one communication network or multiple communication networks. Two or more of the multiple communication networks can be operatively coupled to each other. A communication network of the communication network 102 can carry communications over a wired communication network and/or a wireless communication network. In some implementations, a communication network of the communication network 102 includes a circuit-switched digital network and/or a packet-switched network. The communication network 102 includes multiple network devices. As an example, a network device on the communication network 102 can include an access point, an antenna, a base station, a gateway, a hub, a modem, a network cable, a network interface card, a relay, a receiver, a router, a switch, a transceiver, and/or a transmitter. Any one or more of those network devices can be installed in the communication network 102 as an intermediary network device. Other examples of a network device on the communication network 102 are possible.

In some implementations, the communication network 102 includes a local area network (LAN) and/or a wide area network (WAN). The LAN and/or WAN can carry data using packet-switched or circuit-switched technologies. The LAN and/or WAN can include an air interface or a wire to carry the data. The communication network 102 can include a network or at least a portion of a network that carries out communications using a Transmission Control Protocol (TCP) and the Internet Protocol (IP), such as the communication network commonly referred to as the Internet.

The term "data" within this description can be used interchangeably with the term "information" and/or similar terms. Unless stated otherwise, the data described in this description can include a single datum or multiple datum. The data described herein can be transmitted (e.g., uploaded) and/or received (e.g., downloaded). As an example, any transmission of data described herein can occur directly from a transmitting device (e.g., a transmitter) to a receiving device (e.g., a receiver). As another example, any transmission of data described herein can occur indirectly from the transmitter to a receiver via one or more intermediary network devices. The transmission of any of data described herein can include transmitting the data over an air interface (e.g., using radio signals (i.e., wirelessly)). The transmission of any of data described herein can include transmitting the data over a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor" and/or by another term. As an example, transmission of data over the conductor can occur electrically and/or optically. A transmission of data can be referred to as a "communication." A communication can include a "request communication" or a "response communication."

The data can represent various things such as objects and conditions. The objects and conditions can be mapped to a data structure (e.g., a table). A processor can refer to the data structure to determine what object and/or condition is represented by the data. As an example, the data received at a processor can include a vehicle identifier and/or a symptom identifier. The processor can determine other data, such as a content description of one or more files, by determining the content description and/or the one or more files associated with the vehicle identifier and/or the symptom identifier. The data can represent states of a computing device determined at a processor. For example, the data can indicate a state that indicates the level of reception the DCD 104 has from the communication network 102 or a connection state (e.g., connected or not connected) to the PAN 110.

The DCD 104 is a computing device configured to perform diagnostic functions with respect to another object, such as a vehicle and/or an electronic control unit (ECU) within a vehicle. An ECU within a vehicle includes an on-board computing device configured to perform vehicle functions. The ECU can perform the vehicle functions while the ECU is operatively connected to a DCD as well as when the ECU is not operatively connected to a DCD. Although an ECU can be configured to perform self-diagnostics, for purposes of this description the ECU is not a DCD. An ECU is installed within a vehicle. As an example, an ECU can include an ECU installed by a manufacturer of the vehicle, an ECU installed by a technician to replace an ECU installed by the vehicle manufacturer, an ECU installed by a technician to replace an ECU installed by a technician, or an after-market ECU installed by a technician to equip the vehicle to perform one or more additional vehicle functions. A DCD, such as the DCD 104, can be removably attached to a vehicle so that the DCD can perform its diagnostic functions. As an example, a DCD, such as the DCD 104, can be removably attached to a vehicle by removably attaching the DCD to an on-board diagnostics connector, such as a data link connector, within the vehicle. The DCD 104 can include an embedded processor configured to perform a diagnostic function.

The DCD 104 can also be configured to perform non-diagnostic functions with respect to the other object. The non-diagnostic functions can include a programming function, a calibration function, and/or an adjusting function. The DCD 104 can be configured for communicating with multiple computing devices. The multiple computing devices can include an on-board computing device installed within the other object, such as an ECU within a vehicle. The multiple computing devices can also include computing devices off-board both the DCD 104 and the other object. Those off-board computing devices can include the server 106 and the CCD 108 among other off-board computing devices.

The DCD 104 or any described implementation of a DCD can include or be implemented as a portion of a small-form factor portable (i.e., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., a SAMSUNG GALAXY TAB tablet device from Samsung Electronics Co., Ltd.), a wearable computing device (e.g., a wireless web-watch device or a personal headset device), or a personal computing system (e.g., a laptop computer or non-laptop computer configuration).

The CCD 108 is a computing device configured for communicating with multiple computing devices. For example, the CCD 108 can be configured as a client computing device that communicates with the server 106. As another example, the CCD 108 can be configured to communicate with the DCD 104. The CCD 108 and the DCD 104 can communicate with each other over the PAN 110 and/or the communication network 102. The CCD 108 or any described implementation of a CCD can include or be implemented as a portion of a small-form factor portable electronic device such as a smartphone, a tablet device, a wearable computing device, or a personal computing system.

The server 106 is a computing device configured to serve multiple client computing devices, such as the DCD 104 and the CCD 108. The server 106 can communicate with the DCD 104 and the CCD 108 over the communication network 102. As an example, the server 106 can receive a request communication (e.g., a communication with a request) sent over the communication network 102 from the CCD 108. For instance, the request communication can include a request for diagnostic information, a vehicle identifier, a component identifier, and/or a symptom identifier. The server 106 can transmit a response communication (e.g., a response to a request communication) over the communication network 102 to the CCD 108. The response communication can include data the server 106 obtains from a computer-readable memory and/or a database. The data in the response can include a content description and/or a matrix code.

The PAN 110 is a communication network that can be established between two or more computing devices. For example, the PAN 110 can be established between the DCD 104 and the CCD 108. In some implementations, the PAN 110 can include a wired PAN, such a universal serial bus (USB) including a four wire cable. In those or other implementations, the PAN 110 can include a wireless PAN, such as a wireless PAN configured to operate according to one of the following standards: an Institute of Electrical and Electronics Engineers (IEEE®) 802.15 standard (e.g., 802.15.1, 802.15.3, 802.15.4 (ZIGBEE®), or 802.15.5) for wireless personal area networks (PANs), a BLUETOOTH® version 4.1 or 4.2 standard developed by the Bluetooth Special Interest Group (SIG) of Kirkland, Washington, or a wireless USB 1.0 standard maintained by the WiMedia Alliance, Inc., San Ramon, California.

Figure 1B:
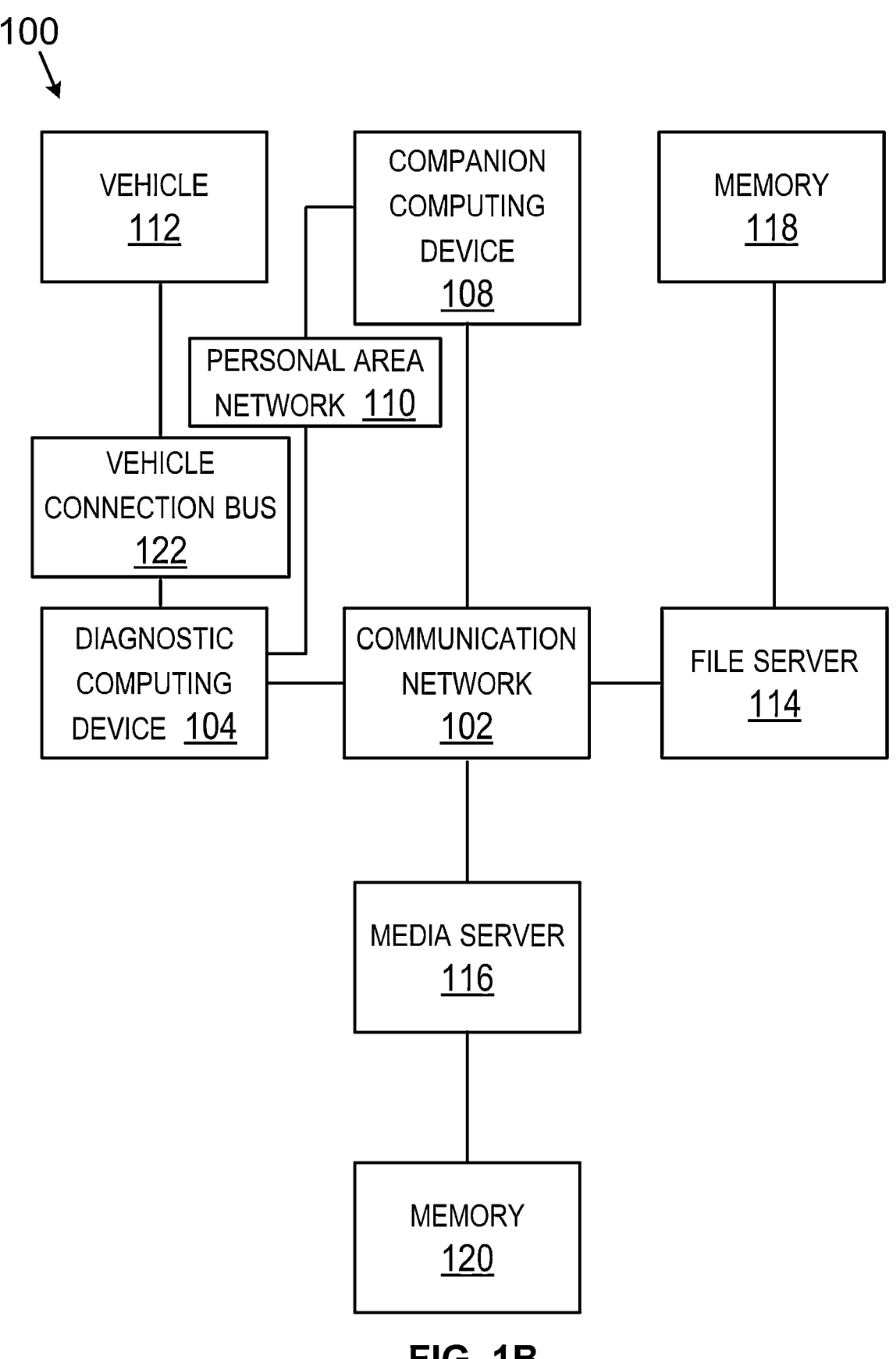
FIG. 1B shows a variation of the system shown in FIG. 1A, according to example implementations.

Next, FIG. 1B shows a variation of the system 100 in accordance with an example implementation. In this variation of the system 100, the server 106 is represented as multiple servers. In other words, in FIG. 1B, the server 106 shown in FIG. 1A is represented as a file server 114 and a media server 116. The terms "file server" and "media server" are used to distinguish the two servers shown in FIG. 1B rather to limit the functionality performed by either of the two servers. In some implementations, the file server 114 and the media server are co-located on the communication network 102. As an example, co-located servers can use the same network address. In other implementations, the file server 114 and the media server are distributed across the communication network. In that case, the file server 114 and the media server 116 can have distinct network addresses.

FIG. 1B also shows the system 100 can include a memory 118 and a memory 120. Although FIG. 1B shows an implementation in which the file server 114 is separated from the memory 118, in alternative implementations, the file server 114 can include and/or be co-located with the memory 118. The memory 118 can contain a database accessible by the file server 114. In particular, the memory 118 can include a link associated with a file stored in the memory 120. Even more particularly, the link stored in the memory 130 can include a video link associated with a video file. As another example, the memory 118 can include a data file and/or an application program. The application program can include an application configured to determine data stored in the memory 118, such as data associated with a vehicle identifier of a vehicle 112, a component identifier of a component located in and/or on the vehicle 112, and/or a symptom identifier of a symptom exhibited by the vehicle 112.

Likewise, although FIG. 1B shows an implementation in which the media server 116 is separated from the memory 120, in alternative implementations the media server 116 can include and/or be co-located with the memory 120. The memory 120 can contain a database assessable by the media server 116. In particular, the memory 120 can include a one or more files associated with the link stored in the memory 118.

Furthermore, FIG. 1B shows the system can include the vehicle 112 and a vehicle communication bus (VCB) 122. The vehicle 112 can be the object upon which the DCD 104 performs diagnostics. In other words, the DCD 104 can be configured to perform vehicle diagnostics with respect to the vehicle 112. Example implementations of the vehicle 112 and the VCB 122 are described below. The DCD 104 can be configured to communicate with the vehicle 112. For instance, the DCD 104 can be configured to transmit a vehicle data message (VDM) to the vehicle 112 and/or to receive a VDM from the vehicle 112. A computing device that is configured to transmit and/or receive a VDM from a vehicle is commonly referred to as a vehicle scan tool. Snap-on Incorporated, Kenosha, Wisconsin, sells high quality vehicle scan tools such as the ZEUS™ Diagnostic and Information System, model number EEMS342 W, and the VERUS® Edge Diagnostic and Information System, model number EEMS330 W.

III. Example System Components

A. Diagnostic Computing Device

Figure 2A:
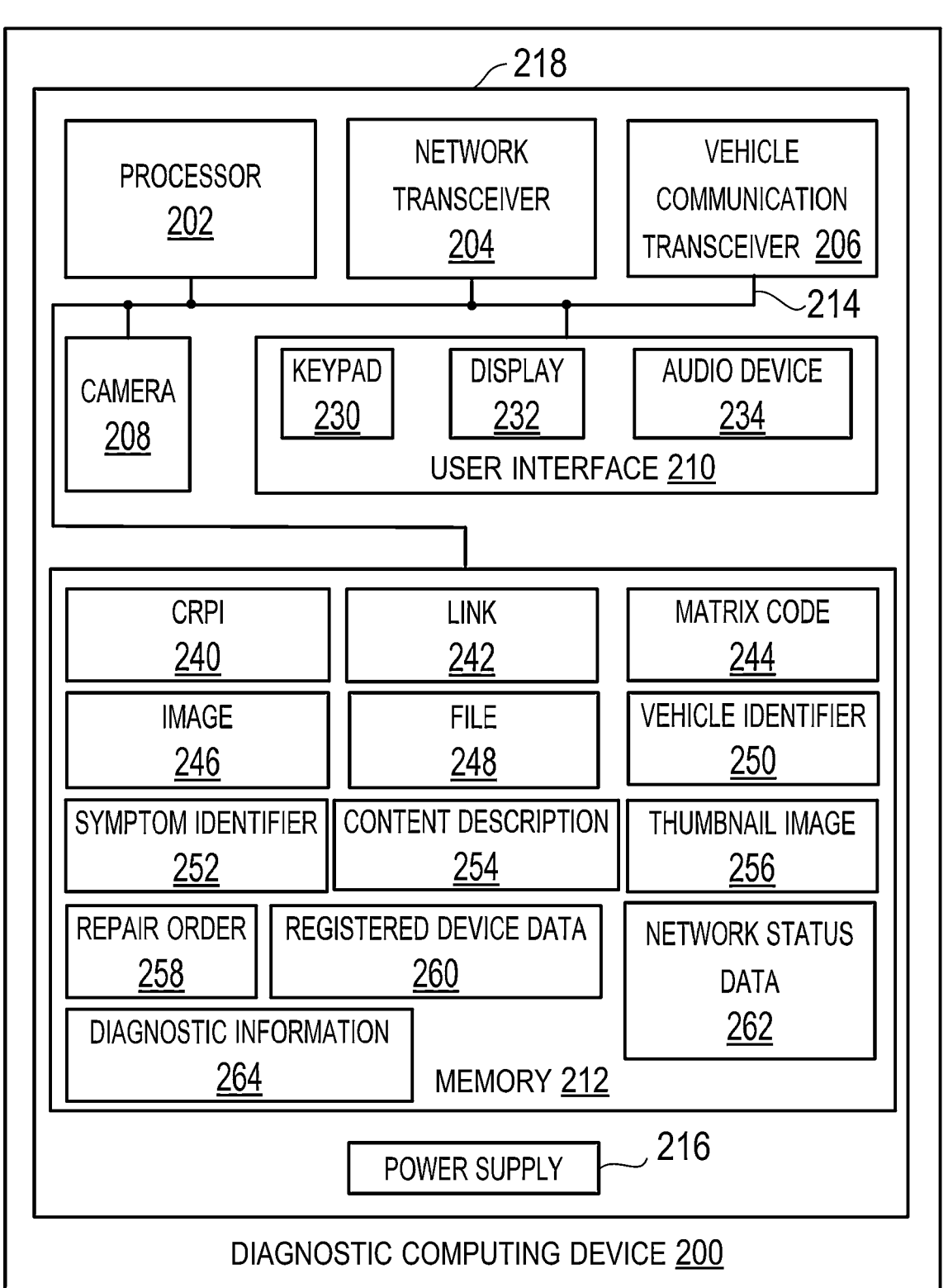
FIG. 2A shows a diagnostic computing device, according to example implementations.

Next, FIG. 2A is a block diagram of a diagnostic computing device 200 in accordance with an example implementation. The DCD 200 is an example implementation of the DCD 104 shown in FIG. 1A and FIG. 1B. The DCD 200 includes a processor 202, a network transceiver 204, a vehicle communication transceiver (VCT) 206, a camera 208, a user interface 210, and a memory 212. Two or more of those components can be operatively coupled or linked together via a system bus or network 214. The DCD 200 also includes a power supply 216 and a housing 218. In other implementations, the DCD 104 includes only a subset of the components of the DCD 200 and/or a portion of the items stored in the memory 212. The DCD 200 or any other DCD described in this description can be referred to more simply as a "computing device."

1. Processor

A processor, such as the processor 202 or any other processor discussed in this description (e.g., a processor 502 shown in FIG. 5), can include one or more processors. Any processor discussed in this description can thus be referred to as "at least one processor" or "one or more processors." A processor can include a general purpose processor (e.g., an INTEL® single core microprocessor or an INTEL® multi-core microprocessor), and/or a special purpose processor (e.g., a digital signal processor, a graphics processor, an embedded processor, or an application specific integrated circuit (ASIC) processor).

A processor can be configured to execute computer-readable program instructions (CRPI). The CRPI discussed in this disclosure, such as the CRPI 240 (shown in FIG. 2A), and/or the CRPI 510, 530, 570 (shown in FIG. 5A, 5B, 5C, respectively), can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. A processor can include and/or be used with a memory controller. A processor can be configured to execute hard-coded functionality in addition to or as an alternative to software-coded functionality (e.g., via CRPI). The processor 202 can be programmed to perform any function or combination of functions described herein as being performed by the DCD 200.

An embedded processor refers to a processor with a dedicated function or functions within a larger electronic, mechanical, pneumatic, and/or hydraulic device, and is contrasted with a general-purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the processor 202 can include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general-purpose processor, a special-purpose processor, and/or or an embedded processor can perform analog signal processing and/or digital signal processing.

2. Memory

A memory, such as the memory 212 or any other memory discussed in this description (e.g., a memory 506 shown in FIG. 5), can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid-state drive (SSD), or a tape drive.

A transitory memory can include, for example, CRPI provided over a communication network, such as the communication network 102.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the network transceiver 204, the VCT 206, and/or any other transceiver discussed in this description (e.g., the network transceiver 504 shown in FIG. 5), can include one or more transceivers. Each transceiver includes one or more transmitters configured to transmit data onto a network, such as the communication network 102, and/or a system bus or network. Each transceiver includes one or more receivers configured to receive data or a communication carried over a network, such as the communication network 102 and/or a system bus or network. Unless stated differently, any data described as being transmitted to a device is considered to be received by that device. Similarly, unless stated differently, any data described as being received from a device is considered to be transmitted by that device (directly or indirectly). For some implementations, a transceiver can include a transmitter and a receiver in a single semiconductor chip. In at least some of those implementations, the semiconductor chip can include a processor.

In at least some of the implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15.3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoW-PAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, or (xviii) the LoRaWAN communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto a wire (e.g., one or more wires). Similarly, a receiver, such as a receiver within any transceiver described in this description, can be configured to receive via a wire a signal carrying or representing data over the wire. The wire can be part of a network, such as the communication network 102. The signal carried over a wire can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a USB specification (as previously described), or some other wired communication standard.

A transceiver that is configured to carry out communications over the communication network 102, such as the network transceiver 204, 504, can include at least one of: a modem, a network interface card, or a chip mountable on a circuit board. As an example, the chip can include a CC3100

Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A network device within and/or coupled to the communication network 102 and/or that communicates via the communication network 102 using a packet-switched technology can be locally configured for a next 'hop' in the communication network 102 (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The data transmitted by a transceiver can include a destination identifier or address of a network device to which the data is to be transmitted. The data or communication transmitted by a transceiver can include a source identifier or address of the system component including the network transceiver. The source identifier or address can be used to send a response to the network device that includes the network transceiver that transmitted the data.

The network transceiver 204 can transmit any data and/or computer-readable file discussed as being transmitted, output, and/or provided by the DCD 104, 200. The network transceiver 204 can receive any data and/or computer-readable file discussed as being received by the DCD 104, 200. As an example, the network transceiver 204 can receive a communication including a link and/or a content description. As another example, the network transceiver 204 can receive a communication including a link, a content description, and/or a matrix code. The link can include a uniform resource indicator (URI). The content description can include data the processor 202 uses to determine whether the DCD 200 can display the one or more files described by the content description. The content description can include a link. The communication can include a webpage including the content description.

Figures 3A, 3B:
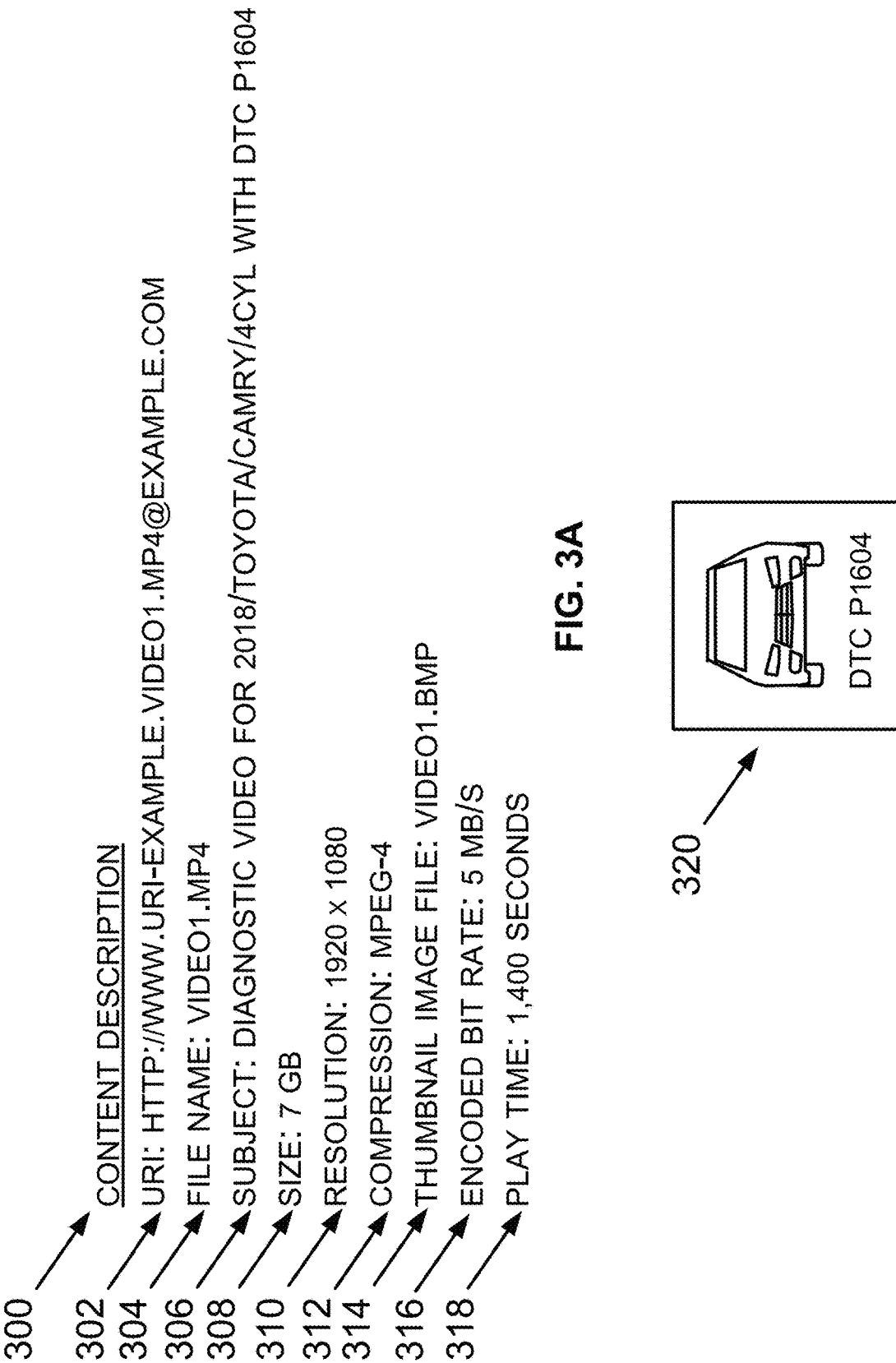
FIG. 3A shows a video description, according to example implementations.
FIG. 3B shows a thumbnail image, according to example implementations.

Turning to FIG. 3A, this figure depicts, in accordance with an example implementation, a content description 300 that a server, such as the file server 114, can transmit over the communication network 102 in a communication to the DCD 104. As shown in FIG. 3A, the content description 300 includes a URI 302, a file name 304, a subject description 306, a file size 308, a video resolution 310, a video compression type 312, a thumbnail image name 314, the encoded bit rate 316, and/or the play-time 318. As an example, the thumbnail image name 314 can be the name of a thumbnail image 256 (shown in FIG. 2A).

Next, FIG. 3B shows a visual representation 320 of displaying the thumbnail image 256. The thumbnail image 256 can be part of the content description 300 and/or can be included within a communication including the content description 300. Alternatively, the thumbnail image 256 can be transmitted to the DCD 200 from the server 106, the file server 114, or the media server 116 via a communication separate from the communication including the content description 300.

Next, FIG. 4 shows a matrix code 400 of a matrix code 244 (shown in FIG. 2A). In some implementations, the matrix code 244 is included as part of the content description 300 and/or is included within the communication including the content description 300. In other implementations, the matrix code 244 is transmitted to the DCD 200 from the server 106, the file server 114, or the media server 116 via a communication separate from the communication including the content description 300. For example, the communication can include an image file representing the matrix code 400. In still other implementations, the processor 202 generates the matrix code 244 based on at least a portion of the content description 300. For example, the processor 202 can generate the matrix code 244 based on the URI 302. In any of the foregoing implementations or some other implementation, the matrix code can be part of a webpage transmitted to the DCD 200.

Returning to FIG. 2A, the VCT 206 includes a transceiver configured for transmitting a VDM to the vehicle 112 via the VCB 122 and for receiving a VDM transmitted by the vehicle 112 via the VCB 122. The VDM transmitted to the vehicle 112 can include a request for diagnostic information (such as a DTC) from an electronic control unit (ECU) within the vehicle 112. A receiver of the VCT 206 can be configured to receive a VDM transmitted by the vehicle 112 over the VCB 122. A VDM received by the receiver of the VCT 206 can include diagnostic information transmitted by the ECU. A VDM can include a component identifier, such as an identifier of the ECU that transmitted the VDM. The VDM can include data indicative of a DTC set by the ECU. The processor 202 can select data from within the VDM and cause the selected data to be displayed on a display 232 (shown in FIG. 2A). As an example, the VCT 206 can include a wired transceiver, such as a transceiver having a system basis chip with high speed CAN transceiver 33989 provided by NXP Semiconductors, Eindhoven, Netherlands.

The VCB 122 can include a wiring harness and/or an air interface for operatively coupling the DCD 104, 200 and the vehicle 112 to allow the DCD 104, 200 and the vehicle 112 to communicate with one another. In some implementations, the wiring harness can be removably connectable to a data link connector (DLC) within the vehicle 112. In those implementations, the DLC can provide the DCD 104, 200 with an indirect connection to an ECU in the vehicle 112. The VCT 206 can include and/or connect to one or more connectors, one of which can be located at the end of the wiring harness. The VCT 206 can include a wireless transceiver to communicate with a wireless transceiver within the vehicle 112.

4. User Interface Components

In some implementations, the user interface 210 includes a keypad 230. The keypad 230 can include one or more components configured for entering data into the DCD 104, 200. As an example, the data entered by the keypad 230 can include at least one of: vehicle model information, symptom information, and/or selections of options displayed on the display 232. The vehicle model information can include a vehicle model identifier or one or more vehicle model attributes that can be used to determine a vehicle identifier.

The keypad 230 can include one or more keys. In some implementations, each key includes a push button, such as a press-and-hold button or a press-and-release button. In some implementations, at least a portion of the keypad 230 in implemented as part of a touch screen display that includes soft keys, such as capacitive or resistive keys of a touch screen display. In still other implementations, the soft keys of the keypad 230 on the touch screen display can include a power on/off key, a yes key and a no key, or four cursor keys.

Figures 16A, 16B:
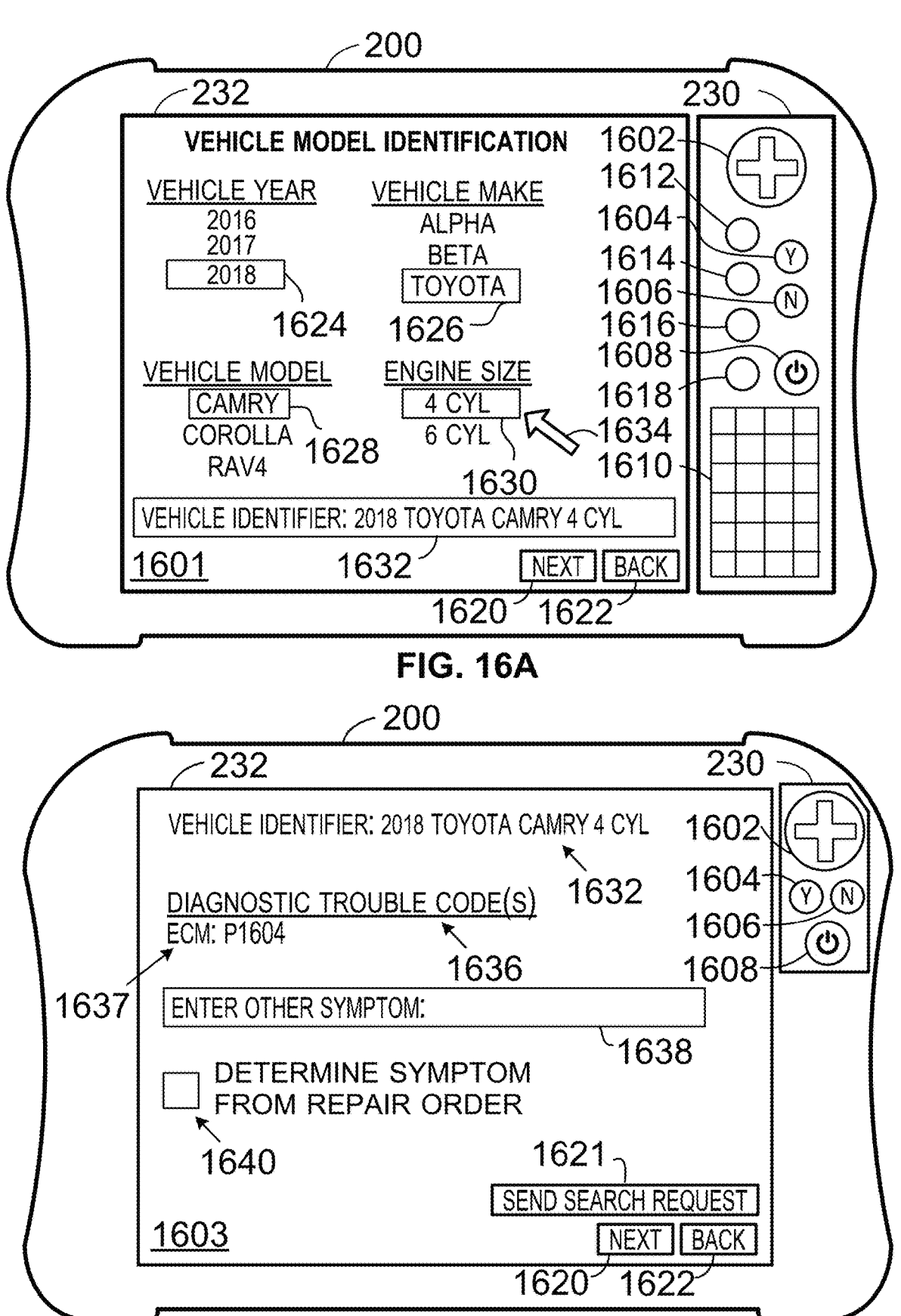
FIGS. 16A, 16B, 16C, 16D, 16E, 16F, 16G, 16H, 16I, 16J, 16K and 16L illustrate display outputs shown on a display of a computing device, according to example implementations.

FIG. 16A shows an example implementation of the keypad 230. In this implementation, the keypad 230 includes a directional keypad 1602 for selecting up, down, left and/or right movements, a yes button 1604 selectable to signify a selection of yes, a no button 1606 selectable to signify a selection of no, a power button 1608, a multi-button keypad 1610, and buttons 1612, 1614, 1616, 1618. The multi-button keypad 1610 can include a set of numeric keys, alphanumeric keys, alphabet keys, or keys for entering some other combinations of letters, numbers, or symbols (e.g., punctuation symbols). A button, such as the button 1612, 1614, 1616, 1618 can be a reconfigurable button conditioned on a selection displayed on the display 232 in proximity (e.g., within six centimeters) and/or adjacent to the button. As an example, a movement selected using the directional keypad 1602 can include a movement of a pointer 1634. As another example, a movement selected using the direction keypad 1602 can include moving within a list of selectable terms, such as the vehicle year terms "2016," "2017," and "2018" within a vehicle model year selection 1624.

Next, FIG. 16B shows a variation of the keypad 230. In FIG. 16B, the keypad 230 has fewer keys as compared to the implementation of the keypad 230 shown in FIG. 16A. In FIG. 16B, the keypad 230 includes the direction keypad 1602, the yes button 1604, the no button 1606, and the power button 1608. The display 232 can be configured with portions of the touch screen representing (1) selections of up, down, left and right movements or selections similar to those selectable using the directional keypad 1602, (2) a selection of yes similar to the selection selectable using the yes button 1604, or (3) a selection of no similar to the selection selectable using the no button 1606.

Figures 16C, 16D:
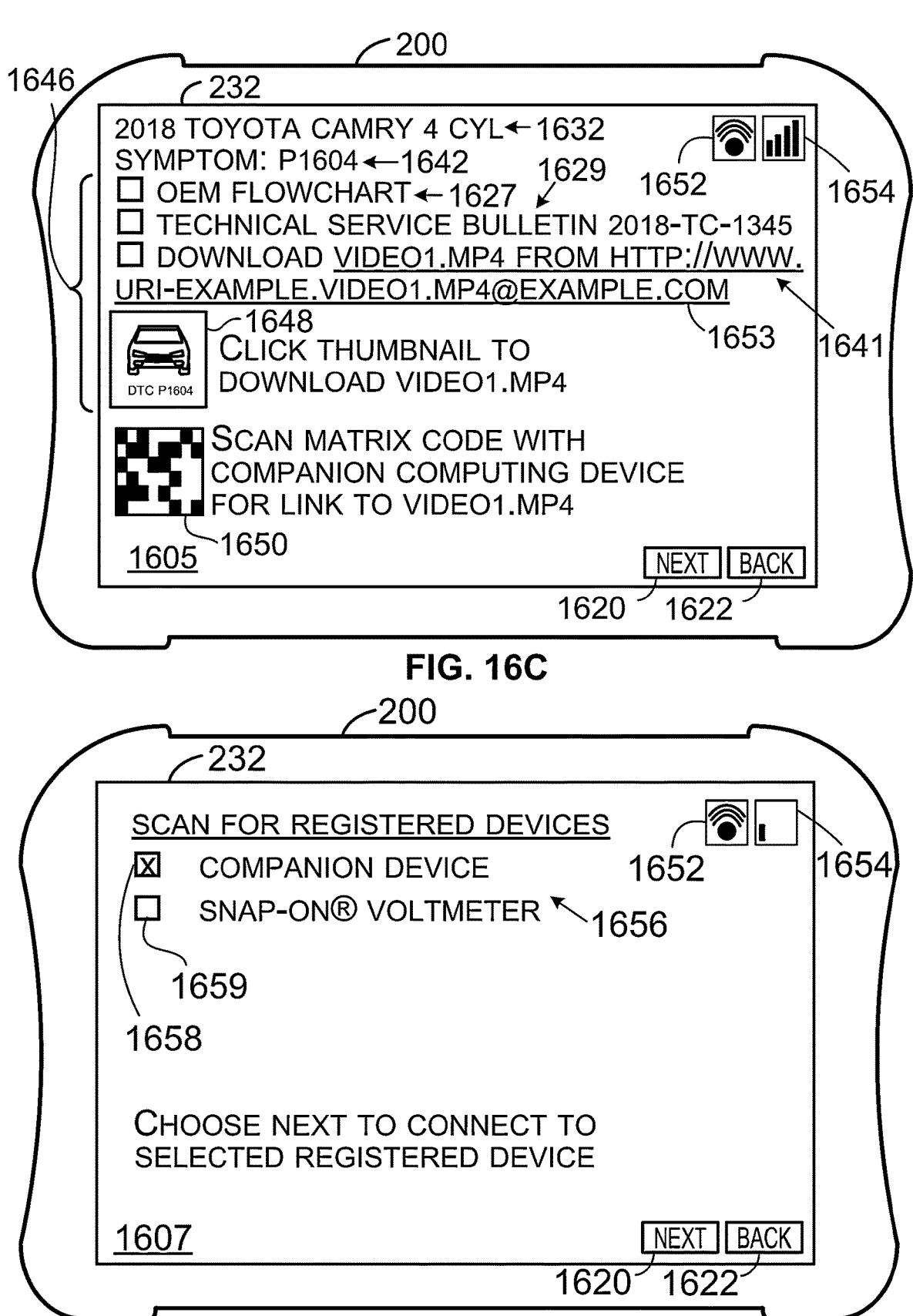

Next, FIG. 16C depicts a variation of the keypad 230 that differs from the variations of the keypad 230 shown in FIG. 16A and FIG. 16B. In this variation, the DCD 200 includes the display 232 (e.g., a touch screen display), but does not include any hardware keys. In this implementation, a touch screen input to the display 232 can cause the DCD 200 to (1) change states from a sleep mode to a power-on mode, (2) make a selection, such as any selection (described in this description) as being made via the DCD 200, (3) change states from a power-on mode to a sleep mode, and/or (4) display any display output shown in the figures. As an example, the DCD 200 configured without any hardware keys can minimize battery usage by the DCD 200, such as by turning off a backlighting for the display 232, during the sleep mode. The DCD 200 that includes at least one hardware key can also implement the power-on and sleep modes.

The user interface 210 includes the display 232. The display 232 can include one or more displays. As an example, each display of the one or more displays can include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can include a backlit, color LCD. The display 232 can include a touch screen display with the LCD. For instance, the display 232 can include a capacitive or resistive touch screen display. Other examples of the display 232 are also possible.

The display 232 can display still images, such as a thumbnail image and/or an image of a matrix code. The display 232 can display text, such as textual diagnostic information. The display 232 can display a webpage, such as a webpage including a content description, a web-resource link, and/or a matrix code. In at least some implementations, the display 232 can display a graphical user interface (GUI) via which a user can input a selection pertaining to use of the DCD 104, 200. In at least some implementations, the display 232 can include a horizontal scroll bar and a vertical scroll bar. The horizontal scroll bar and the vertical scroll bar can be used to cause the display 232 to display content not currently displayed on the display 232. In at least some implementations, the display 232 can display videos. The display 232 can display any content shown in a display output shown in FIG. 16A to 16L. Other examples of content displayable on the display 232 are possible.

The user interface 210 can include an audio device 234. The audio device 234 can include one or more audio components. In some implementations, the audio device 234 can include at least one microphone and/or at least one speaker. The system bus or network 214 connected to the audio device 234 can include electrical circuitry for providing the processor 202 with inputs representing voice commands received by the at least one microphone. The voice commands can include commands representing selections and data that are described as being input using the keypad 230. The processor 202 can output signals to the at least one speaker to cause the at least one speaker to procedure audible sounds. As an example, the audible sounds can include instructions for using the DCD 200. As another example, the audible sounds can include sound from a video file.

5. Additional Components

A camera, such as the camera 208 and/or any other camera discussed in this description (e.g., the camera 267 shown in FIG. 2B) can include one or more cameras configured for capturing an image. As an example, the camera 208, 267 can include at least one of: an image scanner, a barcode scanner, a visual light camera, a thermal camera, a light source, a lens, or an image sensor. A data file representative of a captured image (capture by the camera 208) can be stored in the memory 212 as the image 246. As an example, the captured image can include at least one of: an image of the vehicle 112, or an image of some portion of the vehicle 112, such as a VIN label attached to the vehicle 112. As another example, the image 246 can include an image representing a scanned barcode, such as the barcode on a VIN label attached to the vehicle 112.

The power supply 216 can be configured in any of a variety of configurations or combinations of the variety of configurations. As an example, the power supply 216 can include circuitry to receive AC current from an AC electrical supply (e.g., electrical circuits operatively connected to an electrical wall outlet) and convert the AC current to a DC current for supplying to one or more of the components within the DCD 200. As another example, the power supply 216 can include a battery or be battery operated. As yet another example, the power supply 216 can include a solar cell or be solar operated. The power supply 216 can include electrical circuits to distribute electrical current throughout the DCD 200. Other examples of the power supply 216 are also possible.

The housing 218 can surround at least a portion of the processor 202, at least a portion of the network transceiver 204, at least a portion of the VCT 206, at least a portion of the camera 208, at least a portion of the user interface 210, at least a portion of the memory 212, and/or at least a portion of the system bus or network 214. The housing 218 can be referred to as an enclosure. The housing 218 can support a substrate. At least a portion of the processor 202, at least a portion of the network transceiver 204, at least a portion of the VCT 206, at least a portion of the camera 208, at least a portion of the user interface 210, at least a portion of the memory 212, and/or at least a portion of the system bus or network 214 can be mounted on and/or connect to the substrate. The housing 218 can be made from various materials. For example, the housing 218 can be made from a plastic material (e.g., acrylonitrile butadiene styrene (ABS)) and a thermoplastic elastomer used to form a grip on the housing 218.

6. Memory Content

The memory 212 stores computer-readable data. As an example, the memory 212 contains the CRPI 240, a link 242, a matrix code 244, an image 246, a file 248, a vehicle identifier 250, a symptom identifier 252, a content description 254, a thumbnail image 256, a repair order (RO) 258, registered device data 260, network status data 262, and/or diagnostic information 264. As an example, the link 242 can include a video link the DCD 104, 200 receives over communication network 102 from the server 106, the file server 114, or the media server 116. As another example, the link 242 can include a URI, such as the URI 302. A link, such as the link 242, and/or a URI, such as the URI 302, can be referred to as a "web-resource link."

In some implementations, the matrix code 244 includes a matrix code file representing a matrix code that can be printed and/or displayed (e.g., the matrix code 400). The matrix code file can include hypertext markup language (HTML) code, a PNG file, a TIFF file, an SVG file or an EPS file. The network transceiver 204 can receive a communication from the server 106, the file server 114, or the media server 116 including the matrix code 244. The processor 202 can extract the matrix code from the communication and store the matrix code as the matrix code 244. As an example, the matrix code 244 can be configured as a QR® matrix code, a Data Matrix matrix code, a MaxiCode matrix code, an Aztec Code matrix code or some other matrix code.

The RO 258 includes a record regarding a repair session of a vehicle, such as the vehicle 112. The RO 258 can include a vehicle identifier of the vehicle to be serviced and a symptom identifier of a symptom exhibited by the vehicle 112. The network transceiver 204 can receive the RO 258 over the communication network 102 from the server 106, the file server 114, or the media server 116.

The vehicle identifier 250 can include an identifier of the vehicle 112. The processor 202 can determine the vehicle identifier 250 and cause the memory 212 to store the vehicle identifier 250. As an example, the processor 202 can determine the vehicle identifier 250 from a VDM the VCT 206 receives from the vehicle 112. As another example, the processor 202 can determine the vehicle identifier 250 from an image captured by the camera 208, such as an image of a VIN tag on the vehicle 112. As yet another example, the processor 202 can determine the vehicle identifier 250 from a vehicle identifier contained on the RO 258. As still yet another example, the processor 202 can determine the vehicle identifier 250 based on selections made via the display 232, such as a selection that can be made via a display output 1601 shown in FIG. 16A.

The symptom identifier 252 can include an identifier of a symptom of an object to be diagnosed, such as a vehicle symptom of the vehicle 112. The processor 202 can determine the symptom identifier 252 and can cause the memory 212 to store symptom identifier 252. As an example, the processor 202 can determine the symptom identifier 252 from a VDM the VCT 206 received from the vehicle 112. For instance, that VDM may include a DTC identifier of a DTC set by an ECU in the vehicle 112. As yet another example, the processor 202 can determine the symptom identifier 252 from a symptom contained on the RO 258. As still yet another example, the processor 202 can determine the symptom identifier 252 based on selections made via the display 232, such as a selection that can be made via a display output 1603 shown in FIG. 16B.

The file 248 includes a computer-readable file configured to be output to and/or displayed on a display, and/or configured to be read by the processor 202. In some implementations, the file 248 cannot be displayed on the display 232. In other implementations, the file 248 can be displayed on the display 232, but only below a minimum quality level. In still other implementations, the file 248 can be displayed on the display with at least the minimum quality level. In any of the foregoing implementation, the file 248 can be displayed by a different display, such as a display of the CCD 108. The content description 254 can include a description of the file 248.

As an example, the file 248 can include a video file the network transceiver 204 received over the communication network 102. The memory 212 can include one or more buffers configured for storing portions of the file 248, such that the file 248 only includes a portion of a file streamed from the media server 116. The portions of the file 248 can include portions of the file 248 transferred to the network transceiver 204 via data packets including the portions of the file 248. In some implementations, the file 248 includes multiple video files. As an example, the file 248 can include a video file. In accordance with that example, the video file can include a video file in one of the following video file formats: (1) audio video interleave (AVI), (2) advanced systems format (ASF), (3) quick time (QT), (4) advanced video coding, high definition (AVCHD), (5) flash video (FLV), (6) moving pictures expert group (MPEG, such as MP4), or (7) Windows Media Video (WMV).

As another example, the file 248 can include a web page file, such as an HTML file for a web page including a link configured to be traversed by a web browser.

As another example, the file 248 can include a file based on a mark-up language protocol, such as an extensible mark-up language (XML) file or a web services description language (WSDL) file. In some implementations, the mark-up language protocol can include the simple object access protocol (SOAP) configured for exchanging information to carry out a web-service over the communication network 102.

In some implementations, the memory 212 does not include the file 248. In at least some of those implementations, the DCD 200 may not download a computer-readable file for storing as the file 248 and for providing to the CCD 108 because the CCD 108 can receive a computer-readable file directly from the server 106 instead of receiving the file 248 from the DCD 200. In at least some of those implementations, a network connection available between the CCD 108 and the server 106 may be a better network condition than a network connection available between the DCD 200 and the server 106.

The image 246 can include an image captured by the camera 208. As an example, the image 246 can include an image of a bar code encoding a VIN of the vehicle 112. As another example, the image 246 can include an image the network transceiver 204 received from the server 106, the file server 114, or the media server 116 as part of diagnostic information associated with the vehicle identifier and/or the symptom identifier. As yet another example, the image 246 can include an image of a matrix code displayed on the CCD 108, 261.

Figure 5B:
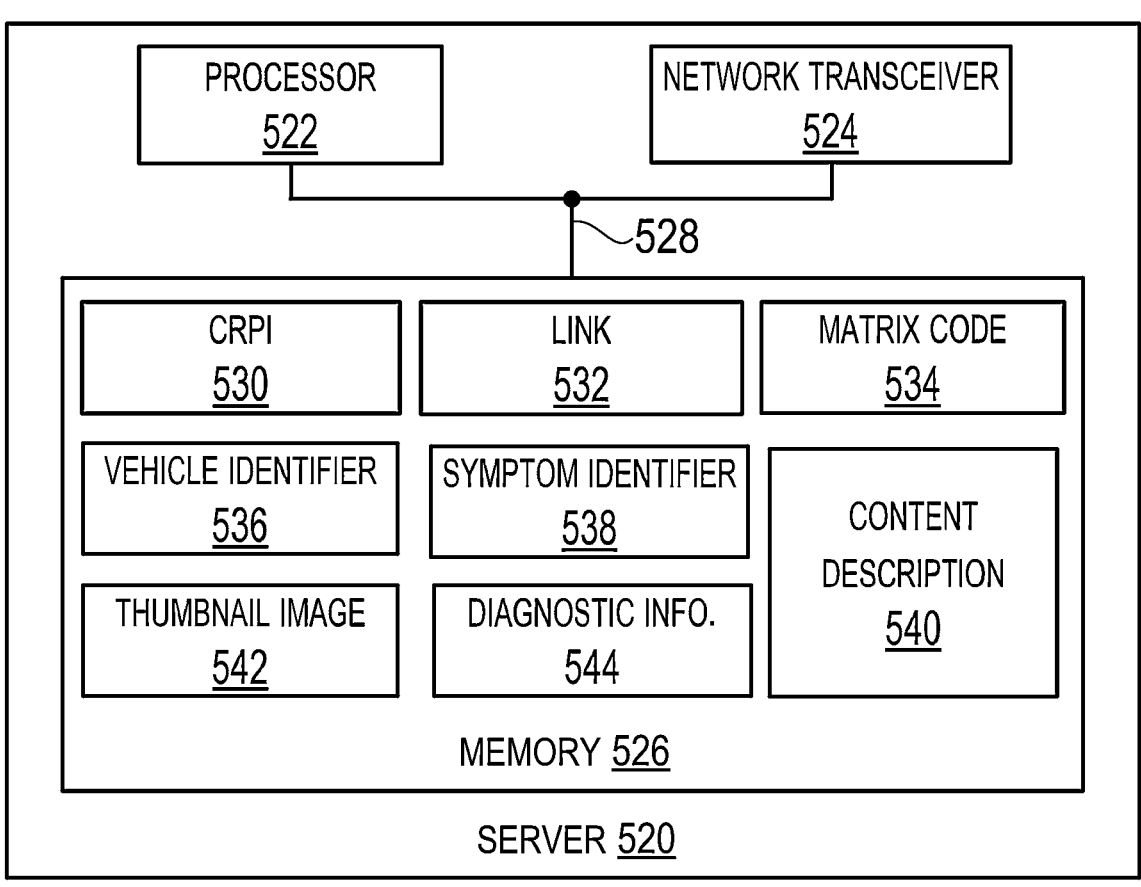
Figure 5C:
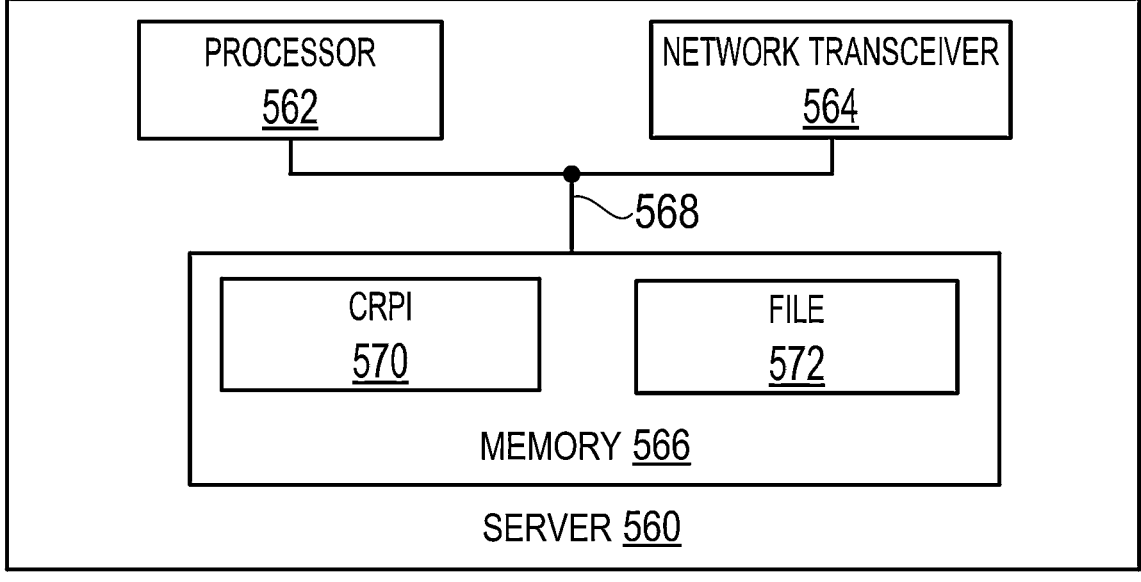

The content description 254 includes data describing a computer-readable file, such as the file 248, 572 (shown in FIG. 5C). In implementations in which the memory 212 contains the file 248, the content description 254 can include data describing the file 248. In implementations in which the memory 212 does not contain the file 248, the content description 254 can include data describing the file 572. The files 248, 572 can be associated with the vehicle identifier 250 and/or the symptom identifier 252. For the implementations in which the file 248, 572 includes a video file, the content description 254 can include data the processor 202 can use to determine whether the file 248, 572 can be played at the DCD 200 with at least a minimum video quality level. The network transceiver 204 can receive the content description 254 over the communication network 102 from the server 106, the file server 114, or the media server 116 in response to a search request based on the vehicle identifier 250 and/or the symptom identifier 252. The content description 254 can include some or all of the types of data contained in the content description 300 shown in FIG. 3.

The thumbnail image 256 can include a still image from the file 248. The network transceiver 204 can receive the thumbnail image 256 from the server 106, the file server 114, or the media server 116 in response to a search request based on the vehicle identifier 250 and/or the symptom identifier 252. The processor 202 can output the thumbnail image 256 to a display, such as the display 232 and/or to a device including a display, such as the CCD 108. The thumbnail image 256 can be shown on a display to give a viewer of the thumbnail image 256 information for determining whether to watch the file 248. In at least some implementations in which the memory 212 does not include the file 248, the memory 212 does not include the thumbnail image 256. In at least some implementations in which the file 248 includes a computer-readable file other than a video file, such as an implementation in which the file 248 includes a web page including a link configured to be traversed by a web browser, the memory 212 does not include a thumbnail image 256.

The registered device data 260 can include data regarding another computing device registered with the DCD 200. The data regarding the other computing device can include an identifier of the other computing and/or network status data indicating a status of a connection the other computing device has with a communication network. The status can indicate connected, not connected, a signal strength, and/or a data rate. As an example, the registered device data 260 can include a forty-eight bit address of a device configured to communicate according to a BLUETOOTH® standard, and paired with DCD 200.

The network status data 262 can indicate a status of the DCD being connected to the communication network 102. As an example, the status can indicate connected, not connected, a signal strength, and/or a data rate.

The diagnostic information 264 can include diagnostic information received in a response to a search request, such as the diagnostic information 644, 652 (shown in FIGS. 6B and 6C). As another example, the diagnostic information 264 can include a diagnostic flow chart, a technical service bulletin, a description of a DTC, or some other diagnostic information.

The CRPI 240 can include CRPI executable by the processor 202 to generate the matrix code 244. A matrix code generated by the processor 202 can encode data representing the link 242.

The CRPI 240 can include CRPI executable by the processor 202 to output the matrix code 244 to a display, such as the display 232, and/or to a device having a display, such as the CCD 108. Those CRPI can cause the display 232 to display the matrix code 244. The CRPI 240 can cause the display 232 to display an indication of the network status of the DCD 200.

The CRPI 240 can include CRPI executable by the processor 202 as a codec for encoding and/or decoding a stream of data, such as a stream of data packets including portions of the file 248.

The CRPI 240 can include CRPI executable by the processor 202 to determine a signal strength of wireless communications the network transceiver 204 is receiving from an air interface of the communication network 102. The CRPI 240 can include CRPI executable by the processor 202 to output an indicator of the signal strength on the display 232 and/or to cause the network transceiver 204 to transmit a communication to the CCD 108, 261 indicative of the signal strength experienced by the network transceiver 204.

The CRPI 240 can include CRPI executable by the processor 202 to determine a network status of the DCD 200 (e.g., connected, not connected, signal strength, and/or data rate). The CRPI 240 can include CRPI executable by the processor 202 to transmit the network status of the DCD 104, 200 to the CCD 108, 261. The processor 202 may store and/or obtain the network status from the network status data 262 stored in the memory 212.

The CRPI 240 can include CRPI executable by the processor 202 to determine network accessibility of the network transceiver 204. In some implementations, the network transceiver 204 includes multiple Wi-Fi® transceivers, such as a 2.4 GHz Wi-Fi® transceiver configured to support data transmissions up to 600 Megabits per second (Mbps) and a 5.0 GHz Wi-Fi® transceiver configured to support data transmissions up to 1,300 Mbps. In those or other implementations, the network transceiver 204 includes at least one transceiver configured to access cellular communication networks, such as least one transceiver configured to access cellular communication networks that support the CDMA 1×RTT, the CDMA 2000 1×EV-DO, and an LTE radio access technology such as an orthogonal frequency division multiple access (OFDMA) and single-carrier frequency division multiple access (SC-FDMA) radio access technologies. By determining which type(s) of networks the network transceiver 204 can access, the processor 202 can use the data regarding the accessible network when making a determination as to whether a condition exists in which the DCD 200 is unable to display a video with at least a minimum video quality level.

The CRPI 240 can include CRPI executable by the processor 202 to determine a speed of a network accessible to the network transceiver 204. Those CRPI can include causing the network transceiver 204 to request performance of a network speed test, such as a network speed test between the DCD 200 and a server on the communication network 102. The result of the network speed test can, for example, indicate a download speed and/or an upload speed. The indicated speeds can be in Mbps. As an example, servers operated by or for Netflix, Inc. of Los Gatos, California perform network speed tests at the uniform resource locator made up of the following string: "https" and "://fast.com." Additionally or alternatively, the CRPI executable to determine the speed of a network can include the processor 202 transmitting a request for data and determining a network speed based on how much data is received in response to the request and how long it takes to receive the response.

The CRPI 240 can include CRPI executable by the processor 202 to establish a connection with a registered computing device. Establishing the connection with the registered computing device can include transmitting a request to the registered computing device requesting establishing a connection and/or receiving a request from the registered computing device requesting a connection. The CRPI 240 can include CRPI executable by the processor 202 to request a network status of a registered computing connected to the DCD 104, 200 and/or to receive a communication from the CCD 108, 261 indicating a network status of the CCD 108, 261. The network status received from the CCD 108, 261 can be stored in the memory 212 as part of the registered device data 260.

The CRPI 240 can include CRPI configured as an application executable by the processor 202. As an example, the application can be executable for performing a diagnostic function. In some implementations, performing the diagnostic function includes performing a diagnostic function that includes transmission of a communication to or from the vehicle 112 using the VCT 206 and/or a diagnostic function that includes performing transmission of a communication to or from the server 106 using the network transceiver 204. In those or in other implementations, performing the diagnostic function includes the processor 202 outputting at least a portion of the diagnostic information 264 to the display 232. The diagnostic information output to the display can be determined based on a communication from the vehicle 112, the server 106, and/or use of the user interface 210. Performing the diagnostic function can include requesting performance of a web-service by the server 106.

The CRPI 240 can include CRPI executable by the processor 202 to access a web-service from the server 106 and/or another server described in this description. As an example, the processor 202 can execute the CRPI to request, receive and/or read a WSDL file. In some implementations, the memory 212 stores the WSDL file for the processor 202 to read when performance of the web-service is desired. In other implementations, the processor 202 requests the WSDL file from the server 106 before reading the WSDL file.

The CRPI 240 can include CRPI executable by the processor 202 to perform any function(s) described in the sets 600, 700, 800, 900, 1000, 1100, 1200, 1300, 1400, and/or 1500 (shown in FIGS. 6A, and 7-15) as being performed by the DCD 104, 200 and/or a component of the DCD 104, 200.

B. Example Companion Computing Device

Figure 2B:
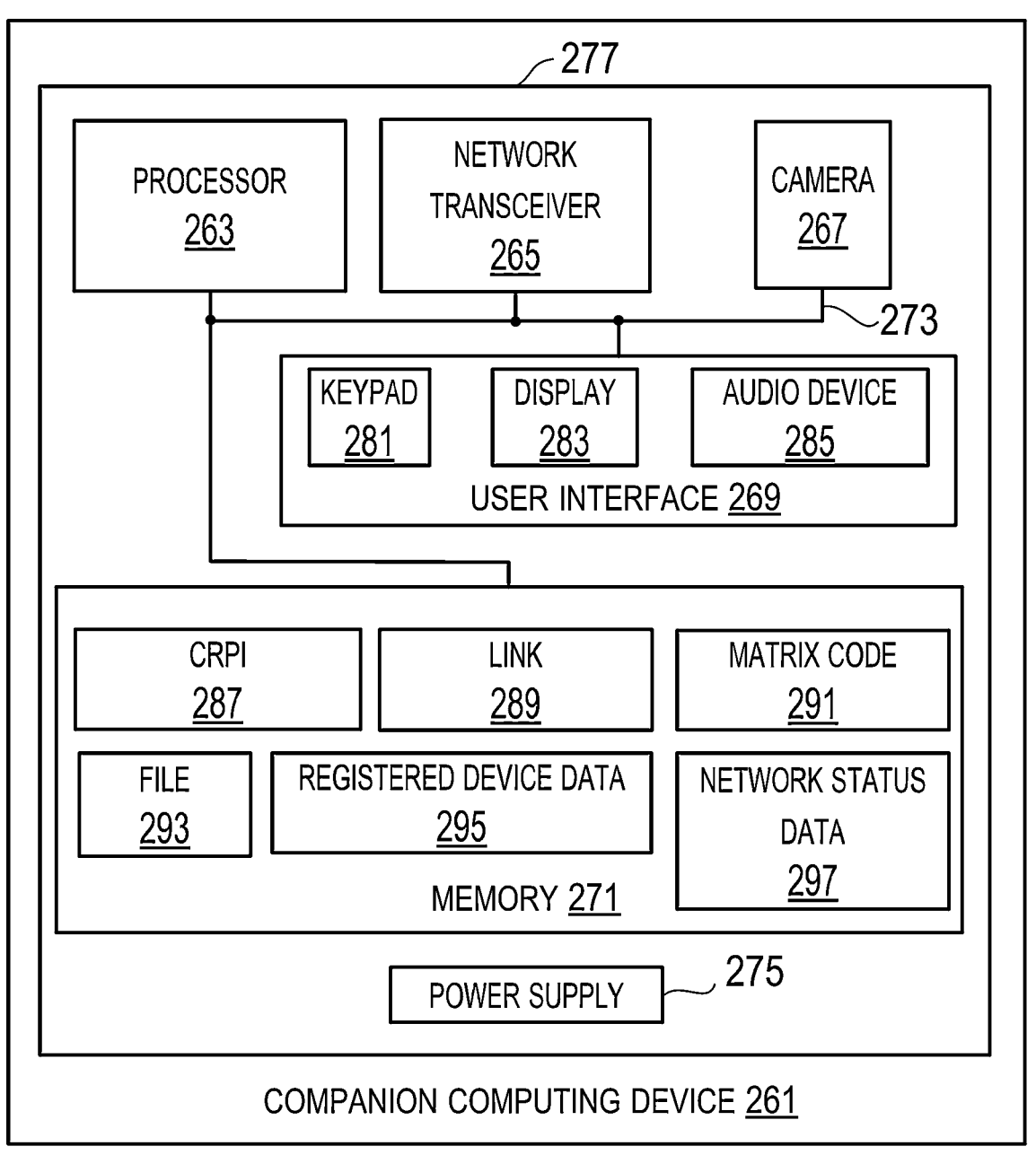
FIG. 2B shows a companion computing device, according to example implementations.

Next, FIG. 2B is a block diagram of a companion computing device 261 in accordance with at least some of the example implementations. The CCD 261 is an example implementation of the CCD 108 shown in FIG. 1A and FIG. 1B. The CCD 261 includes a processor 263, a network transceiver 265, a camera 267, a user interface 269, and a memory 271. Two or more of those components can be operatively coupled or linked together via a system bus or network 273. The CCD 261 also includes a power supply 275 and a housing 277. In other implementations, the CCD 108 includes only a subset of the components of the CCD 261 and/or a portion of the content in the memory 271. The CCD 261 or any other CCD described in this description can be referred to more simply as a "computing device."

The user interface 269 includes one or more of a keypad 281, a display 283, and/or an audio device 285. The user interface 269 can include a selector for inputting data into the processor 263, such as an input to request a video file, a web page file, or other file from a media server. The display 283 can be configured to display a link 289, a matrix code, 291, and/or a file 293. The audio device 285 can include an audio speaker configured to output an audio portion of the file 293.

The memory 271 includes CRPI 287 executable by the processor 263, a link 289, a matrix code 291, the file 293, registered device data 295, and network status data 297. The matrix code 291 can include an image of matrix code captured by the camera 267. The matrix code represented in that image can be the matrix code 244 displayed on the display 232.

The registered device data 295 can include data regarding another computing device registered with the CCD 261. The data regarding the other computing device can include an identifier of the other computing and/or network status data indicating a status of a connection the other computing device has with a communication network. The status can indicate connected, not connected, a signal strength, and/or a data rate. As an example, the registered device data 295 can include a forty-eight bit address of a device configured to communicate according to a BLUETOOTH® standard, and paired with CCD 261.

The network status data 297 can indicate a status of the CCD being connected to the communication network 102. As an example, the status can indicate connected, not connected, a signal strength, and/or a data rate.

The CRPI 287 can include instructions executable by the processor 263 to decode the matrix code 291. Decoding the matrix code 291 can include recovering a link to a file (e.g., the file 572) stored in a memory (e.g., the memory 566) accessible to a media server (e.g., the media server 116 or the server 560).

The CRPI 287 can include instructions executable by the processor 263 to cause the link recovered from the matrix code 291 to be stored as the link 289.

The CRPI 287 can include instructions executable by the processor 263 to cause the network transceiver 265 to send a request for the file to a server indicated by the link 289 (e.g., the media server 116 or the server 560). The CRPI 287 can include instructions executable by the processor 263 to cause the network transceiver 265 to receive a response including a computer-readable file (e.g., the file 572) transmitted to the CCD 261 from the media server 116 or the server 560.

The CRPI 287 can include instructions executable by the processor 263 to store a computer-readable file received by the network transceiver 265 as the file 293.

The CRPI 287 can include instructions executable by the processor 263 to output the file 293. In some implementations, the processor 263 outputs the file 293 to the display 283, and the display 283 displays the file. In some implementations, the processor 263 outputs the file 293 to the network transceiver 265 for transmission to another device including a display configured to display the file 293.

The CRPI 287 can include instructions executable by the processor 263 to determine a signal strength of wireless communications the network transceiver 265 is receiving from an air interface of the communication network 102. The CRPI 287 can be executable to output an indicator of the signal strength on the display 283 and/or to cause the network transceiver 265 to transmit a communication to the DCD 104, 200 indicative of the signal strength experienced by the network transceiver 265.

The power supply 275 can include one or more power supply components. As an example, the power supply 275 can include circuitry to receive AC current from an AC electrical supply and convert the AC current to a DC current for supplying to one or more of the other components within the CCD 261. As another example, the power supply 275 can include a battery, such that the CCD 261 can be battery powered. As yet another example, the power supply 275 can include a solar cell, such that the CCD 261 can be solar powered. The power supply 275 can include electrical circuits to distribute electrical current throughout the CCD 261. Other examples of the power supply 275 are also possible.

The housing 277 can surround at least a portion of the processor 263, at least a portion of the network transceiver 265, at least a portion of the camera 267, at least a portion of the user interface 269, at least a portion of the memory 271, and/or at least a portion of the system bus or network 273. The housing 277 can be referred to as an enclosure. The housing 277 can support a substrate. At least a portion of the processor 263, at least a portion of the network transceiver 265, at least a portion of the camera 267, at least a portion of the user interface 269, at least a portion of the memory 271, and/or at least a portion of the system bus or network 273 can be mounted on and/or connect to the substrate. The housing 277 can be made from various materials. For example, the housing 277 can be made from a plastic material (e.g., ABS) and a thermoplastic elastomer used to form a grip on the housing 277.

C. Example Servers

FIG. 5A shows a server 500, according to example implementations. The server 500 is an example implementation of the server 106 shown in FIG. 1A, the file server 114 shown in FIG. 1B, and the media server 116 shown in FIG. 1B.

The server 500 includes a processor 502, a network transceiver 504, and a memory 506. Two or more of those components can be operatively coupled or linked together via a system bus or network 508. The network transceiver 504 can transmit data onto the communication network 102 and/or can receive data transmitted over the communication network 102. The memory 506 includes CRPI 510. The processor 502 can execute the CRPI 510 to perform the functions described in this description as being performed by a server, such as the server 106, the file server 114, or the media server 116.

The data accessible to the server 500 can be distributed across multiple databases, such as the memories 118, 120. As previously discussed, the functions performed by a single server can be distributed among two or more servers.

FIG. 5B shows a server 520, according to example implementations. The server 520 is an example implementation of the file server 114 shown in FIG. 1B. The server 520 includes a processor 522, a network transceiver 524, and a memory 526. Two or more of those components can be operatively coupled or linked together via a system bus or network 528. The memory 526 can include CRPI 530, a link 532, a matrix code 534, a vehicle identifier 536, a symptom identifier 538, a content description 540, a thumbnail image 542, and/or diagnostic information 544.

The processor 522 can execute the CRPI 530 to perform the functions described in this description as being performed by a server, such as the server 106, the file server 114, and/or the media server 116. The network transceiver 524 can transmit data onto the communication network 102 and/or can receive data transmitted over the communication network 102. As an example, the network transceiver 524 can receive a search request transmitted over the communication network 102, such as a search request 610 (shown in FIG. 6B). As another example, the network transceiver 524 can transmit a search request response, such as the search request response 630, 650, 670 (shown in FIG. 6C, FIG. 6D, and FIG. 6E, respectively).

The link 532 can include a link to a computer-readable file stored in the memory 526 and/or a link to a computer-readable file stored in another memory, such as the memory 566 (shown in FIG. 5C). The matrix code 534 can include includes a matrix code file representing a matrix code that can be printed and/or displayed (e.g., the matrix code 400). As an example, the matrix code 534 can be configured as a QR® matrix code.

The thumbnail image 542 can include a still image from a video file associated with the link 532. The network transceiver 524 can transmit the thumbnail image 542 in a communication to the DCD 200 for storage in the memory 212 as the thumbnail image 256. The visual representation 320 of displaying the thumbnail image 256 can also be a visual representation of the thumbnail image 542.

The content description 540 can include data describing a computer-readable file, such as a computer-readable file stored in the memory 526 and/or a file stored in another memory, such as a file 572 stored in a memory 566 (shown in FIG. 5C). The content description 540 can include some or all of the types of data contained in the content description 300 shown in FIG. 3. The content description 540 can include and/or be associated with the link 532 and/or the matrix code 534.

The vehicle identifier 536 can include a vehicle identifier (e.g., the vehicle identifier 620 shown in FIG. 6B) received in a search request (e.g., the search request 610). The symptom identifier 538 can include a symptom identifier (e.g., the symptom identifier 622 shown in FIG. 6B) received in a search request (e.g., the search request 610). The processor 522 can execute the CRPI 530 to identify diagnostic information (e.g., the diagnostic information 544) associated with the vehicle identifier 536 and the symptom identifier 538. The diagnostic information 544 stored in the memory 526 can be included in a response to a search request. As an example, the diagnostic information 544 can include the diagnostic information 644 (shown in FIG. 6C), the diagnostic information 652 (shown in FIG. 6D), the diagnostic information 672 (shown in FIG. 6E), and/or diagnostic information associated with diagnostic information selectors 1641, 1625, 1647 shown in FIG. 16C, FIG. 16K, FIG. 16L, respectively.

FIG. 5C shows a server 560, according to example implementations. The server 560 is an example implementation of the media server 116 shown in FIG. 1B. The server 560 includes a processor 562, a network transceiver 564, and a memory 566. Two or more of those components can be operatively coupled or linked together via a system bus or network 568. The memory 566 includes CRPI 570 and a file 572. In at least some implementations, the file 572 includes a single video file or multiple video files. The file 572 can include a video file associated with the URI 302. As an example, the file 572 can include the video file "VIDEO1.MP4," which can be transmitted to the DCD 200 and stored in the memory 212 as the file 248. In at least some implementations, the file 572 can include a web page file displayable on at least one of the following: the DCD 104, the CCD 108, the DCD 200 or the CCD 261. As an example, the web page file can include an HTML file (e.g., a file with an HTML extension). In at least some implementations, the file 572 can include a matrix code file, such as a file representing an image of a matrix code. The file 572 can be associated with a link (e.g., a web-resource link).

The processor 562 can execute the CRPI 570 to perform the functions described in this description as being performed by a server, such as the server 106, the file server 114, and/or the media server 116. The network transceiver 564 can transmit data onto the communication network 102 and/or can receive data transmitted over the communication network 102. As an example, the network transceiver 564 can receive a request for a file contained with the file 572 and associated with a link. As a more particular example, the network transceiver 564 can receive a request for a video associated with the URI 302 and can transmit a response to the request for the video. That response can include the video associated with the URI 302 stored in the file 572. As yet another more particular example, the network transceiver 564 can receive a request for a web page file associated with a web-resource link, and the network transceiver 564 can transmit a response to the request for the web page file. That response can include one or more web page files associated with the web-resource link.

IV. Example Operation

A. First Example Operation

Next, FIG. 6A shows a flowchart depicting a set of functions 600 (or more simply "the set 600") that can be carried out in accordance with the example implementations described in this description. The set 600 includes the functions shown in blocks labeled with whole numbers 601 through 604 inclusive. The description of the set 600 includes references to elements shown in other figures described in this description, but the functions of the set 600 are not limited to being carried out only by the referenced elements. A variety of methods can be performed using all of the functions shown in the set 600 or any proper subset of the functions shown in the set 600. Any of those methods can be performed with other functions such as one or more of the other functions described in this description. For instance, a method including the set 600 can include any or all functions of the set 700 (shown in FIG. 7). As yet another example, a method can include performing a function of the set 700 and one or more functions from the sets 700, 800, 900, 1000, 1100, 1200, 1300, 1400 and/or 1500.

Block 601 includes identifying a vehicle. The DCD 104, 200 can identify a vehicle, such as the vehicle 112. For instance, the processor 202 can identify the vehicle 112 based on data that identifies characteristics of the vehicle 112. The processor 202 can be configured to obtain the data identifying the characteristics of the vehicle in one or more of the following ways: (1) determining a user interface input indicative of the data identifying characteristics of the vehicle, (2) scanning and/or decoding a visible code representing the VIN associated with the vehicle 112, such as a one dimensional bar code representing the VIN, and/or (3) receiving a communication including data indicative of the vehicle characteristics. As an example, the network transceiver 204 can receive the communication from a device connected to the communication network 102, the communication including repair order information indicative of the vehicle characteristics. The repair order information can be stored as the RO 258. As another example, the VCT 206 can receive the communication from the vehicle 112 (e.g., a VDM including a VIN, a portion of a VIN, and/or data indicating a YMM or YMME associated with the vehicle 112). Other examples of the processor 202 identifying the vehicle are also possible. In some implementations, upon identifying the vehicle, the processor 202 can store the vehicle identifier 250 in the memory 212.

Next, block 602 includes determining a symptom applicable to the vehicle 112. The DCD 104, 200 can identify the symptom. For instance, the processor 202 can be configured to determine the symptom in one or more of the following ways: (1) determining an input (indicative of the symptom) entered using the user interface 210, and/or (2) receiving a communication including data indicative of the symptom. As an example, the network transceiver 204 can receive the communication from a device connected to the communication network 102, the communication including repair order information indicative of the symptom. As another example, the VCT 206 can receive the communication from the vehicle 112 (e.g., a VDM including data indicative of the symptom). Other examples of the processor 202 identifying the symptom are also possible. As an example, the data (within the VDM) indicative of the symptom can include (1) a diagnostic trouble code (DTC), and/or (2) a parameter identifier (PID) and associated PID parameter(s).

Next, block 603 includes transmitting a search request based on the vehicle and the symptom. Transmitting the search request can include the network transceiver 204 transmitting the search request to the server 106, 500, 520, 560, the file server 114, or the media server 116 over the communication network 102.

FIG. 6B shows, in accordance with at least some example implementations, a search request 610. The search request transmitted at block 603 can include the types of data contained in the search request 610. The search request 610 includes a destination identifier 612 of a destination, such as a server configured to search for information based on the vehicle and symptom referenced in the search request 610. The search request 610 includes an identifier of a source of the search request (e.g., the DCD 104, 200). The search request 610 includes a request type identifier 616, such as an identifier indicating the search request 610 is for diagnostic information. In another implementation, the type of information being requested by a search request can be implied by the search request 610 being transmitted to a particular device, such as the file server 114. The search request 610 includes a request identifier 618. The request identifier 618 can be used to associate a response to the search request 610. The search request 610 includes a vehicle identifier 620, such as a vehicle identifier based on the vehicle identified at block 601. The search request 610 includes a symptom identifier 622, such as a symptom identifier identified at block 602.

Next, block 604 includes receiving a response to the search request. The file server 114 can generate the response to the search request based on information determined by searching the memory 118 based on the vehicle and symptom referenced in the search request 610. The file server 114 can transmit the response to the search request over the communication network 102. The network transceiver 204 can receive the response to the search request. The response to the search request can include diagnostic information obtained from the memory 118. The diagnostic information can include diagnostic information including text (i.e., textual information), such as a repair hint, an original equipment manufacturer (OEM) diagnostic flowchart, and/or an OEM technical service bulletin. In implementations in which the memory 118 includes a video description of a video related to information in the search request 610, the response to the search request can include the video description. At least a portion of the video description can include textual information. In implementations in which memory 118 includes a web-resource link of a web page file related to information in the search request 610, the response to the search request can include the web-resource link.

FIG. 6C shows an example search request response 630 that includes a destination identifier 632, a source identifier

634, a response type identifier 636, a request identifier 638, a vehicle identifier 640, a symptom identifier 642, and diagnostic information 644. The diagnostic information 644 includes diagnostic text 646 and a video description 648. The request identifier 638 can be used by the processor 202 to determine that the search request response 630 corresponds to the search request 610 that includes the request identifier 618 matching the request identifier 638. The video description 648 can be configured like the content description 300 shown in FIG. 3A or like any portion of the content description 300.

Next, FIG. 6D shows an example search request response 650 that includes the destination identifier 632, the source identifier 634, the response type identifier 636, the request identifier 638, the vehicle identifier 640, the symptom identifier 642, and diagnostic information 652. The diagnostic information 652 includes the diagnostic text 646, the video description 648, and a matrix code 654. The matrix code 654 can include an image file representing an image of the matrix code 654. The matrix code 654 can encode the video description 648 and/or a URI associated with a video file defined by the video description 648.

Next, FIG. 6E shows an example search request response 670 that includes the destination identifier 632, the source identifier 634, the response type identifier 636, the request identifier 638, the vehicle identifier 640, the symptom identifier 642, and diagnostic information 672. The diagnostic information 672 includes a web-resource link 674, and a matrix code 676. The matrix code 676 can include an image file representing an image of the matrix code 676. The matrix code 676 can encode the web-resource link 674.

B. Second Example Operation

Next, FIG. 7 shows a flowchart depicting a set of functions 700 (or more simply "the set 700") that can be carried out in accordance with the example implementations described in this description. The set 700 includes the functions shown in blocks labeled with whole numbers 701 through 704 inclusive. The description of the set 700 includes references to elements shown in other figures described in this description, but the functions of the set 700 are not limited to being carried out only by the referenced elements. A variety of methods can be performed using all of the functions shown in the set 700 or any proper subset of the functions shown in the set 700. Any of those methods can be performed with other functions such as one or more of the other functions described in this description. For example, a method can include performing the set 600 and the set 700. As yet another example, a method can include performing a function of the set 700 and one or more functions from the sets 600, 800, 900, 1000, 1100, 1200, 1300, 1400 and/or 1500.

Block 701 includes receiving a content description and a matrix code. The content description includes data describing one or more files. Each of the one or more files includes a computer-readable file, such as a video file stored in the memory 120 or the file 572 stored in the memory 566. The matrix code is encoded with a link to the one or more files. In some implementations, the content description can be configured like the content description 300 shown in FIG. 3. Accordingly, the content description can include the URI 302, the file name 304, the subject description 306, the file size 308, the video resolution 310, the video compression type 312, the thumbnail image name 314, the encoded bit rate 316, and/or the play-time 318. In some implementations, receiving the content description can include the DCD 104, 200, the processor 202, and/or the network transceiver 204 receiving the content description 300 from a server, such as the file server 114 or the server 520. In other implementations, receiving the content description can include the CCD 108, 261, the processor 263, and/or the network transceiver 265 receiving the content description 300 from a server, such as the file server 114 or the server 520.

In some implementations, receiving the matrix code can include the DCD 104, 200 or the CCD 108, 261 receiving the matrix code over the communication network 102 from a server 106, 500, 520 or the file server 114. In other implementations, receiving the matrix code can include the DCD 104, 200 receiving a matrix code generated by the processor 202 based on data contained in the content description received by the DCD 104, 200, the processor 202, and/or the network transceiver 204. The processor 202 can execute the CRPI 240 to generate the matrix code. In still other implementations, receiving the matrix code can include the CCD 108, 261 receiving a matrix code generated by the processor 263 based on data contained in the content description received by the CCD 108, 261, the processor 263, and/or the network transceiver 265. The processor 263 can execute the CRPI 287 to generate the matrix code. The matrix code can be encoded with a link (e.g., the link 242) to the file 572.

Next, block 702 includes determining a condition indicative of a first computing device being unable to display the one or more files with at least a minimum quality level. That determination can be based, at least in part, on the content description.

In some implementations, the first computing device is configured as a DCD, such as the DCD 104, 200. In at least some of those implementations, the processor 202, 263 can execute the CRPI 240 to determine the condition of the DCD 104, 200 being unable to display the one or more files with at least the minimum quality level by determining that the DCD 104, 200 is unable to display a video file with at least a minimum video quality level. As an example, the determined condition can include: (1) the display 232 is not configured to show any video, (2) the video file has a file name with a file name extension not supported by the processor 202, (3) the DCD 104, 200 does not include a CODEC for decoding the video file, (4) the transmission bit rate of the video file by the media server 116 or the server 560 is too slow such that the display 232 cannot display the video continuously after starting display of the video file, (5) the transmission bit rate of the video file by the media server 116 or the server 560 is too fast such that the one or more buffers configured for storing portions of the video file in the memory 212 would fill to capacity and not be able to store all of the received portions of the video file, (6) a strength of signal for communications over the communication network 102 to the DCD 104, 200 is below a threshold signal strength level, (7) a particular type of network connection is unavailable to the DCD 104, 200, and/or (8) the display 232 is unable to display a video file and diagnostic text simultaneously.

In other implementations in which the first computing device is configured as a DCD, such as the DCD 104, 200, the processor 202, 263 can execute the CRPI to determine the condition of the DCD 104, 200 being unable to traverse a web-resource link, such as the link 1653 shown in FIG. 16C.

In some implementations, the particular type of network connection can be a particular cellular air interface protocol or radio access technology. Examples of existing cellular air interface protocols or radio access technology include AMPS, CDMA (e.g., 1×RTT), IDEN, TDMA, GSM, GPRS, EDGE, and MMDS, a $3^{rd}$ generation (3G) cellular protocol such as CDMA 2000 1×EV-DO or UMTS, a $4^{th}$ generation (4G) broadband radio access technology, such as LTE (e.g., FDD LTE and TDD LTE), or WiMAX. As another example, the particular type of network connection can be a WI-FI® protocol connection that operates at the 2.4 GHz band, 3.6 GHz band, 4.9 GHz band, 5 GHz band, or the 5.9 GHz band.

The minimum video quality level can be defined using one or more characteristics. Examples of those characteristics are discussed in this and the following two paragraphs. In at least some implementations, the minimum video quality level can be defined as a frame rate (e.g., a frequency at which frames of a video are displayed). A frame rate can be defined in frames per second (FPS). As an example, the frame rate can be 24 FPS (e.g., high definition (HD) video), 23.98 or 23.976 FPS (high definition video with NTSC compatibility), 25 FPS (PAL, HD video), 29.97 FPS (NTSC, HD video), 30 FPS (HD video), 50 FPS (PAL, HD video), 59.94 FPS (HD video with NTSC compatibility), 60 FPS (HD video) or some other frame rate. NTSC refers to National Television System Committee. PAL refers to phase alternating line.

In at least some implementations, the minimum video quality level can be an aspect ratio (i.e., a ratio of the width of a frame of the video to the height of that frame). As an example, the aspect ratio can be 16:9, 1.78:1, 1.33:1 or some other aspect ratio.

In at least some implementations, the minimum video quality level can be a resolution of the video. As an example, the resolution can be defined as a quantity of horizontal lines of vertical resolution, such as 1080p where 1080 represent 1,080 lines of vertical resolution and "p" represents a progressive scan. Other example resolutions defined as a quantity of horizontal lines of vertical resolution include 240p, 360p, 480p, 720p, 1440p, 2160p, 3840p. Moreover, the resolution of the video can be as a ratio of pixels, such as 426×240, 640×360, 854×480, 1280×720, 1920×1080, 2560×1440, 3840×2160.

In other implementations, the first computing device is configured as a CCD, such as the CCD 108, 261. In at least some of those implementations, the processor 202 can execute the CRPI 240 to determine the condition of CCD 108, 261 being unable to display the one or more files with at least the minimum quality level includes the processor 202 determining that the CCD 108, 261 is unable to display a video file with at least a minimum video quality level. In those implementations, the processor 202 can execute the CRPI 240 to determine the condition of the CCD 108, 261 being unable to display a video file with at least a minimum video quality level. As an example, the determined condition can include: (1) the display 283 is not configured to show any video, (2) the video file has a file name with a file name extension not supported by the processor 263, (3) the CCD 108, 261 does not include a CODEC for decoding the video file, (4) the transmission bit rate of the video file by the media server 116 or the server 560 is too slow such that the display 283 cannot display the video continuously after starting display of the video file, (5) the transmission bit rate of the video file by the media server 116 or the server 560 is too fast such that the one or more buffers configured for storing portions of the video file in the memory 271 would fill to capacity and not be able to store all of the received portions of the video file, (6) a strength of signal for communications over the communication network 102 to the CCD 108, 261 is below a threshold signal strength level, (7) a particular type of network connection is unavailable to the CCD 108, 261, and/or (8) the display 283 is unable to display a video file and diagnostic text simultaneously.

As another example, the condition indicative of a first computing device being unable to display a video file with at least a minimum video quality level can be a condition in which a communication network used by the first computing device is insufficient for transmitting the video file for displaying the first video file continuously from a beginning of the video file to an end of the video file once playing of the video file at the first computing device begins. As yet another example, the condition indicative of a first computing device being unable to display a video file with at least a minimum video quality level can be a condition in which a communication network used by the first computing device is insufficient for transmitting, within a threshold amount of time a portion of video file for displaying the first video file continuously from a beginning of the video file to an end of the video file once playing of the video file at the first computing device begins.

As an example, the network condition and/or the transmission rate can be determined by transmitting a communication and determining the network condition based on how long it takes to obtain a response to the communication. For instance, a request for a matrix code is transmitted at time T1 and the response including the matrix code is received during the time period T2 to T3. The transmission rate can be determined as the number of bytes in the received matrix code divided by a transmission time (T3 minus T2). The determined transmission rate can be used to determine a length of time expected to download the video file using the same transmission rate. If the determined length of time exceeds the play time of the video file, the processor can determine that the video file cannot be displayed with at least the minimum video quality level. In some implementations, determining the network condition exists based on the length of time expected to download the video file can be conditioned on the length of time exceeding a threshold amount of time, such as one minute or some other amount of time.

Next, block 703 includes outputting, by the processor 202, 263 in response to determining the condition indicative of the first computing device being unable to display the one or more files with at least the minimum quality level, the matrix code to a first display.

In some implementations, the first display is a display at the DCD 104, 200 (e.g., the display 232). In those implementations, outputting the matrix code can include the processor 202 outputting the matrix code 244 to the display 232 or the processor 263 causing the network transceiver 265 to output the matrix code 291 over the communication network 102 for transmission to the network transceiver 204 of the DCD 104, 200. A matrix code received at the network transceiver 204 can be stored in the memory 212 as the matrix code 244.

In other implementations, the first display is a display at the CCD 108, 261 (e.g., the display 283). In those implementations, outputting the matrix code can include the processor 263 outputting the matrix code 291 to the display 283 or the processor 202 causing the network transceiver 204 to output the matrix code 244 over the communication network 102 for transmission to the network transceiver 265 of the CCD 108, 261. A matrix code received at the network transceiver 265 can be stored in the memory 271 as the matrix code 291.

Next, block 704 includes displaying the matrix code on the first display. In the implementations in which the first display is a display at the DCD 104, 200, the display 232 can display the matrix code 244. Displaying a matrix code, such as the matrix code 244, can include displaying a representation of the matrix code on a display. FIG. 16C shows a matrix code 1650 on the display 232. The matrix code 1650 can be a representation of the matrix code 244. In other implementations, the first display is a display at the CCD 108, 261 (e.g., the display 283).

In at least some implementations, the first computing device includes the processor and the first display. In accordance with those implementations, determining the condition indicative of the first computing device being unable to display the one or more files with at least the minimum quality level includes the processor determining the first computing device is not configured to display a video file.

In another implementation, the content description received at block 701 includes multiple content descriptions and the matrix code received at block 701 includes multiple matrix codes. The multiple matrix codes include a separate matrix code for each of the multiple content descriptions. In accordance with this implementation, a method that includes performing the set of functions 700 shown in FIG. 7 can further include receiving, at the processor 202, content order information. Moreover, displaying the matrix code for this method includes displaying the multiple matrix codes according to the content order information. The server 106, the file server 114, or the media server 116 can determine the content order information and provide the content order information over the communication network 102 to the DCD 104.

As an example, the content order information can be based on a popularity of the content associated with one of the multiple content descriptions. The following examples in this paragraph pertain to implementations in which the content includes a video file. For example, the content order information can be based on ratings of multiple videos. As yet another example, the content order information can be based on the multiple videos being ranked from a greatest frequency of fixing a vehicle to a lowest frequency of fixing a vehicle. As still yet another example, the content order information can be based on a length of time of the multiple videos (e.g., an order of videos from shortest display time to longest display time). Moreover, the content order information can be based on two or more of the factors for determining an order of videos listed above.

In other implementations that include performing a method including the set 700, the method can include the processor determining that the first computing device can communicate with a second computing device. In these implementations, the first computing device includes the processor and the first display, and the second computing device includes a second display and is registered with the first computing device. Furthermore, in these implementations, the first computing device can transmit the link to the one or more files to the second computing device.

In still other implementations that include performing a method including the set 700, a second computing device includes the processor and the first display. The first computing device is registered with the second computing device and/or the second computing device is registered with the first computing device. The second computing device is configured for transmitting the one or more files to the first computing device. Likewise, the first computing device is configured for receiving the one or more files from the second computing device. In these implementations, determining the condition indicative of the first computing device being unable to display the one or more files with at least the minimum quality level includes the processor determining the second computing device cannot communicate with the first computing device.

C. Third Example Operation

Next, FIG. 8 shows a flowchart depicting a set of functions 800 (or more simply "the set 800") that can be carried out in accordance with the example implementations described in this description. The set 800 includes the functions shown in blocks labeled with whole numbers 801 through 805 inclusive. The description of the set 800 includes references to elements shown in other figures described in this description, but the functions of the set 800 are not limited to being carried out only by the referenced elements. A variety of methods can be performed using all of the functions shown in the set 800 or any proper subset of the functions shown in the set 800. Any of those methods can be performed with other functions such as one or more of the other functions described in this description. For example, a method can include performing the set 700 and the set 800. As another example, a method can include performing the set 600, the set 700, and the set 800. As yet another example, a method can include performing a function of the set 800 and one or more functions from the sets 600, 700, 900, 1000, 1100, 1200, 1300, 1400, and/or 1500.

Block 801 includes outputting, by the one or more processors after determining the condition indicative of the of the first computing device being unable to display the one or more files with at least the minimum quality level, a file requester to the first display. Outputting the file requester can include the processor transmitting the file requester and/or data to cause the first display to display the file requester. In some implementations, the file requester can include a video file requester configured to be selectable to indicate a particular video file has been selected. In some implementations, the file requester can include a web-page file requester configured to be selectable to indicate a web-resource link to a particular web-page file has been selected.

Next, block 802 includes displaying, on the first display, the file requester. As an example, the file requester displayed at block 802 can be configured like the diagnostic information selector 1641, 1648 shown in FIG. 16C. As another example, the file requester displayed at block 802 can be configured like the diagnostic information selector 1631, 1633 shown in FIG. 16K.

Next, block 803 includes transmitting, in response to a selection of the file requester, a request for the one or more files from a remote device associated with the link to the one or more files. The processor 202 can execute the CRPI 240 to cause the network transceiver 204 to transmit the request for the one or more files. The link includes the link encoded within the matrix code.

Next, block 804 includes receiving, at the one or more processors in response to the request for the one or more files, the one or more files. The network transceiver 204 can receive the one or more files from the communication network 102 and provide the one or more files to the processor 202. Receiving the one or more files by the processor 202 and/or the network transceiver 204 can include receiving packets that contain portions of the one or more files. The one or more files and/or the content of the packets can be stored in a buffer (e.g., one or more buffers). Each buffer can be a portion of the memory 212. The portion of the memory that stores the file 248 can include the buffer in which the one or more files and/or content of the packets is/are stored.

In accordance with at least some example implementations, the one or more files include a video file. In accordance with at least some of those example implementations, receiving the video file can include receiving the video file via multiple packets that contain different portions of the video file. In accordance with at least some other example implementations, the one or more files include a web-page file.

Next, block 805 includes outputting, by the one or more processors, the one or more files to a second display device. In accordance with an example, implementation, the second display device is the CCD 108. For instance, the second display device can include a smart phone or a tablet device. In another example implementation, the second display device includes a vehicle component affixed within a passenger compartment of the vehicle 112. The vehicle component can be a vehicle component installed into the vehicle by the OEM. For instance, the second display device can include an instrument panel cluster having a display, a navigation system component having a display, an entertainment system component having a display, and/or a multimedia touch-screen display. Alternatively, the vehicle component affixed within the passenger compartment could include an after-market vehicle component affixed to the vehicle by a party other than the OEM.

In at least some of the implementations that include performing the set 800, the method can also include displaying, on the second display device (e.g., the CCD 108 or a display on a vehicle component), the one or more files output to the second display device. Displaying the one or more files can include displaying a video file. The video file can include content showing a service function on the second display device. In these implementations, the method can also include servicing a vehicle (e.g., the vehicle 112) by performing the service function shown on the second display device. As an example, performing the service function can include removing a vehicle component from the vehicle, installing a vehicle component onto the vehicle, diagnosing a vehicle component on the vehicle is defective, adjusting a vehicle component on the vehicle, recalibrating a vehicle component on the vehicle, resetting a vehicle component on the vehicle, setting up a target in proximity to the vehicle, and/or reprogramming a vehicle component on the vehicle. Targets are typically set up for installing and/or calibrating an advanced driver assistance system (ADAS), such as an adaptive cruise control system, an adaptive light control system, an automatic braking system, an automatic parking system, or a collision avoidance system.

D. Fourth Example Operation

Next, FIG. 9 shows a flowchart depicting a set of functions 900 (or more simply "the set 900") that can be carried out in accordance with the example implementations described in this description. The set 900 includes the functions shown in blocks labeled with whole numbers 901 through 905 inclusive. The description of the set 900 includes references to elements shown in other figures described in this description, but the functions of the set 900 are not limited to being carried out only by the referenced elements. A variety of methods can be performed using all of the functions shown in the set 900 or any proper subset of the functions shown in the set 900. Any of those methods can be performed with other functions such as one or more of the other functions described in this description. For instance, a method including a function of the set 900 can include one or more functions from the sets 600, 700, 800,

1000, 1100, 1200, 1300, 1400, and/or 1500. In particular, a method including the function of the set 900 can include performing the functions of the set 700 and then the functions of the set 900. Moreover, that particular method could include performing the set 600 before performing the set 700.

In the implementations that include performing the set 900, a first computing device includes the processor and the first display. Furthermore, in those implementations, determining the condition indicative of the first computing device being unable to display the one or more files with at least the minimum quality level includes the processor determining the first computing device is not configured to display the one or more files.

Block 901 includes outputting, by the one or more processors after determining the first computing device is not configured to display the one or more files, a file requester to the first display. In at least some implementations, outputting the file requester can include the processor 202 transmitting the file requester over the system bus or network 214 to the display 232. The file requester is selectable to cause the processor to request the one or more files for displaying on the first display.

Next, block 902 includes displaying, on the first display, the file requester. As an example, the file requester displayed at block 902 can be configured like the diagnostic information selector 1641, 1648 shown in FIG. 16C. As another example, the file requester displayed at block 902 can be configured like the diagnostic information selector 1631, 1633 shown in FIG. 16K.

Next, block 903 includes transmitting, in response to a selection of the file requester, a request for the one or more files from a remote device associated with the link to the one or more files. As an example, the selection of the file requester can be made by touching the file requester on the first display and/or by use of a hardware key (on the first computing device) associated with the file requester. Transmitting the request can include a network transceiver of the first computing device transmitting the request for the one or more files to the media server 116 or the server 560. In response to that request, the media server 116 or the server 560 can determine the one or more files to be sent in response to the search request, generate the search request response, and transmit the search request response over the communication network 102. Transmitting the search request response can include transmitting multiple packets containing portions of the one or more files over the communication network 102. A network transceiver, such as the network transceiver 204 can receive the search request response and can cause the memory 212 to store the one or more files as the file 248.

Next, block 904 includes receiving, at the one or more processors in response to the request for the one or more files, the one or more files. As an example, the processor 202 can receive the one or more files from the network transceiver 204 or from the memory 212. In accordance with at least some example implementations, the one or more files include a video file. In accordance with at least some other example implementations, the one or more files include a web-page file.

Next, block 905 includes outputting, by the one or more processors, the one or more files to a second display device. Outputting the one or more files can include the processor 202 outputting the one or more files to the network transceiver 204 and/or the network transceiver 204 transmitting the one or more files to the PAN 110. The second computing device, such as the CCD 108, 261, can receive the one or more files using the network transceiver 265 and/or display the one or more files on the display 283. The second computing device, such as the CCD 108, 261 can store the one or more files received over the PAN 110 as the file 293.

E. Fifth Example Operation

Next, FIG. 10 shows a flowchart depicting a set of functions 1000 (or more simply "the set 1000") that can be carried out in accordance with the example implementations described in this description. The set 1000 includes the functions shown in blocks labeled with whole numbers 1001 through 1006 inclusive. The description of the set 1000 includes references to elements shown in other figures described in this description, but the functions of the set 1000 are not limited to being carried out only by the referenced elements. A variety of methods can be performed using all of the functions shown in the set 1000 or any proper subset of the functions shown in the set 1000. Any of those methods can be performed with other functions such as one or more of the other functions described in this description. For instance, a method including a function of the set 1000 can include one or more functions from the sets 600, 700, 800, 900, 1100, 1200, 1300, 1400, and/or 1500. In particular, a method including the function of the set 1000 can include performing the functions of the set 700 and then the functions of the set 1000. Moreover, that particular method could include performing the set 600 before performing the set 700.

Block 1001 includes outputting, by the one or more processors after determining the condition indicative of the first computing device (e.g., the DCD 104, 200) being unable to display the one or more files with at least the minimum quality level, a file requester to the first display. In at least some implementations, outputting the file requester can include the processor 202 transmitting the file requester over the system bus or network 214 to the display 232. The video file requester is selectable to cause the one or more processors to request the one or more files for displaying on the first display.

Next, block 1002 includes displaying, on the first display, the file requester. As an example, the file requester displayed at block 1002 can be configured like the diagnostic information selector 1641, 1648 shown in FIG. 16C. As another example, the file requester displayed at block 1002 can be configured like the diagnostic information selector 1631, 1633 shown in FIG. 16K.

Next, block 1003 includes transmitting, in response to a selection of the file requester, a request for the one or more files from a remote device associated with the link to the one or more files. The examples of transmitting a request in the discussion of block 903 above are applicable to block 1003.

Next, block 1004 includes receiving, at the one or more processors in response to the request for the one or more files, the one or more files. As an example, the one or more processors can receive the one or more files from the network transceiver 204 or from the memory 212. In accordance with at least some example implementations, the one or more files include a video file. In accordance with at least some other example implementations, the one or more files include a web-page file.

Next, block 1005 includes outputting, by the one or more processors, the one or more files to the first display. As an example, the processor 202 can transmit the file 248 to the display 232 over the system bus or network 214.

Next, block 1006 includes displaying, on the first display, the one or more files at a level below the minimum quality level. As an example, the display 232 can display the one or more files in a display window, such as the display window 1668 shown in FIG. 16F and FIG. 16H. For the implementations in which the one or more files includes a video file, the one or more processors can cause the display 232 to display non-video information at the same time the video file is displayed. Displaying the video file can include displaying the video file in play mode in which the video is played at a rate equal or substantially equal to a rate at which the video was captured, displaying the video file in a pause mode in which a single image of the video file is displayed continuously, displaying the video file in a fast forward mode, and/or displaying the video file in a fast reverse mode. Other examples of displaying the video file are also possible.

F. Sixth Example Operation

Next, FIG. 11 shows a flowchart depicting a set of functions 1100 (or more simply "the set 1100") that can be carried out in accordance with the example implementations described in this description. The set 1100 includes the functions shown in blocks labeled with whole numbers 1101 through 1106 inclusive. The description of the set 1100 includes references to elements shown in other figures described in this description, but the functions of the set 1100 are not limited to being carried out only by the referenced elements. A variety of methods can be performed using all of the functions shown in the set 1100 or any proper subset of the functions shown in the set 1100. Any of those methods can be performed with other functions such as one or more of the other functions described in this description. In particular, a method including a function of the set 1100 can include a function of the set 600 and/or the set 700. For example, a method including a function of the set 1100 can include performing the functions of the set 700 and then the functions of the set 1100. Moreover, that particular method could include performing the set 600 before performing the set 700. As yet another example, a method can include performing a function of the set 1100 and one or more functions from the sets 600, 700, 800, 900, 1000, 1200, 1300, 1400 and/or 1500.

In the implementations that include performing the set 1100, a second computing device includes the processor and the first display. Furthermore, in these implementations, the first and second computing device can register with each other such that the first computing device is registered with the second computing device and/or the second computing device is registered with the first computing device. For computing devices that are configured to operate using a BLUETOOTH® standard, registering a device is occasionally referred to as "pairing a device." Furthermore still, in these implementations, the second computing device is configured for transmitting a file to the first computing device, and the first computing device is configured for receiving the file from the second computing device. As an example, the file can include a video file and/or an HTML file. Furthermore still, in the foregoing implementations in which the file includes a video file, determining the condition indicative of the first computing device being unable to display the video file with at least the minimum video quality level can occur in response to the processor of the second computing device determining the second computing device cannot display the video file with at least a video quality level at which the first display of the second computing device can display the video file.

Block 1101 includes outputting, by the one or more processors, a file requester to the first display. In at least some implementations, outputting the file requester can include the processor 202 transmitting the file requester over the system bus or network 214 to the display 232. In those or in other implementations, outputting the file requester can include a graphics processor of the processor 202 outputting a GUI including the file requester to the display 232. In some implementations, the file requester displayed on the display 232 is spatially associated with a portion of display 232 at which the file requester is displayed such that the processor 202 can determine the file requester is selected by determining that the portion of the display 232 is touched by a finger or some other pointing device.

Next, block 1102 includes displaying, on the first display, the file requester. As an example, the file requester displayed at block 1102 can be configured like the diagnostic information selector 1641, 1648 shown in FIG. 16C. As another example, the file requester displayed at block 1102 can be configured like the diagnostic information selector 1631, 1633 shown in FIG. 16K.

Next, block 1103 includes transmitting, in response to a selection of the file requester, a request for one or more files from a remote device associated with the link to the one or more files. As an example, the selection of the file requester can be made by touching the file requester on the first display and/or by use of a hardware key (on the second computing device) associated with the file requester. Transmitting the request can include a network transceiver of the second computing device transmitting the request for the one or more files to the media server 116 or the server 560. In response to that request, the media server 116 or the server 560 can determine one or more files to be sent in response to the search request, generate the search request response, and transmit the search request response over the communication network 102. Transmitting the search request response can include transmitting multiple packets containing portions of the one or more files over the communication network 102. A network transceiver, such as the network transceiver 204 can receive the search request response and can cause the memory 212 to store the one or more files as the file 248.

Next, block 1104 includes receiving, at the one or more processors in response to the request for the one or more files, the one or more files. As an example, the one or more files can receive the one or more files from the network transceiver 204 or from the memory 212. In accordance with at least some example implementations, the one or more files include a video file. In accordance with at least some other example implementations, the one or more files include a web-page file.

Next, block 1105 includes outputting, by the one or more processors, the one or more files to the first display. As an example, the one or more processors can transmit the file 248 to the display 232 over the system bus or network 214.

Next, block 1106 includes displaying, on the first display, the one or more files. As an example, the display 232 can display the one or more files in a display window, such as the display window 1668 shown in FIG. 16F and FIG. 16H. For the implementations in which the one or more files include a video file, the processor 202 can cause the display 232 to display non-video information at the same time the video file is displayed. Displaying the video file can include displaying the video file in play mode in which the video is played at a rate equal or substantially equal to a rate at which the video was captured, displaying the video file in a pause mode in which a single image of the video file is displayed continuously, displaying the video file in a fast forward mode, and/or displaying the video file in a fast reverse mode. Other examples of displaying the video file are also possible.

G. Seventh Example Operation

Next, FIG. 12 shows a flowchart depicting a set of functions 1200 (or more simply "the set 1200") that can be carried out in accordance with the example implementations described in this description. The set 1200 includes the functions shown in blocks labeled with whole numbers 1201 through 1205 inclusive. The description of the set 1200 includes references to elements shown in other figures described in this description, but the functions of the set 1200 are not limited to being carried out only by the referenced elements. A variety of methods can be performed using all of the functions shown in the set 1200 or any proper subset of the functions shown in the set 1200. Any of those methods can be performed with other functions such as one or more of the other functions described in this description. In particular, a method including a function of the set 1200 can include a function of the set 600 and/or the set 700. For example, a method including a function of the set 1200 can include performing the functions of the set 700 and then the functions of the set 1200. Moreover, that particular method could include performing the set 600 before performing the set 700. As yet another example, a method can include performing a function of the set 1200 and one or more functions from the sets 600, 700, 800, 900, 1000, 1100, 1300, 1400 and/or 1500.

In the implementations that include performing the set 1200, a second computing device includes the processor and the first display. Furthermore, in these implementations, the first and second computing device can register with each other such that the first computing device is registered with the second computing device and/or the second computing device is registered with the first computing device. Furthermore still, in these implementations, the second computing device is configured for transmitting one or more files to the first computing device, and the first computing device is configured for receiving the one or more files from the second computing device. Furthermore still, in these implementations, determining the condition indicative of the first computing device being unable to display the one or more files with at least the minimum quality level can occur in response to the processor of the second computing device determining the second computing device cannot display the one or more files with at least a quality level at which the first display of the second computing device can display the one or more files.

Block 1201 includes outputting, by the one or more processors, a file requester to the first display. In at least some implementations, outputting the file requester can include the processor 202 transmitting the file requester over the system bus or network 214 to the display 232. The file requester is selectable to cause the one or more processors to request the one or more files for displaying on the first display.

Next, block 1202 includes displaying, on the first display, the file requester. As an example, the file requester displayed at block 1202 can be configured like the diagnostic information selector 1641, 1648 shown in FIG. 16C. As another example, the file requester displayed at block 1202 can be configured like the diagnostic information selector 1631, 1633 shown in FIG. 16K.

Next, block 1203 includes transmitting, in response to a selection of the file requester, a request for the one or more files from a remote device associated with the link to the one or more files. The examples of transmitting a request in the discussion of block 1103 above are applicable to block 1203. The link includes the link encoded within the matrix code.

Next, block 1204 includes receiving, at the one or more processors, in response to the request for the one or more files, the one or more files. As an example, the processor 202 can receive the one or more files from the network transceiver 204 or from the memory 212. In accordance with at least some example implementations, the one or more files include a video file. In accordance with at least some other example implementations, the one or more files include a web-page file.

Next, block 1205 includes outputting, by the one or more processors, the one or more files to the first computing device. In the example implementations in which the one or more files include a video file, outputting the one or more files includes outputting the video file. Outputting the video file can include the processor 202 outputting the video file to the network transceiver 204 and/or the network transceiver 204 transmitting the video file to the PAN 110. The first computing device, such as the CCD 108, 261, can receive the video file using the network transceiver 265 and/or display the video file on the display 283. The first computing device, such as the CCD 108, 261 can store the video file received over the PAN 110 as the file 293.

H. Eighth Example Operation

Next, FIG. 13 shows a flowchart depicting a set of functions 1300 (or more simply "the set 1300") that can be carried out in accordance with the example implementations described in this description. The set 1300 includes the functions shown in blocks labeled with whole numbers 1301 through 1306 inclusive. The description of the set 1300 includes references to elements shown in other figures described in this description, but the functions of the set 1300 are not limited to being carried out only by the referenced elements. A variety of methods can be performed using all of the functions shown in the set 1300 or any proper subset of the functions shown in the set 1300. Any of those methods can be performed with other functions such as one or more of the other functions described in this description. In particular, a method including a function of the set 1300 can include a function of the set 600 and/or the set 700. For example, a method including a function of the set 1300 can include performing the functions of the set 700 and then the functions of the set 1300. Moreover, that particular method could include performing the set 600 before performing the set 700. As yet another example, a method can include performing a function of the set 1300 and one or more functions from the sets 600, 700, 800, 900, 1000, 1100, 1200, 1400 and/or 1500.

In the implementations that include performing the set 1300, a second computing device includes the processor and the first display. Furthermore, in these implementations, the first and second computing device can register with each other such that the first computing device is registered with the second computing device and/or the second computing device is registered with the first computing device. Furthermore still, in these implementations, the second computing device is configured for transmitting one or more files to the first computing device, and the first computing device is configured for receiving the one or more files from the second computing device. Furthermore still, in these implementations, determining the condition indicative of the first computing device being unable to display the one or more files with at least the minimum quality level can occur in response to the processor of the second computing device determining the second computing device cannot display the one or more files with at least a quality level at which the first display of the second computing device can display the one or more files.

Block 1301 includes outputting, by one or more processors, a file requester to the first display. In at least some implementations, outputting the file requester can include the processor 202 transmitting the file requester over the system bus or network 214 to the display 232. The file requester is selectable to cause the processor to request the one or more files for displaying on the first display.

Next, block 1302 includes displaying, on the first display, the file requester. As an example, the file requester displayed at block 1302 can be configured like the diagnostic information selector 1641, 1648 shown in FIG. 16C. As another example, the file requester displayed at block 1302 can be configured like the diagnostic information selector 1631, 1633 shown in FIG. 16K.

Next, block 1303 includes transmitting, in response to a selection of the file requester displayed by the first display, a request for the one or more files from a remote device associated with the link to the one or more files. The examples of transmitting a request in the discussion of block 1103 above are applicable to block 1303. The link includes the link encoded within the matrix code.

Next, block 1304 includes receiving, at the one or more processors in response to the request for the one or more files, the one or more files. As an example, the processor 202 can receive the one or more files from the network transceiver 204 or from the memory 212.

Next, block 1305 includes outputting, by the one or more processors, the one or more files to the first display. As an example, the processor 202 can transmit the file 248 to the display 232 over the system bus or network 214.

Next, block 1306 includes displaying, on the first display, the one or more files at a level below the minimum quality level. As an example, the display 232 can display the one or more files in a display window, such as the display window 1668 shown in FIG. 16F and FIG. 16H. Moreover, in the example implementations in which the one or more files include a video file, the processor 202 can cause the display 232 to display non-video information at the same time the video file is displayed.

In the example implementations in which the one or more files includes a video file, displaying the video file can include displaying the video file in play mode in which the video is played at a rate equal or substantially equal to a rate at which the video was captured, displaying the video file in a pause mode in which a single image of the video file is displayed continuously, displaying the video file in a fast forward mode, and/or displaying the video file in a fast reverse mode.

In the example implementations in which the one or more files include a video file, the minimum quality level can include a minimum video quality level. Displaying the video file at the level below the minimum video quality level can include displaying the video file using a display resolution lower than a display resolution associated with the minimum video quality level and/or displaying the video file using a frame rate lower than a frame rate associated with the minimum video quality level.

Moreover, the DCD 200 can be configured to be able to display video files using any one of multiple aspect ratios and/or any one of multiple CODEC. The DCD 200 can include a hierarchy of aspect ratios ranging from a most-preferred aspect ratio to a least-preferred aspect ratio. One or more of the aspect ratios in the hierarchy of aspect ratios can be associated with displaying video files below the minimum video quality level. Likewise, the DCD 200 can include a hierarchy of CODEC ranging from a most-preferred CODEC to a least-preferred CODEC. One or more CODEC in the hierarchy of CODEC ratios can be associated with displaying video files below the minimum video quality level. Displaying the video file at the level below the minimum video quality level can include displaying the video file using an aspect ratio associated with displaying video files below the minimum video quality level and/or using a CODEC associated with displaying video files below the minimum video quality level. Other examples of displaying the video file at the level below the minimum video quality level are also possible.

I. Ninth Example Operation

Next, FIG. 14 shows a flowchart depicting a set of functions 1400 (or more simply "the set 1400") that can be carried out in accordance with the example implementations described in this description. The set 1400 includes the functions shown in blocks labeled with whole numbers 1401 through 1406 inclusive. The description of the set 1400 includes references to elements shown in other figures described in this description, but the functions of the set 1400 are not limited to being carried out only by the referenced elements. A variety of methods can be performed using all of the functions shown in the set 1400 or any proper subset of the functions shown in the set 1400. Any of those methods can be performed with other functions such as one or more of the other functions described in this description. As yet another example, a method can include performing a function of the set 1400 and one or more functions from the sets 600, 700, 800, 900, 1000, 1100, 1200, 1300 and/or 1500.

In some implementations that include performing the set 1400, the first computing device includes a DCD, such as the DCD 104, 200. In other implementations that include performing the set 1400, the first computing device includes a CCD, such as the CCD 108, 261. In any of the implementations that include performing the set 1400 in which the first computing device includes a DCD or a CCD, a method including performing the set 1400 can include performing the set 600 before performing the set 1400. A method that includes performing the set 1400 can include receiving a matrix code.

Block 1401 includes receiving, at one or more processors within a first computing device, a content description. The content description includes data describing one or more files and a link to the one or more files. As an example, the content description can include the content description 300 or any of the types of data included within the content description 300. The one or more processors can receive the content description from a communication a network transceiver connected to the one or more processors receives over the communication network 102. The link to the one or more files can include a URI, such as the URI 302. The content description can include the link to the one or more files.

Next, block 1402 includes determining, at the one or more processors, a condition indicative of the first computing device being unable to display the one or more files with at least a minimum quality level. Examples of the condition described elsewhere in this description are applicable here.

Next, block 1403 includes determining, at the one or more processors, a second computing device configured to display the one or more files is available to receive the one or more files. In the implementations, in which the DCD 104, 200 is the first computing device, the CCD 108, 261 can be the second computing device. In the implementations, in which the CCD 108, 261 is the first computing device, the DCD 104, 200 can be the second computing device. In some implementations, the one or more processors can scan for registered computing devices in proximity to the first computing device. In those or other implementations, the one or more processors can refer to registered device data 260 to determine computing devices registered to the first computing device. As an example, making the determination at block 1403 can include determining the second computing device is connected to the communication network 102 (e.g., the second computing device is connected to a cellular and/or WI-FI® network).

Next, block 1404 includes making a determination, at the one or more processors, that (i) the first computing device has a better network connection to receive the one or more files from a third computing device associated with the link to the one or more files than the second computing device, or (ii) the second computing device has a better network connection to receive the one or more files from the third computing device associated with the link to the one or more files than the first computing device. As an example, making the determination at block 1404 can include determining the second computing device has a better network connection to the cellular and/or to the WI-FI® network than the first computing device has to the cellular and/or to the WI-FI® network. Determining the better network connection can include determining which network is currently able to transmit data at a faster rate. The processor can execute or request another device, such as the second computing device, to perform a speed test that determines a rate at which a network transmits data to the first computing device or to the second computing device.

Next, block 1405 includes, in response to making the determination, (1) outputting by the one or more processors, a request for the one or more files from the third computing device associated with the link, (2) receiving the one or more files at the first computing device, and (3) outputting, by the one or more processors, the one or more files to the second computing device via a direct connection between the first computing device and the second computing device. These functions can be performed if the determination is that the first computing device has a better network connection to receive the one or more files from the third computing device associated with the link than the second computing device. The direct connection can include the PAN 110 established between the DCD 104 and the CCD 108.

Next, block 1406 includes outputting the link to the one or more files to the second computing device via the direct connection between the first computing device and the second computing device. This function is performed if the processor determines the second computing device has a better network connection to receive the one or more files from the third computing device associated with the link than the first computing device. The direct connection can include the PAN 110 established between the DCD 104 and the CCD 108.

J. Tenth Example Operation

Next, FIG. 15 shows a flowchart depicting a set of functions 1500 (or more simply "the set 1500") that can be carried out in accordance with the example implementations described in this description. The set 1500 includes the functions shown in blocks labeled with whole numbers 1501 through 1504 inclusive. The description of the set 1500 includes references to elements shown in other figures described in this description, but the functions of the set 1500 are not limited to being carried out only by the referenced elements. A variety of methods can be performed using all of the functions shown in the set 1500 or any proper subset of the functions shown in the set 1500. Any of those methods can be performed with other functions such as one or more of the other functions described in this description. As yet another example, a method can include performing a function of the set 1500 and one or more functions from the sets 600, 700, 800, 900, 1000, 1100, 1200, 1300 and/or 1400.

Block 1501 includes receiving, at one or more processors, a web-resource link and a matrix code. The web-resource link includes a link to one or more web resources. The matrix code is encoded with the web-resource link.

In at least some example implementations, the one or more processors include the processor 202. In those implementations, receiving the web-resource link and the matrix code can include the processor 202 receiving the web-resource link and the matrix code from the network transceiver 204 and/or the memory 212. In at least some of those implementations, the network transceiver 204 receives the web-resource link and the matrix code from a server, such as the server 106, 500, 520, 560, the file server 114, or the media server 116. In at least some of the foregoing implementations, receiving the web-resource link and/or the matrix code can include receiving a web page displayable by a web browser application the one or more processors are executing. The web page can include the web-resource link and/or the matrix code.

In at least some example implementations, the web-resource link received by the one or more processors can include or be arranged as a URI to a site on the World Wide Web. The one or more processors can provide the web-resource link to the memory 212 for storage as the link 242. As an example, the URI can include a file transfer protocol (FTP) URI. As another example, the URI can include a hyper-text transfer protocol URI, such as an HTTP URI or an HTTPS URI. As yet another example, the web-resource link can be arranged like the HTTP URI shown within the link display 1635.

In at least some example implementations, the matrix code received at the one or more processors can include or be arranged like the matrix code 400, 1650. The one or more processors can provide the matrix code to the memory 212 for storage as the matrix code 244.

In at least some example implementations, the one or more processors can receive the web-resource link and the matrix code while executing the application (described above) for performing a diagnostic function.

Next, block 1502 includes determining, at the one or more processors based at least in part on the web-resource link, a condition indicative of the first computing device being unable to traverse the web-resource link.

In at least some example implementations, the DCD 200 does not include a browser application executable by the processor 202. The DCD 200 may not include a browser application due to an amount of memory required to store the browser application, such as 15 megabytes (MB) to 350 MB, or for some other reason. In accordance, with those implementations, the processor 202 can determine the web-resource link cannot be traversed because a web browser is needed to traverse the link and/or the DCD 200 does not include a browser.

In those or in other implementation, the DCD 200 can be registered to access web-services performed by the server 106 without use of a browser, such as by the FTP, the trivial file transfer protocol (TFTP), and/or a script executable by the processor 202 to establish a connection with the server 106 (e.g., a particular socket at the server 106). However, for the set 1500, the processor 202 can determine that the web-resource link is a link to a generic web resource that the processor 202 cannot traverse, such as a web page that is available from a server other than the server to which the DCD 200 is registered.

Next, block 1503 includes outputting, by the one or more processors in response to determining the condition indicative of the first computing device being unable to traverse the web-resource link, the matrix code to a first display operatively coupled to the one or more processors. In accordance with at least some implementations, outputting the matrix code to the first display can include the one or more processors reading the file 248 and outputting data values representative of the matrix code to a processor arranged as a video card operatively connected to the display 232.

Next, block 1504 includes displaying, on the first display, the matrix code. In accordance with an example implementation, the first display can include the display 232. In at least some of those implementations, displaying the matrix code can include displaying the matrix code 1650 as shown in FIG. 16C. As an example, the first display can display text descriptive of the matrix code in proximity to the matrix code on the display 232, such as the text "Scan matrix code with companion computing device for link to Video1.MP4," as shown in FIG. 16C.

In accordance with at least some implementations, a companion computing device such as the CCD 108, 261 can scan the matrix code displayed on the first display, decode the matrix code to obtain the web-resource link, request a web-resource from a computing device associated with the web-resource link, receive the web-resource, and output the web-resource at the CCD 108, 261. In accordance with this implementation, the web-resource can include a video file.

V. Example Display Outputs

FIG. 16A shows, in accordance with an example implementation, a display output 1601 displayed on the display 232. The display output 1601 shows the vehicle model year selection 1624, a vehicle make selection 1626, a vehicle model selection 1628, an engine size selection 1630, and a vehicle identifier 1632. The rectangles in the vehicle model year selection 1624, the vehicle make selection 1626, the vehicle model selection 1628, the engine size selection 1630 represent selections that have been made on the display 232. The vehicle identifier 1632 shows a result of the making selections on the display 232 while the display output 1601 is displayed. The data in the vehicle identifier 1632 can be stored in the memory 212 as the vehicle identifier 250. The display 232 can display a next selector 1620 and a back selection 1622. The next selector 1620 can be configured to be selectable to cause the processor 202 to output a next display output on the display 232. The back selection 1622 can be configured to be selectable to cause the processor 202 to output a most-recently displayed display output shown on the display 232.

Next, FIG. 16B shows, in accordance with an example implementation, a display output 1603 in which a symptom identifier may be selected and/or entered. The processor 202 can cause the display output 1603 to be shown in response to selection of the next selector 1620 while the display output 1601 is shown on the display 232. The display output 1603 shows a DTC symptom selection 1636, a manual symptom selection 1638, and an RO symptom selection 1640. Selection of the DTC symptom selection 1636 can cause the VCT 206 to transmit a VDM to request the vehicle 112 to respond with a VDM indicating DTC set by an ECU in the vehicle 112. The display output 1603 shows a list of DTC 1537 set in the vehicle 112. Selection of the manual symptom selection 1638 can provide a way to manually enter a symptom exhibited by the vehicle 112. Selection of the RO symptom selection 1640 can cause the processor 202 to determine a symptom recorded on an RO regarding the vehicle 112. The vehicle identifier entered via the display 232 while the display output 1601 is shown and the symptom identifier entered via the display 232 while the display output 1603 is shown can be contained in a search request, such as the search request 610. The display output can include a selector 1621 selectable to cause the network transceiver 204 to transmit the search request 610.

Next, FIG. 16C shows, in accordance with an example implementation, a display output 1605 displayable on a display, such as the display 232. The processor 202 can cause the display output 1605 to be shown upon receiving a search request response, such as a response to the search request 610. The display output 1605 includes the vehicle identifier 1632 and a symptom identifier 1642. The symptom identifier 1642 shows a result of the making selections on the display 232 while the display output 1603 is displayed.

The display output 1605 includes diagnostic information selectors 1646 selectable to cause the display 232 to display diagnostic information, such as the diagnostic information 644, 652, 672. The diagnostic information selectors 1646 and/or the diagnostic information displayable in response to selection of one of the diagnostic information selectors 1646 can be received in a search request response. The diagnostic information displayable in response to selection of one of the diagnostic information selectors 1646 can include the diagnostic information 264. As shown in FIG. 16C, the diagnostic information selectors 1646 include diagnostic information selector 1627, 1629, 1641, 1648 that are associated with an OEM flowchart, a technical service bulletin, an MP4 video file, and the MP4 video file, respectively. Other examples of diagnostic information associated with one or more of the diagnostic information selectors 1646 are also possible.

As an example, the OEM flowchart can include a diagnostic flowchart for the symptom identified by the symptom identifier 1642. The diagnostic information selector 1641, 1648 is configured as a video file requester. The diagnostic information selector 1641 includes a URI 1653 associated with a video file. The diagnostic information selector 1648 includes a thumbnail image for the video file.

The display output 1605 includes a matrix code 1650. The matrix code 1650 can include a visual representation of the matrix code 654 contained in the search request response 650 and/or the matrix code 244 stored in the memory 212. The display output 1605 also includes network status identifiers 1652, 1654. As an example, the network status identifier 1652 can represent a condition of a WI-FI® network connection to the DCD 200 and the network status identifier 1654 can represent a condition of a cellular network connection to the DCD 200. Other display outputs shown in the figures also show network status identifiers 1652, 1654.

As another example, a diagnostic information selector displayed on a display output, such as the display output 1605, can include a diagnostic information selector associated with a scan tool function identifier that identifies a scan tool function that the DCD 104, 200 can perform. As an example, the scan tool function can include transmitting a VDM to a vehicle connected to the VCT 206. As another example, the scan tool function can include displaying data contained in a VDM the vehicle sends in response the VDM. The data, for example, can include a PID and a parameter associated with the PID. As yet another example, the scan tool function can include sending a VDM including a VDM to perform a functional test, a component test, or a reset procedure, a calibration procedure, and/or a reprogramming procedure in the vehicle 112.

Next, FIG. 16D shows, in accordance with an example implementation, a display output 1607 displayable on a display, such as the display 232. The display output 1607 includes a list 1656 of registered devices. The display output 1607 includes a selector 1658, 1659 to select a registered device. A selector, such as the next selector 1620, can be selected to cause the DCD 200 to initiate connecting to the selected registered device, such as a CCD.

Figures 16E, 16F:
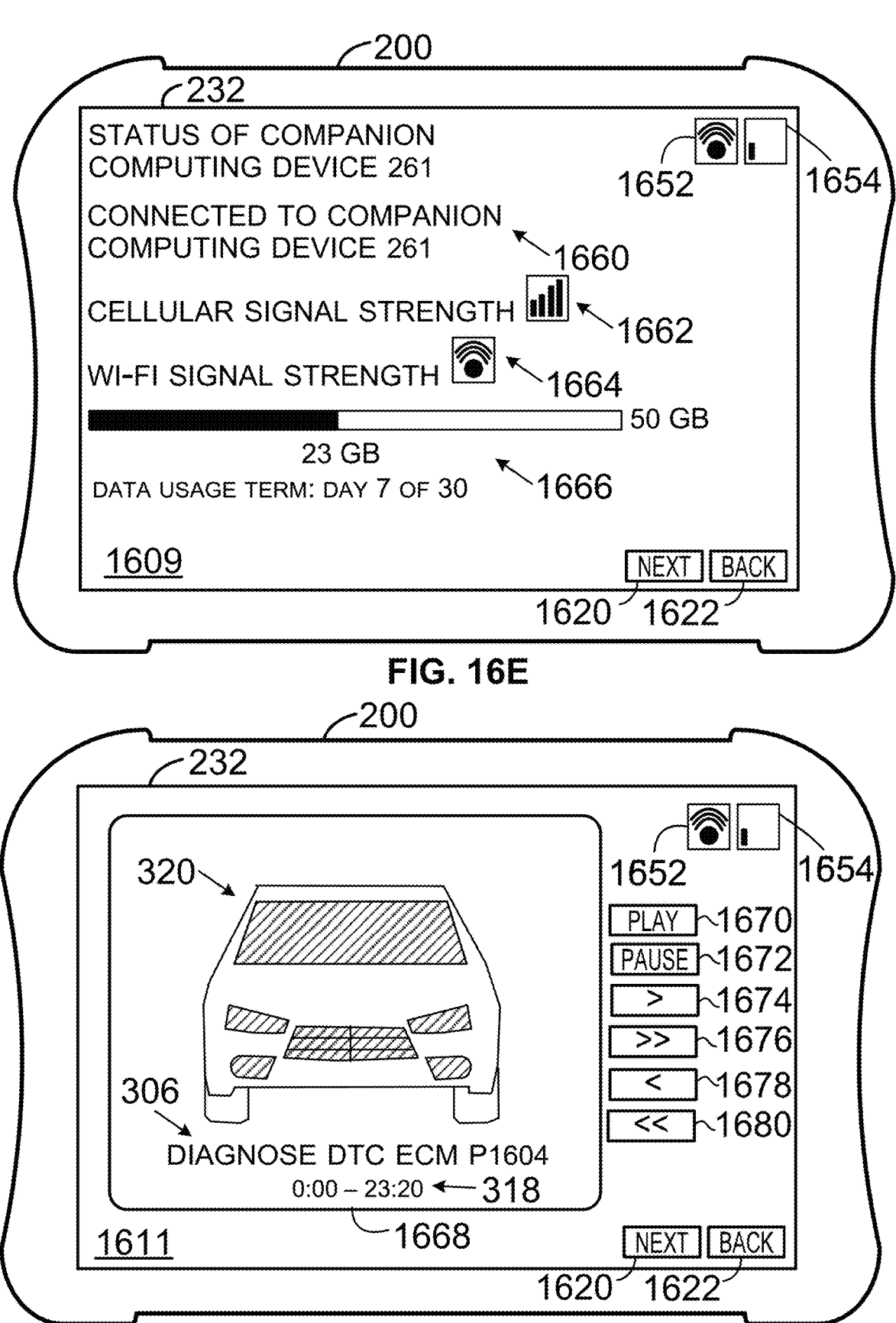

Next, FIG. 16E shows, in accordance with an example implementation, a display output 1609 displayable on a display, such as the display 232. The display output 1609 includes information regarding a status of a registered CCD, such as the CCD 261 registered with DCD 200. As shown in FIG. 16E, the information regarding the status of the registered CCD can include an indicator 1660 indicating whether or not the CCD is connected to the DCD. For situations in which the CCD 261 and the DCD 200 are connected, the DCD 200 can receive information from the CCD 261 regarding the connection(s) the CCD 261 has with the communication network 102. The display output 1609 includes an indicator 1662 representing a signal strength of a cellular network received by the CCD 261. The display output 1609 includes an indicator 1664 representing a signal strength of a WI-FI® network received by the CCD 261.

The DCD 200 can receive information from the CCD 261 regarding data usage of the CCD 261. The display output 1609 includes an indicator 1666 representing the data usage of the CCD 261. As an example, the indicator 1666 can represent how much data the CCD 261 has transmitted and/or received using the cellular network during a service agreement term. A user of the DCD 200 can refer to the indicators 1662, 1664, 1666 to determine whether to engage the CCD 261 to download the video file. For instance, the user may not want to download the video file using the CCD 261 if downloading the video file would occur via the cellular network. Moreover, the processor 202 could execute the CRPI 240 to determine whether to download the video file based on the information that is used to provide the indicators 1662, 1664, 1666.

As an example, the service agreement associated with the CCD 261 may allow the CCD 261 to transmit and/or receive fifty GB of data monthly without any additional cost to the owner of the CCD 261. The owner may be charged an additional fee for each additional GB of data used during a month in which the CCD 261 uses more than fifty GB of data. Downloading a seven GB video file may not be desirable if the CCD 261 has to download the video file via a cellular network connection.

Next, FIG. 16F shows, in accordance with an example implementation, a display output 1611 displayable on a display, such as the display 232. The display output 1611 shows a display window 1668 in which the file 248 can be displayed. FIG. 16F shows the visual representation 320 of the thumbnail image 256 and at least portion of the subject description 306 and the play-time 318 displayed in the display window 1668. The display output 1611 includes control selectors 1670, 1672, 1674, 1676, 1678, 1680 selectable to cause the processor 202 to control playing of the video file within the display window 1668. The control selector 1670 is for playing the video file within the display window 1668. The control selector 1672 is for pausing play of the video file within the display window 1668. The control selectors 1674, 1676 are for fast forwarding play of the video file at different speeds and the control selectors 1678, 1680 are for fast reversing play of the video file at different speeds. Additionally or alternatively, the DCD 200 can include a hardware key to cause the processor 202 to control playing of the video file within the display window 1668, similar to the use of any the control selectors 1670, 1672, 1674, 1676, 1678, 1680.

Figures 16G, 16H:
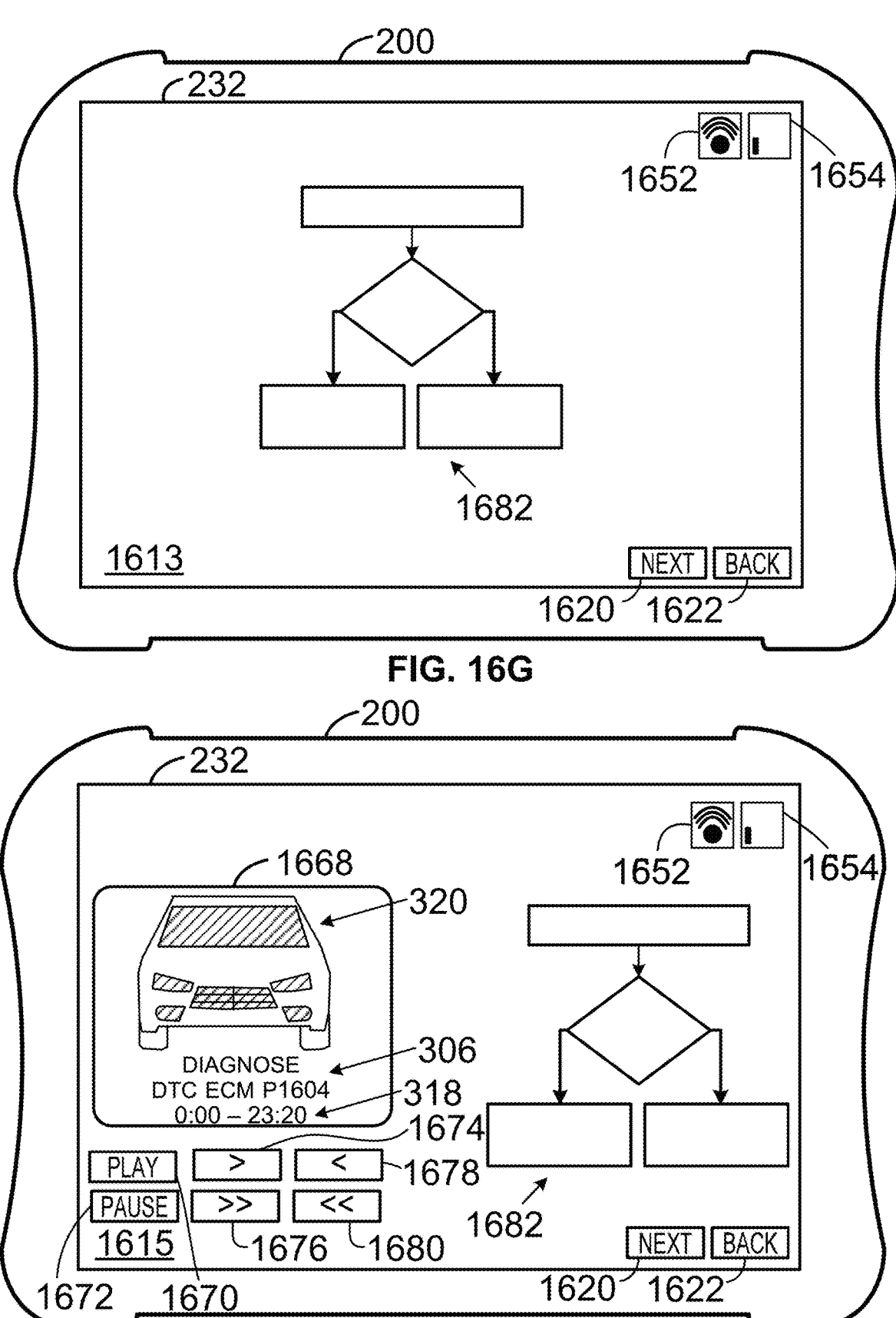

Next, FIG. 16G shows, in accordance with an example implementation, a display output 1613 displayable on a display, such as the display 232. The display output 1613 shows a flow chart 1682. The flow chart 1682 can be part of the diagnostic information the DCD 200 receives from the server 106, 500, 520, such as the diagnostic information 644, 652 the DCD 200 receives in response to sending the search request 610 and/or in response to sending an communication indicating a diagnostic information selector, such as the diagnostic information selector 1627, has been selected. The DCD 200 may display non-video diagnostic information on the display 232 for a situation in which the DCD 200 cannot display a video file or a situation in which the display 232 cannot display both a video file and non-video diagnostic information simultaneously.

Next, FIG. 16H shows, in accordance with an example implementation, a display output 1615 displayable on a display, such as the display 232. The display output 1615 shows variations of the display outputs 1611, 1613 in that the display output 1615 shows the display window 1668 with the visual representation 320 of the thumbnail image 256, the control selectors 1670, 1672, 1674, 1676, 1678, 1680, and the flow chart 1682. The DCD 200 may display the display output 1615 for a situation in which a CCD connected to the DCD 200 cannot display a video file with at least a minimum video quality level and the DCD 200 is configured to display the video file. Other examples of a situation in which the DCD 200 displays a display output with a video file and non-video diagnostic information are also possible.

Figure 16I:
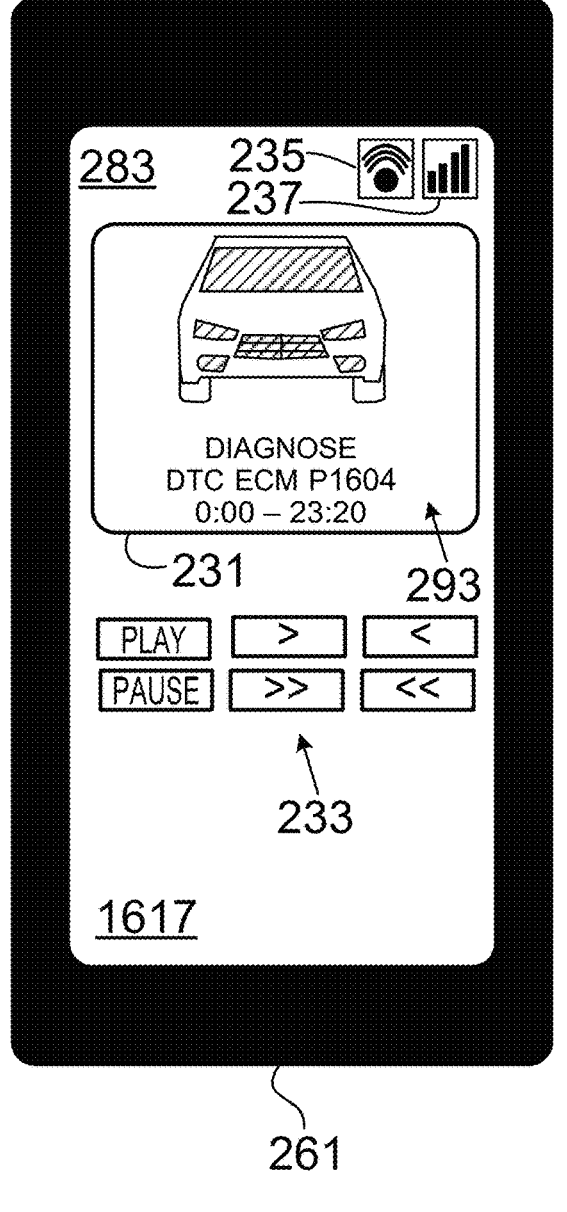

Next, FIG. 16I shows, in accordance with an example implementation, a display output 1617 displayable on a display, such as the display 283. The display output 1617 includes a display window 231 showing the file 293. The display output 1617 also includes control selectors, similar to the control selectors 1670, 1672, 1674, 1676, 1678, 1680. The display output 1617 also includes network status identifiers 235, 237. As an example, the network status identifier 235 can represent a condition of a WI-FI® network connection to the CCD 261 and the network status identifier 237 can represent a condition of a cellular network connection to the CCD 261.

Figure 16J:
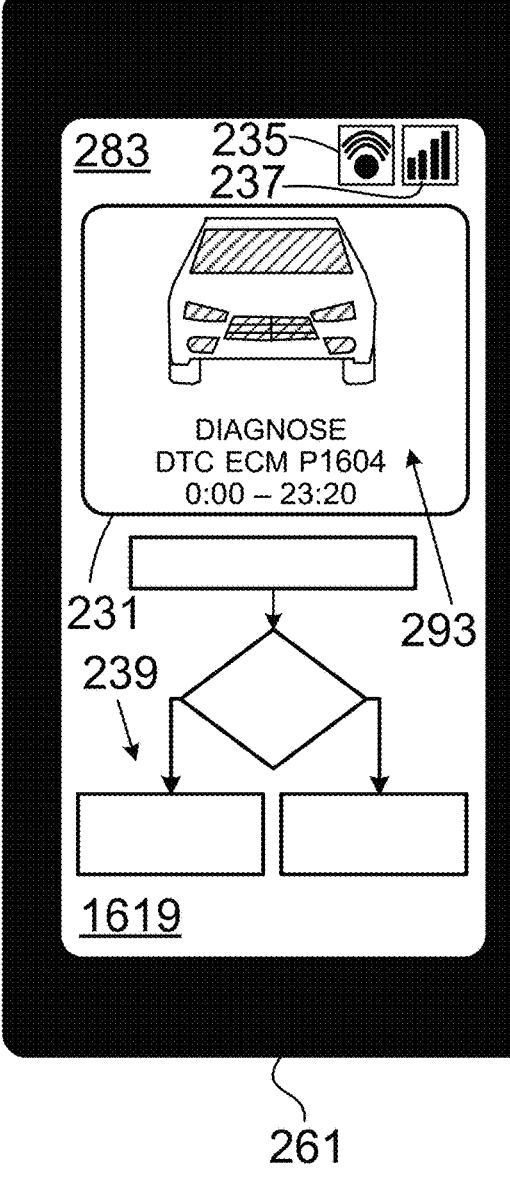

Next, FIG. 16J shows, in accordance with an example implementation, a display output 1619 displayable on a display, such as the display 283. The display output 1619 includes a display window 231 showing the file 293 and diagnostic information, such as an OEM flowchart 239. The display 283 can also show content shown in the display outputs 1601, 1603, 1605, 1607, 1609, 1611, 1613, 1615.

Figure 16K:
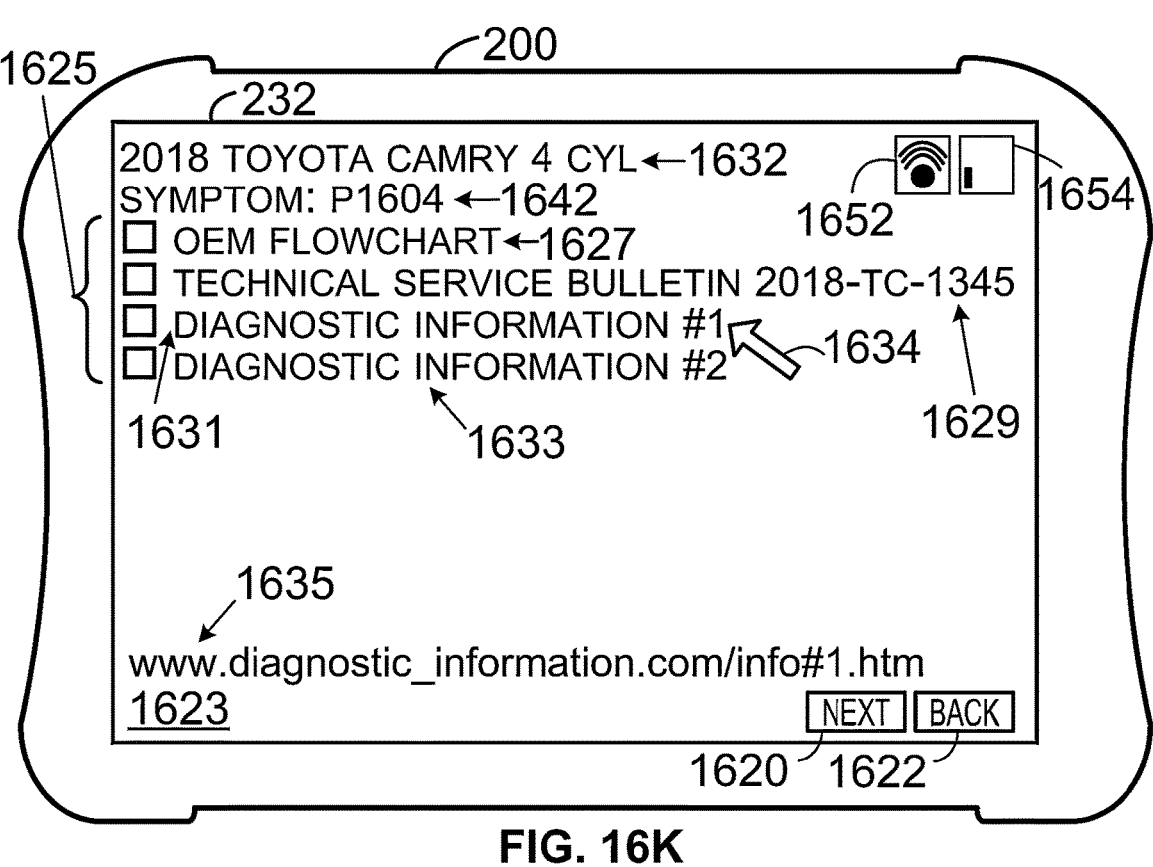

Next, FIG. 16K shows a display output 1623 displayable on a display, such as the display 232. The processor 202 can cause the display output 1623 to be shown upon receiving a search request response, such as a response to the search request 610. The display output 1623 includes the next selector 1620, the back selection 1622, the vehicle identifier

1632, the pointer 1634, the symptom identifier 1642, and network status identifiers 1652, 1654, all of which are described elsewhere.

The display output 1623 includes diagnostic information selectors 1625 selectable to cause the display 232 to display diagnostic information, such as the diagnostic information 644, 652, 672. The diagnostic information selectors 1625 and/or the diagnostic information displayable in response to selection of one of the diagnostic information selectors 1625 can be received in a search request response. The diagnostic information displayable in response to selection of one of the diagnostic information selectors 1625 can include the diagnostic information 264. As shown in FIG. 16K, the diagnostic information selectors 1625 include diagnostic information selectors 1627, 1629, 1631, 1633 that are associated with an OEM flowchart, a technical service bulletin, diagnostic information #1, and diagnostic information #2, respectively. Other examples of diagnostic information associated with one or more of the diagnostic information selectors 1625 are also possible.

The pointer 1634 is movable to different positions on the display 232. FIG. 16K shows the pointer 1634 on the diagnostic information selector 1631, and a link display 1635. In FIG. 16K, the link display 1635 displays a link associated with the diagnostic information selector 1631. Upon moving the pointer 1634 off of the diagnostic information selector 1631, the link display 1635 stops displaying the link associated with the diagnostic information selector 1631. The link display 1635 can provide an indication of a URI and/or web-resource link available for traversing. If the DCD 200 can traverse the URI and/or web-resource link shown by the link display 1635, double clicking the diagnostic information selector 1631 can cause the processor 202 to transmit a request for the content associated with that URI and/or web-resource link.

Figure 16L:
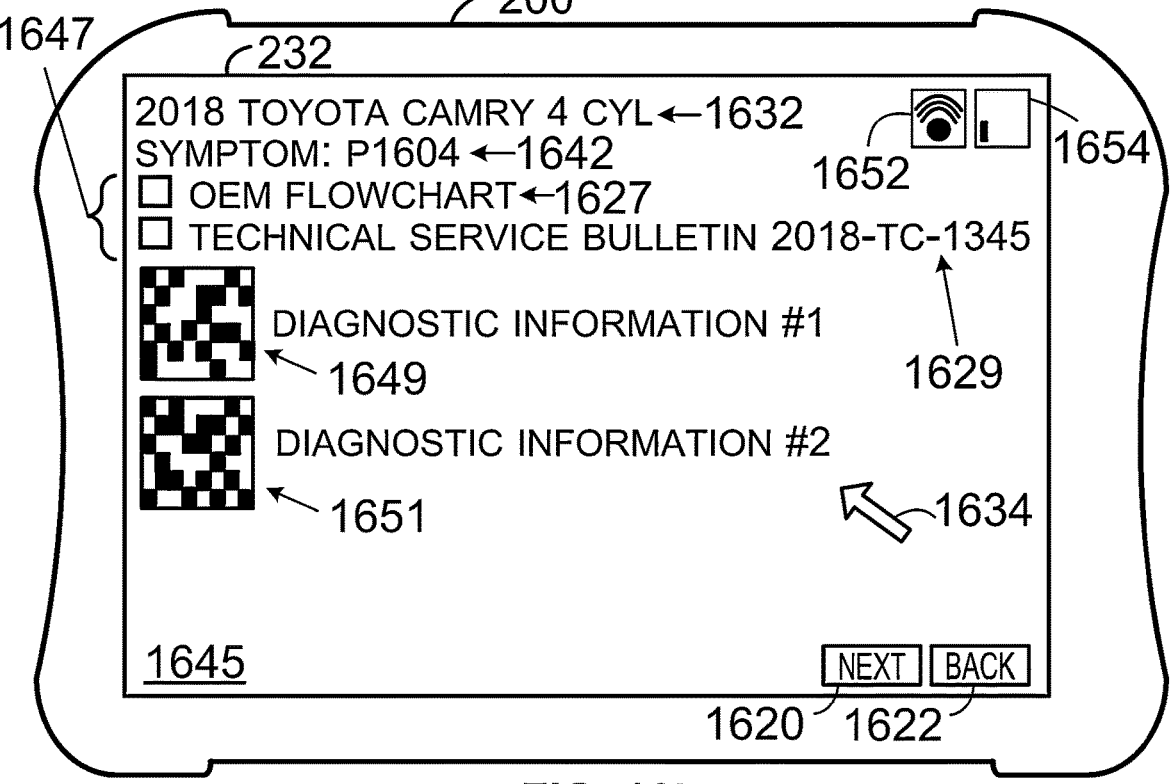

Next, FIG. 16L shows a display output 1645 displayable on a display, such as the display 232. The processor 202 can cause the display output 1645 to be shown upon receiving a search request response, such as a response to the search request 610. The display output 1645 includes the next selector 1620, the back selection 1622, the vehicle identifier 1632, the pointer 1634, the symptom identifier 1642, and network status identifiers 1652, 1654, all of which are described elsewhere.

The display output 1645 includes diagnostic information selectors 1647 selectable to cause the display 232 to display diagnostic information, such as the diagnostic information 644, 652, 672. The diagnostic information selectors 1647 and/or the diagnostic information displayable in response to selection of one of the diagnostic information selectors 1647 can be received in a search request response. The diagnostic information displayable in response to selection of one of the diagnostic information selectors 1647 can include the diagnostic information 264. As shown in FIG. 16L, the diagnostic information selectors 1647 include diagnostic information selectors 1627, 1629 that are associated with an OEM flowchart, and a technical service bulletin, respectively. Other examples of diagnostic information associated with one or more of the diagnostic information selectors 1647 are also possible.

The display output 1645 includes a matrix code 1649, 1651. The matrix code 1649, 1651 can encode a link, such as a web-resource link. As an example, the matrix code 1649 can encode a link, such as the link shown as the link display 1635. As another example, the matrix code 1651 can encode a link, such as the URI 1653 shown in FIG. 16C.

The display output 1623 can be displayed in connection with example implementations in which the DCD 200 is able to traverse a web-resource link, such as the link encoded in the matrix code 1649, 1651. The display output 1645 can be displayed in connection with example implementations in which the processor 202 determines the DCD 200 is unable to traverse a web-resource link, such as the link encoded in the matrix code 1649, 1651. The display output 1623, 1645 can be displayed in connection with other example implementations.

VI. Example Vehicle

A vehicle, such as vehicle 112, is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, and the like. A vehicle can include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can include an electronic control unit (ECU), a data link connector (DLC), and a vehicle communication bus that connects the DLC to the ECU. A vehicle can be configured to operate as an autonomous vehicle.

Some vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E shown in the drawings is 2018/Toyota/Camry/4Cyl, in which "2018" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles, are associated with a unique vehicle identification number (VIN). Some VIN include seventeen alpha-numeric characters. Some of the characters for at least some VIN represent a YMME or a YMM. In some instances, a vehicle includes a one dimensional bar code indicative of a VIN associated with that vehicle.

A vehicle communication bus within a vehicle can include one or more conductors (e.g., copper wire conductors) and/or can be wireless. As an example, a vehicle communication bus can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 16764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

The DLC can include an on-board diagnostic (OBD) connectors, such as an OBD II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Aptiv LLC of Dublin, Ireland. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication bus such that the DLC is operatively connected to the ECU.

An ECU can control various aspects of vehicle operation and/or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) to a particular state (such as active or history).

VII. CONCLUSION

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," or "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is a method comprising: receiving, at one or more processors, a content description and a matrix code, wherein the content description includes data describing one or more files, wherein each of the one or more files includes a computer-readable file, and wherein the matrix code is encoded with a link to the one or more files; determining, at the one or more processors based, at least in part, on the content description, a condition indicative of a first computing device being unable to display the one or more files with at least a minimum quality level; outputting, by the one or more processors in response to determining the condition indicative of the first computing device being unable to display the one or more files with at least the minimum quality level, the matrix code to a first display operatively coupled to the one or more processors; and displaying, on the first display, the matrix code.

EEE 2 is the method of EEE 1, further comprising: outputting, by the one or more processors after determining the condition indicative of the first computing device being unable to display the one or more files with at least the minimum quality level, a file requester to the first display; displaying, on the first display, the file requester; transmitting, in response to a selection of the file requester, a request for the one or more files from a remote device associated with the link to the one or more files; receiving, at the one or more processors in response to the request for the one or more files, the one or more files; and outputting, by the one or more processors, the one or more files to a second display device, wherein the first computing device includes the one or more processors and the first display.

EEE 3 is the method of EEE 2, further comprising: displaying, on the second display device, the one or more files, wherein displaying the one or more files includes displaying information pertaining to a service function; and servicing a vehicle by performing the service function, wherein performing the service function includes: removing a vehicle component from the vehicle, installing a vehicle component onto the vehicle, diagnosing a vehicle component on the vehicle is defective, adjusting a vehicle component on the vehicle, recalibrating a vehicle component on the vehicle, resetting a vehicle component on the vehicle, setting up a target in proximity to the vehicle, or reprogramming a vehicle component on the vehicle.

EEE 4 is the method of EEE 2 or 3, wherein the second display device is within a vehicle component affixed within a passenger compartment of a vehicle.

EEE 5 is the method of EEE 2 or 3, wherein the second display device includes a smart phone or a tablet device.

EEE 6 is the method of any one of EEEs 1 to 5, wherein the one or more files includes a video file, and wherein the content description includes data indicating one or more of: a uniform resource indicator of the video file, a file name of the video file, a content description of the video file, a size of the video file, a resolution of the video file, a compression format of the video file, a file type extension of the video file, a thumbnail image of a portion of the video file, an encoding bit rate of the video file, or a play time of the video file.

EEE 7 is the method of any one of EEEs 1 to 5, wherein the content description includes data indicating one or more of: (i) a uniform resource indicator associated with at least one of the one or more files, (ii) a file name of at least one of the one or more files, (iii) a size of at least one of the one or more files, (iv) a resolution of at least one of the one or more files, (v) a compression format of at least one of the one or more files, (vi) a file type extension of at least one of the one or more files, (vii) a thumbnail image of at least one of the one or more files, (viii) an encoding bit rate of at least one of the one or more files, or (ix) a play time of at least one of the one or more files.

EEE 8 is the method of any one of EEEs 1 to 7, wherein the first computing device includes the one or more processors and the first display, and wherein determining the condition indicative of the first computing device being unable to display the one or more files with at least the minimum quality level includes the one or more processors determining the first computing device is not configured to display a video file.

EEE 9 is the method of EEE 8, further comprising: outputting, by the one or more processors after determining the first computing device is not configured to display the one or more files, a file requester to the first display; displaying, on the first display, the file requester; transmitting, in response to a selection of the file requester, a request for the one or more files from a remote device associated with the link to the one or more files; receiving, at the one or more processors in response to the request for the one or more files, the one or more files; and outputting, by the one or more processors, the one or more files to a second display device, wherein the first computing device includes the one or more processors and the first display.

EEE 10 is the method of EEE 1, wherein the one or more files includes a video file, wherein the first computing device includes the one or more processors and the first display, and wherein determining the condition indicative of the first computing device being unable to display the one or more files with at least the minimum quality level includes the one or more processors determining a communication network used by the first computing device is insufficient for transmitting the video file for displaying the video file continuously from a beginning of the video file to an end of the video file once playing of the video file at the first computing device begins, or is insufficient for transmitting, within a threshold amount of time a portion of video file for displaying the video file continuously from a beginning of the video file to an end of the video file once playing of the video file at the first computing device begins.

EEE 11 is the method of EEE 1, further comprising: outputting, by the one or more processors after determining the condition indicative of the first computing device being unable to display the one or more files with at least the minimum quality level, a file requester to the first display, wherein the file requester is selectable to cause the one or more processors to request the one or more files for displaying on the first display; displaying, on the first display, the file requester; transmitting, in response to a selection of the file requester, a request for the one or more files from a remote device associated with the link to the one or more files; receiving, at the one or more processors in response to the request for the one or more files, the one or more files; outputting, by the one or more processors, the one or more files to the first display; and displaying, on the first display, the one or more files at a level below the minimum quality level.

EEE 12 is the method of EEE 1, wherein a second computing device comprises the one or more processors and the first display, wherein the first computing device is registered with the second computing device, wherein determining the condition indicative of the first computing device being unable to display the one or more files with at least the minimum quality level occurs in response to the one or more processors determining the second computing device cannot display the one or more files with a least a quality level at which the first display can display the one or more files, wherein the second computing device is configured for transmitting the one or more files to the first computing device, and wherein the first computing device is configured for receiving the one or more files from the second computing device.

EEE 13 is the method of EEE 12, further comprising: outputting, by the one or more processors, a file requester to the first display, wherein the file requester is selectable to cause the one or more processors to request the one or more files for displaying on the first display; displaying, on the first display, the file requester; transmitting, in response to a selection of the file requester, a request for the one or more files from a remote device associated with the link to the one or more files; receiving, at the one or more processors in response to the request, the one or more files; outputting, by the one or more processors, the one or more files to the first display; and displaying, on the first display, the one or more files.

EEE 14 is the method of EEE 12, further comprising: outputting, by the one or more processors, a file requester to the first display; displaying, on the first display, the file requester; transmitting, in response to a selection of the file requester, a request for the one or more files from a remote device associated with the link to the one or more files; receiving, at the one or more processors in response to the request for the one or more files, the one or more files; and outputting, by the one or more processors, the one or more files to the first computing device.

EEE 15 is the method of EEE 12, further comprising: outputting, by the one or more processors, a file requester to the first display, wherein the file requester is selectable to cause the one or more processors to request the one or more files for displaying on the first display; displaying, on the first display, the file requester; transmitting, in response to a selection of the file requester, a request for the one or more files from a remote device associated with the link to the one or more files; receiving, at the one or more processors in response to the request for the one or more files, the one or more files; outputting, by the one or more processors, the one or more files to the first display; and displaying, on the first display, the one or more files at a level below the minimum quality level.

EEE 16 is the method of EEE 1, wherein a second computing device includes the one or more processors and the first display, wherein the first computing device is registered with the second computing device, wherein determining the condition indicative of the first computing device being unable to display the one or more files with at least the minimum quality level includes the one or more processors determining the second computing device cannot communicate with the first computing device, wherein the second computing device is configured for transmitting the one or more files to the first computing device, and wherein the first computing device is configured for receiving the one or more files from the second computing device.

EEE 17 is the method of EEE 1, further comprising: determining, at the one or more processors, the first computing device can communicate with a second computing device, wherein the first computing device includes the one or more processors and the first display, and wherein the second computing device includes a second display and is registered with the first computing device; and transmitting, by the first computing device to the second computing device, the link to the one or more files.

EEE 18 is the method of any one of EEEs 1 to 17, wherein the content description includes multiple content descriptions, wherein the matrix code includes multiple matrix codes, wherein the multiple matrix codes include a separate matrix code for each of the multiple content descriptions, the method further comprising: receiving, at the one or more processors, content order information, wherein displaying the matrix code includes displaying the matrix codes according to the content order information.

EEE 19 is the method of EEE 1, wherein receiving the content description and the matrix code includes receiving a webpage including the content description and the matrix code, wherein the content description includes a link within the webpage, and wherein determining the condition includes determining the one or more processors cannot traverse the link within the webpage.

EEE 20 is a computing device comprising: one or more processors; and a non-transitory computer readable medium configured to store at least executable instructions, wherein the executable instructions, when executed by the one or more processors, cause the computing device to perform functions comprising: receiving, at the one or more processors, a content description and a matrix code, wherein the content description includes data describing one or more files, wherein each of the one or more files includes a computer-readable file, and wherein the matrix code is encoded with a link to the one or more files; determining, at the one or more processors based on the content description, a condition indicative of a first computing device being unable to display the one or more files with at least a minimum quality level; outputting, by the one or more processors in response to determining the condition indicative of the first computing device being unable to display the one or more files with at least the minimum quality level, the matrix code to a first display operatively coupled to the one or more processors; and displaying, on the first display, the matrix code.

EEE 21 is a computing system comprising: a computing device; and a computer-readable medium storing program instructions, that when executed by the computing device, cause a set of functions to be performed, the set of functions comprising a method in accordance with any one of EEEs 1 to 19.

EEE 22 is a non-transitory computer readable medium configured to store at least executable instructions, wherein the executable instructions, when executed by one or more processors of a computing device, cause the computing device to perform functions comprising: receiving, at the one or more processors, a content description and a matrix code, wherein the content description includes data describing one or more files, wherein each of the one or more files includes a computer-readable file, and wherein the matrix code is encoded with a link to the one or more files; determining, at the one or more processors based on the content description, a condition indicative of a first computing device being unable to display the one or more files with at least a minimum quality level; outputting, by the one or more processors in response to determining the condition indicative of the first computing device being unable to display the one or more files with at least the minimum quality level, the matrix code to a first display operatively coupled to the one or more processors; and displaying, on the first display, the matrix code.

EEE 23 is a computer-readable medium storing program instructions, that when executed by a computing device, cause a set of functions to be performed, the set of functions comprising a method in accordance with any one of EEEs 1 to 19.

EEE 24 is a method comprising: receiving, at one or more processors within a first computing device, a content description, wherein the content description includes data describing one or more files and a link to the one or more files; determining, at the one or more processors, a condition indicative of the first computing device being unable to display the one or more files with at least a minimum quality level; determining, at the one or more processors, a second computing device configured to display the one or more files is available to receive the one or more files; making a determination, at the one or more processors, that the first computing device has a better network connection to receive the one or more files from a third computing device associated with the link than the second computing device or that the second computing device has a better network connection to receive the one or more files from the third computing device associated with the link than the first computing device; if the determination is that the first computing device has a better network connection to receive the one or more files from the third computing device associated with the link than the second computing device, then in response to making the determination, outputting by the one or more processors, a request for the one or more files from the third computing device associated with the link, receiving the one or more files at the first computing device, and outputting, by the one or more processors, the one or more files to the second computing device via a direct connection between the first computing device and the second computing device, otherwise, if the determination is that the second computing device has a better network connection to receive the one or more files from the third computing device associated with the link than the first computing device, then outputting the link to the second computing device via the direct connection between the first computing device and the second computing device.

EEE 25 is the method of EEE 24, wherein determining the condition is based on at least a portion of the content description.

EEE 26 is the method of EEE 24 or 25, wherein the second computing device is within a vehicle component affixed within a passenger compartment of a vehicle.

EEE 27 is the method of EEE 24 or 25, wherein the second computing device includes a smart phone or a tablet device.

EEE 28 is the method of any one of EEE 24 to 27, wherein the third computing device includes a server computing device configured to transmit the one or more files in response to the request for the one or more files.

EEE 29 is the method of any one of EEEs 24 to 28, wherein the one or more files includes a video file, and wherein the content description includes data indicating one or more of: a uniform resource indicator of the video file, a file name of the video file, a content description of the video file, a size of the video file, a resolution of the video file, a compression format of the video file, a file type extension of the video file, a thumbnail image of a portion of the video file, an encoding bit rate of the video file, or a play time of the video file.

EEE 30 is the method of any one of EEEs 24 to 28, wherein the content description includes data indicating one or more of: (i) a uniform resource indicator associated with at least one of the one or more files, (ii) a file name of at least one of the one or more files, (iii) a size of at least one of the one or more files, (iv) a resolution of at least one of the one or more files, (v) a compression format of at least one of the one or more files, (vi) a file type extension of at least one of the one or more files, (vii) a thumbnail image of at least one of the one or more files, (viii) an encoding bit rate of at least one of the one or more files, or (ix) a play time of at least one of the one or more files.

EEE 31 is a computing system comprising: a computing device; and a computer-readable medium storing program instructions, that when executed by the computing device, cause a set of functions to be performed, the set of functions comprising a method in accordance with any one of EEEs 24 to 30.

EEE 32 is a computer-readable medium storing program instructions, that when executed by a computing device, cause a set of functions to be performed, the set of functions comprising a method in accordance with any one of EEEs 24 to 30.

EEE 33 is a method comprising: receiving, at one or more processors, a web-resource link and a matrix code, wherein the web-resource link includes a link to one or more web resources, and wherein the matrix code is encoded with the web-resource link; determining, at the one or more processors based, at least in part, on the web-resource link, a condition indicative of a first computing device being unable to traverse the web-resource link; outputting, by the one or more processors in response to determining the condition indicative of the first computing device being unable to traverse the web-resource link, the matrix code to a first display operatively coupled to the one or more processors; and displaying, on the first display, the matrix code.

EEE 34 is the method of EEE 33, wherein the first computing device is within a vehicle component affixed within a passenger compartment of a vehicle.

EEE 35 is the method of EEE 33, wherein the first computing device includes a smart phone or a tablet device.

EEE 36 is the method of any one of EEEs 33 to 35, further comprising: determining, at the one or more processors, the first computing device can communicate with a second computing device configured to traverse the web-resource link, wherein the first computing device includes the one or more processors and the first display, and wherein the second computing device includes a second display and is registered with the first computing device; and transmitting, by the first computing device to the second computing device, the web-resource link.

EEE 37 is the method of any one of EEEs 33 to 36, wherein receiving the web-resource link and the matrix code includes receiving a webpage including the web-resource link and the matrix code.

EEE 38 is a computing system comprising: a computing device; and a computer-readable medium storing program instructions, that when executed by the computing device, cause a set of functions to be performed, the set of functions comprising a method in accordance with any one of EEEs 33 to 37.

EEE 39 is a computer-readable medium storing program instructions, that when executed by a computing device, cause a set of functions to be performed, the set of functions comprising a method in accordance with any one of EEEs 33 to 37.

What is claimed is:
1. A method comprising:
receiving, by one or more processors of a first computing device, a web-resource link and a matrix code, wherein the web-resource link includes a link to one or more web resources, the matrix code is encoded with the web-resource link, the first computing device is configured as a diagnostic computing device, and the diagnostic computing device is registered to access web-services performed by a first server without use of a browser;
determining, by the one or more processors based at least in part on the web-resource link, a condition indicative of the first computing device being unable to traverse the web-resource link, wherein determining the condition includes determining that the web-resource link is a link to a generic web resource available from a second server other than the first server to which the diagnostic computing device is registered;
outputting, by the one or more processors in response to determining the condition indicative of the first computing device being unable to traverse the web-resource link, the matrix code to a first display operatively coupled to the one or more processors; and
displaying, on the first display, the matrix code.
2. The method of claim 1, further comprising:
scanning, by a companion computing device, the matrix code displayed on the first display;
decoding, by the companion computing device, the matrix code to obtain the web-resource link;
requesting, by the companion computing device, the one or more web resources from the second server;

receiving the one or more web resources at the companion computing device; and outputting the one or more web resources on a display at the companion computing device.

3. The method of claim 2, wherein the companion computing device includes a smartphone, a tablet device, a wearable computing device, or a personal computer.

4. The method of claim 2, wherein the one or more web resources include a web page or a video file.

5. The method of claim 1, wherein the web-resource link includes or is arranged as a uniform resource indicator (URI) to a site on the World Wide Web.

6. The method of claim 5, wherein the URI includes a file transfer protocol (FTP) URI or a hyper-text transfer protocol URI.

7. The method of claim 1, wherein outputting the matrix code to the first display includes outputting data values representative of the matrix code to a processor arranged as a video card operatively connected to the first display.

8. The method of claim 1, further comprising:

executing, by the one or more processors, computer-readable program instructions to read a web service description language (WSDL) file to access a web-service from the first server, wherein the web-resource link and the matrix code is received from the first server.

9. The method of claim 1, wherein receiving the web-resource link and the matrix code includes receiving the web-resource link and the matrix code from a network transceiver or non-transitory memory within the first computing device.

10. The method of claim 1, wherein the one or more web resources include a video file.

11. The method of claim 1, wherein the diagnostic computing device is configured to use trivial file transfer protocol to receive the web-resource link and the matrix code.

12. A method comprising:

receiving, by one or more processors of a first computing device, a web-resource link and a matrix code, wherein the web-resource link includes a link to one or more web resources, and the matrix code is encoded with the web-resource link;

determining, by the one or more processors based at least in part on the web-resource link, a condition indicative of the first computing device being unable to traverse the web-resource link;

outputting, by the one or more processors in response to determining the condition indicative of the first computing device being unable to traverse the web-resource link, the matrix code to a first display operatively coupled to the one or more processors; and displaying, on the first display, the matrix code, wherein the first computing device is configured as a diagnostic computing device including the one or more processors, and determining the condition indicative of the first computing device being unable to traverse the web-resource link includes determining a web browser is needed to traverse the web-resource link and/or the diagnostic computing device does not include a web browser.

13. A method comprising:

performing, by one or more processors of a first computing device, a diagnostic function with respect to a vehicle or an electronic control unit within the vehicle, wherein performing the diagnostic function includes requesting performance of a web-service by a server configured to provide a web-resource link and a matrix code to the first computing device;

receiving, by the one or more processors, the web-resource link and the matrix code, wherein the web-resource link includes a link to one or more web resources, the matrix code is encoded with the web-resource link;

determining, by the one or more processors based at least in part on the web-resource link, a condition indicative of the first computing device being unable to traverse the web-resource link;

outputting, by the one or more processors in response to determining the condition indicative of the first computing device being unable to traverse the web-resource link, the matrix code to a first display operatively coupled to the one or more processors; and displaying, on the first display, the matrix code.

14. The method of claim 13, wherein performing the diagnostic function further includes transmitting a communication to the electronic control unit to obtain a diagnostic trouble code or a parameter corresponding to a parameter identifier.

15. The method of claim 14, wherein the communication to the electronic control unit is arranged according to vehicle data message protocol.

16. The method of claim 13, further comprising:

performing a non-diagnostic function via the first computing device, wherein the non-diagnostic function includes a programming function, a calibration function, and/or an adjusting function.

17. A method comprising:

identifying, by one or more processors of a first computing device, a vehicle;

determining, by the one or more processors, a symptom applicable to the vehicle;

transmitting, from the first computing device to a server, a search request based on the vehicle and the symptom;

receiving, by the one or more processors, a response to the search request, the response comprising a web-resource link and a matrix code, wherein the web-resource link includes a link to one or more web resources, and the matrix code is encoded with the web-resource link;

determining, by the one or more processors based at least in part on the web-resource link, a condition indicative of the first computing device being unable to traverse the web-resource link;

outputting, by the one or more processors in response to determining the condition indicative of the first computing device being unable to traverse the web-resource link, the matrix code to a first display operatively coupled to the one or more processors; and displaying, on the first display, the matrix code.

18. A method comprising:

executing, by one or more processors of a first computing device, a web browser application;

receiving, by the one or more processors, a web-resource link and a matrix code, wherein receiving the web-resource link and the matrix code includes receiving a web page displayable by the web browser application, the web page includes the web-resource link and/or the matrix code, the web-resource link includes a link to one or more web resources, and the matrix code is encoded with the web-resource link;

determining, by the one or more processors based at least in part on the web-resource link, a condition indicative of the first computing device being unable to traverse the web-resource link;

outputting, by the one or more processors in response to determining the condition indicative of the first computing device being unable to traverse the web-resource link, the matrix code to a first display operatively coupled to the one or more processors; and displaying, on the first display, the matrix code.

19. The method of claim 18, further comprising:

displaying the web page on the first display.

20. A computing device comprising:

one or more processors; and a non-transitory computer readable memory containing executable instructions, wherein the executable instructions, when executed by the one or more processors, cause the computing device to perform functions comprising:

receiving, by the one or more processors, a web-resource link and a matrix code, wherein the web-resource link includes a link to one or more web resources, the matrix code is encoded with the web-resource link, the computing device is configured as a diagnostic computing device, and the diagnostic computing device is registered to access web-services performed by a first server without use of a browser;

determining, by the one or more processors based at least in part on the web-resource link, a condition indicative of the computing device being unable to traverse the web-resource link, wherein determining the condition includes determining that the web-resource link is a link to a generic web resource available from a second server other than the first server to which the diagnostic computing device is registered;

outputting, by the one or more processors in response to determining the condition indicative of the computing device being unable to traverse the web-resource link, the matrix code to a first display operatively coupled to the one or more processors; and displaying, on the first display, the matrix code.

21. A non-transitory computer readable memory containing executable instructions, wherein the executable instructions, when executed by one or more processors of a computing device, cause the computing device to perform functions comprising:

receiving, by one or more processors, a web-resource link and a matrix code, wherein the web-resource link includes a link to one or more web resources, the matrix code is encoded with the web-resource link, the computing device is configured as a diagnostic computing device, and the diagnostic computing device is registered to access web-services performed by a first server without use of a browser;

determining, by the one or more processors based at least in part on the web-resource link, a condition indicative of the computing device being unable to traverse the web-resource link, wherein determining the condition includes determining that the web-resource link is a link to a generic web resource available from a second server other than the first server to which the diagnostic computing device is registered;

outputting, by the one or more processors in response to determining the condition indicative of the computing device being unable to traverse the web-resource link, the matrix code to a first display operatively coupled to the one or more processors; and displaying, on the first display, the matrix code.

* * * * *